US010228227B2

(12) United States Patent
Kawashima

(10) Patent No.: US 10,228,227 B2
(45) Date of Patent: Mar. 12, 2019

(54) SCALE

(71) Applicant: Kazunori Kawashima, Hokkaido (JP)

(72) Inventor: Kazunori Kawashima, Hokkaido (JP)

( * ) Notice: Subject to any disclaimer, the term of this patent is extended or adjusted under 35 U.S.C. 154(b) by 0 days.

(21) Appl. No.: 15/870,683

(22) Filed: Jan. 12, 2018

(65) Prior Publication Data

US 2018/0172414 A1 Jun. 21, 2018

Related U.S. Application Data

(63) Continuation of application No. PCT/JP2016/069995, filed on Jul. 6, 2016.

(30) Foreign Application Priority Data

Jul. 13, 2015 (JP) ................................ 2015-139337

(51) Int. Cl.
*G01B 3/02* (2006.01)
*G01B 3/00* (2006.01)
*G01D 13/12* (2006.01)
*G01B 3/20* (2006.01)
*G01B 3/22* (2006.01)
*G01B 3/56* (2006.01)
*G01D 13/18* (2006.01)

(52) U.S. Cl.
CPC ............... *G01B 3/02* (2013.01); *G01B 3/004* (2013.01); *G01B 3/20* (2013.01); *G01B 3/22* (2013.01); *G01B 3/56* (2013.01); *G01D 13/12* (2013.01); *G01D 13/18* (2013.01)

(58) Field of Classification Search
USPC .................................................. 33/679.1, 494
See application file for complete search history.

(56) References Cited

U.S. PATENT DOCUMENTS 706,242 A * 8/1902 Latshaw ................ G01B 3/004
33/494
1,602,490 A * 10/1926 Homan .................... G01B 3/04
33/487

(Continued)

FOREIGN PATENT DOCUMENTS

EP 2039381 A1 11/2006
JP S56-49949 9/1979

(Continued)

OTHER PUBLICATIONS

Kokuho Product Information GY-GBA210, https://www.kokuyo-st.co.jp/seach/1 detail.php?sid=100101336.

*Primary Examiner* — Christopher W Fulton
(74) *Attorney, Agent, or Firm* — Konomi Takeshita

(57) ABSTRACT

In a scale constituted by a plurality of scale lines, to provide such a scale capable of easily reading scale values. In a scale main body having a predetermined size and a plurality of scale lines formed thereon, temporary numbers are put one by one from 0 in an ascending order on the respective scale lines formed at each scale value interval desirably determined, with the scale line defined as 0 in the scale value being set as a starting point, and display methods between the scale line with the numeral 2, 3, 7 or 8 set at the lowermost position of the temporary number and the scale line with the numeral 1, 4, 6 or 9 set at the lowermost position of the temporary number are made different.

6 Claims, 13 Drawing Sheets

(56) References Cited

U.S. PATENT DOCUMENTS

| | | | | |
|---|---|---|---|---|
| 1,776,245 | A | * | 9/1930 | Barrett .................. G01B 3/004 33/494 |
| 3,024,537 | A | * | 3/1962 | Dillingham ............ B27L 1/122 33/346 |
| 4,247,986 | A | * | 2/1981 | Burroughs ............. G01B 3/006 33/494 |
| 5,012,590 | A | * | 5/1991 | Wagner .................. B25H 7/00 33/494 |
| 5,335,421 | A | * | 8/1994 | Jones, Jr. ............... G01B 3/004 33/494 |
| 5,435,659 | A | * | 7/1995 | Ueno .................... B41J 3/4075 101/73 |
| 5,501,019 | A | * | 3/1996 | Concari ................. B43L 7/005 33/492 |
| 5,913,586 | A | * | 6/1999 | Marshall ............... G01B 3/004 33/494 |
| 7,581,333 | B2 | * | 9/2009 | Dressler ................. G01B 3/10 33/494 |
| 2001/0034954 | A1 | * | 11/2001 | Medford .............. E04D 15/025 33/759 |
| 2003/0126752 | A1 | * | 7/2003 | Brandon ............. G01B 3/1082 33/494 |

FOREIGN PATENT DOCUMENTS

| | | |
|---|---|---|
| JP | S57-205002 | 6/1981 |
| JP | H04-104502 U | 9/1992 |
| JP | H8-136202 A | 5/1996 |
| JP | 3114235 U | 8/2005 |
| JP | 2011-237248 | 11/2011 |
| JP | 2012-184006 A | 9/2012 |

* cited by examiner

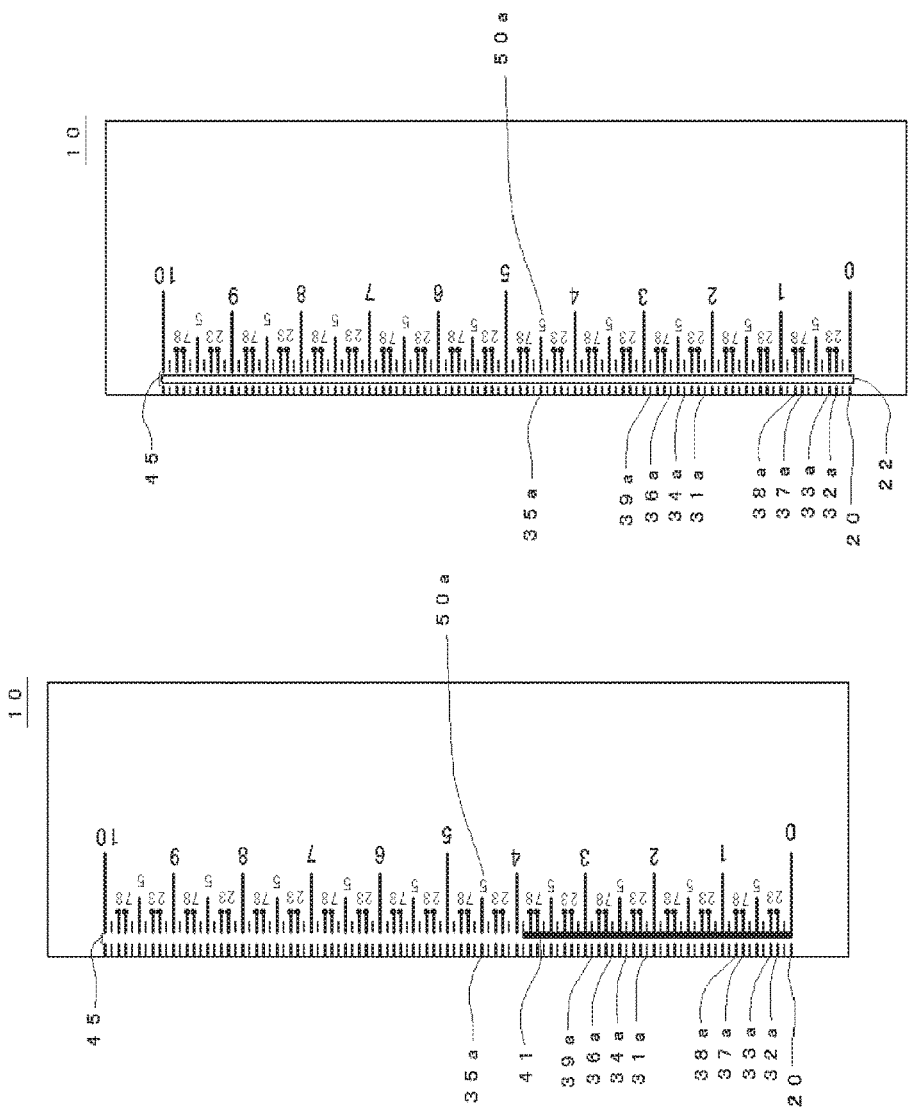
FIG. 4
FIG. 5
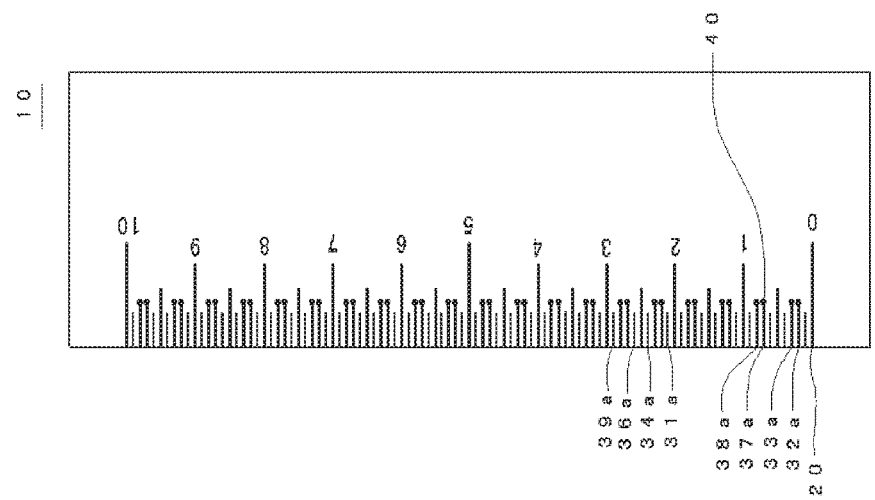
FIG. 6

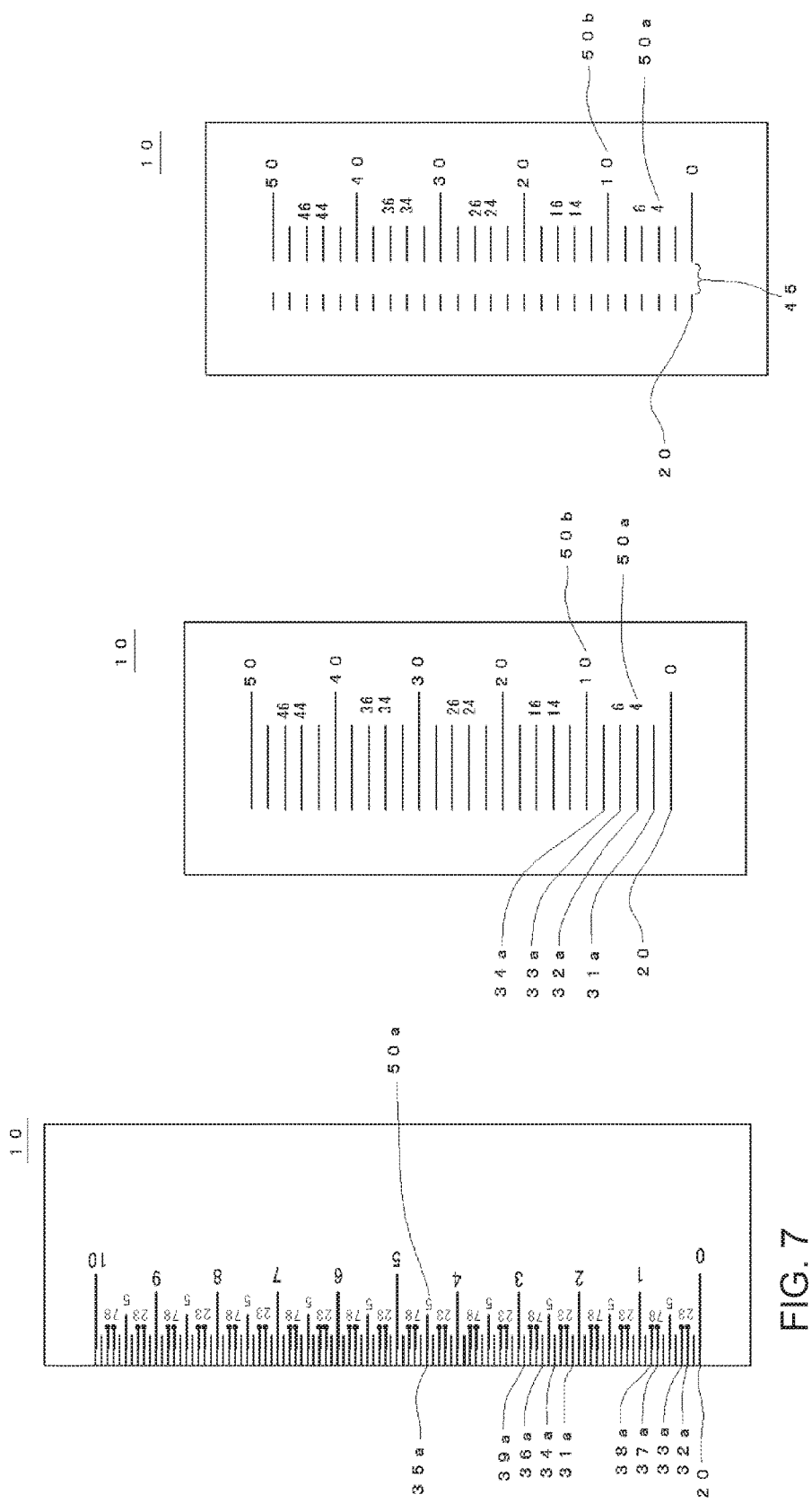

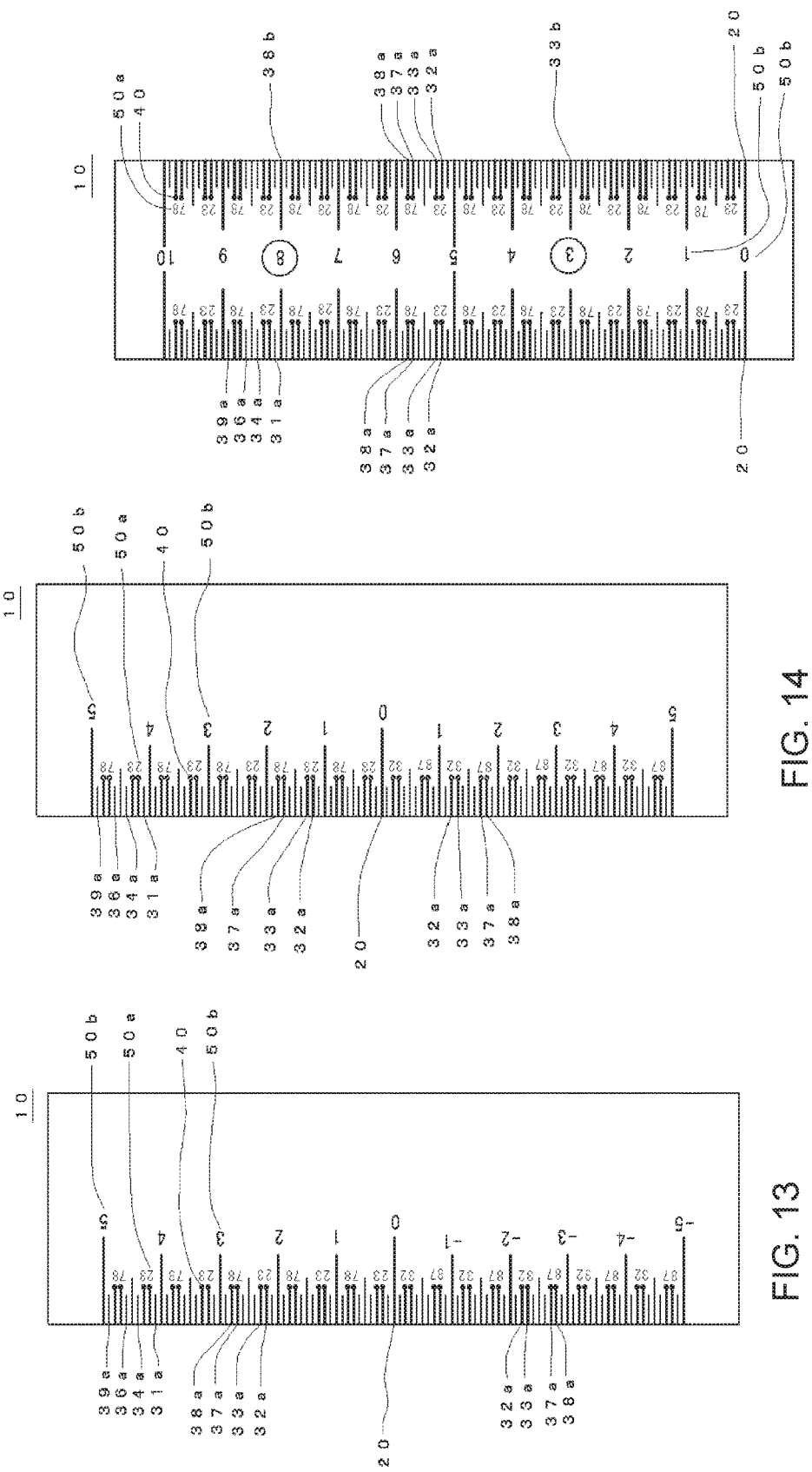

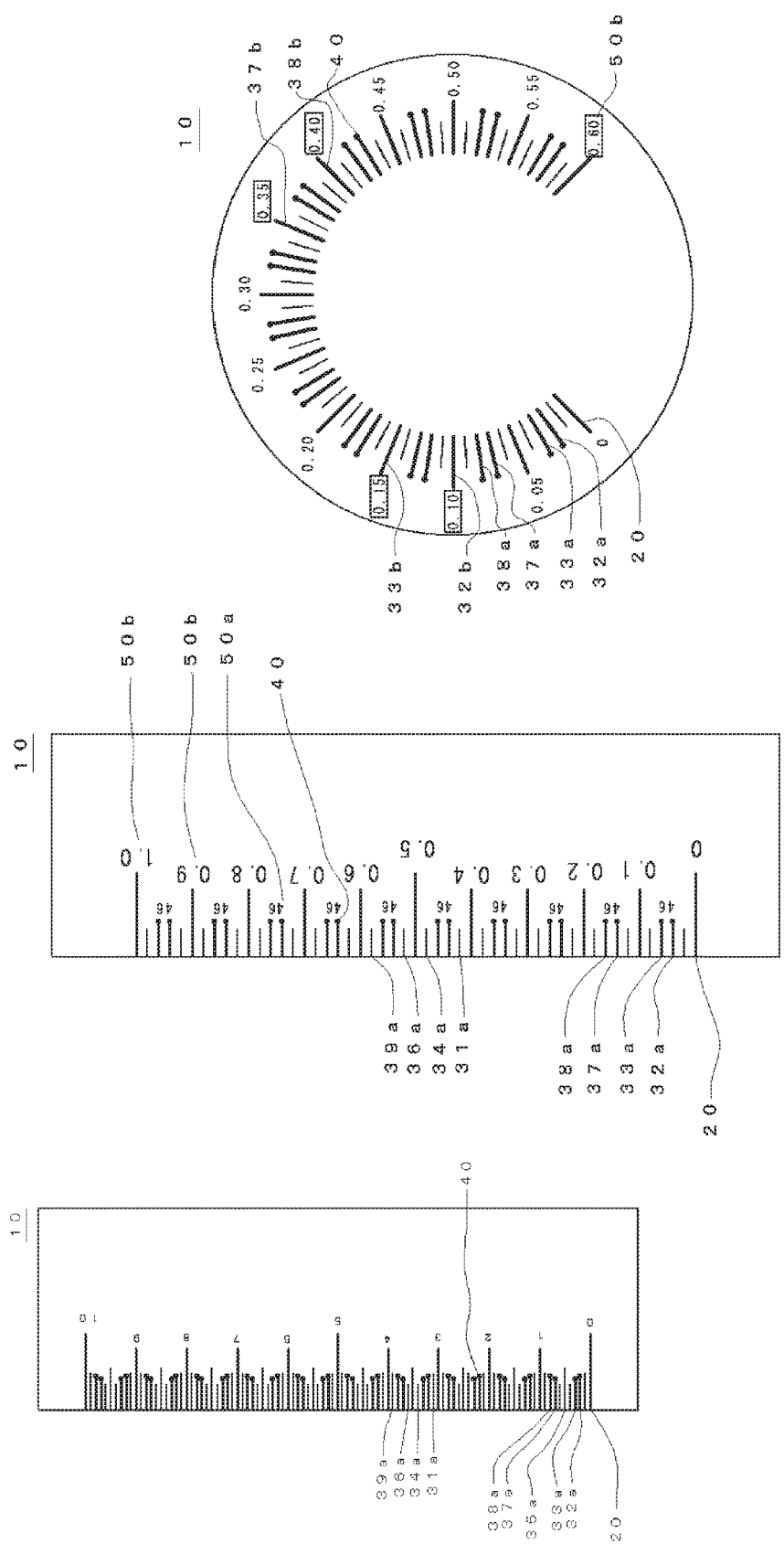

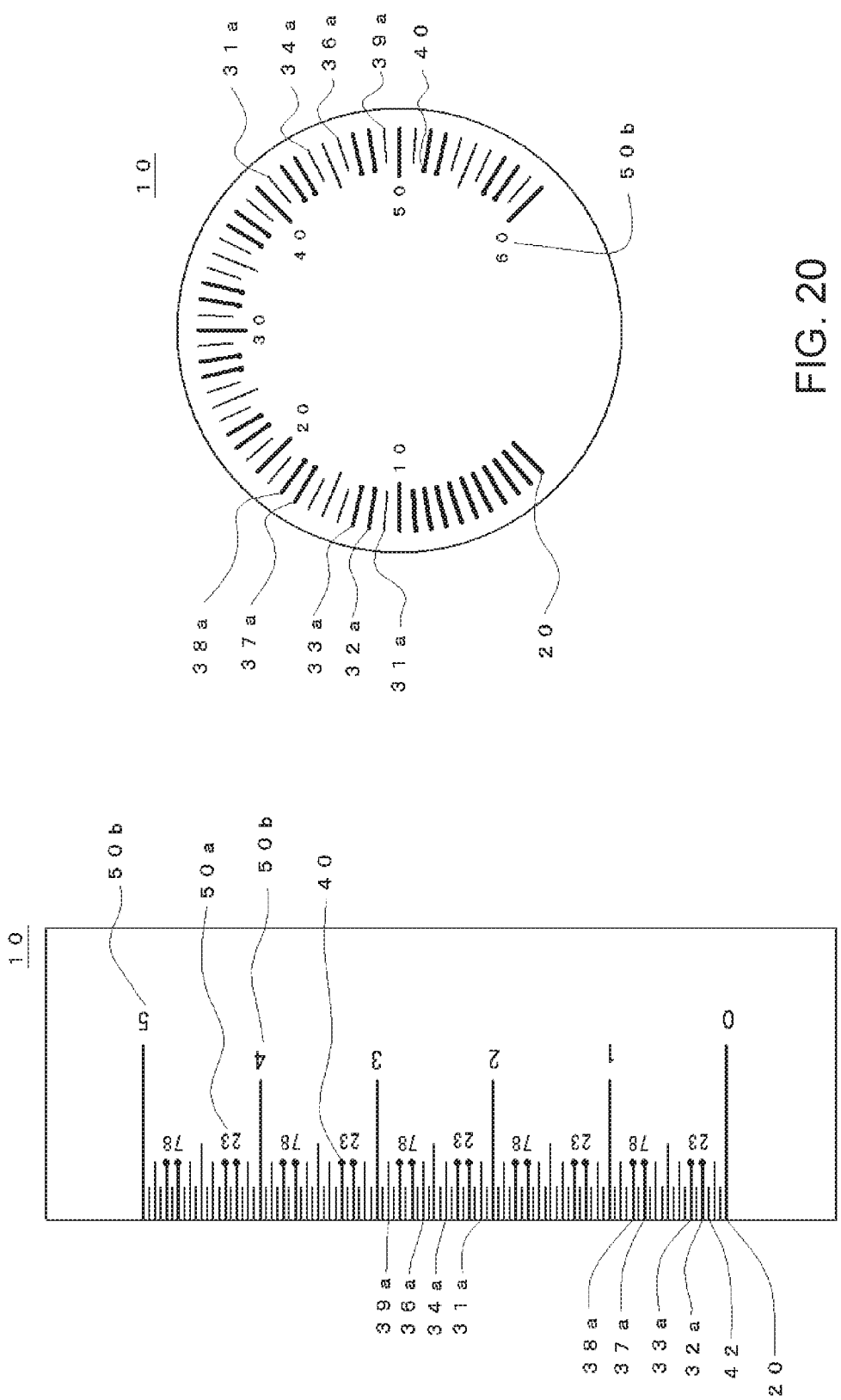

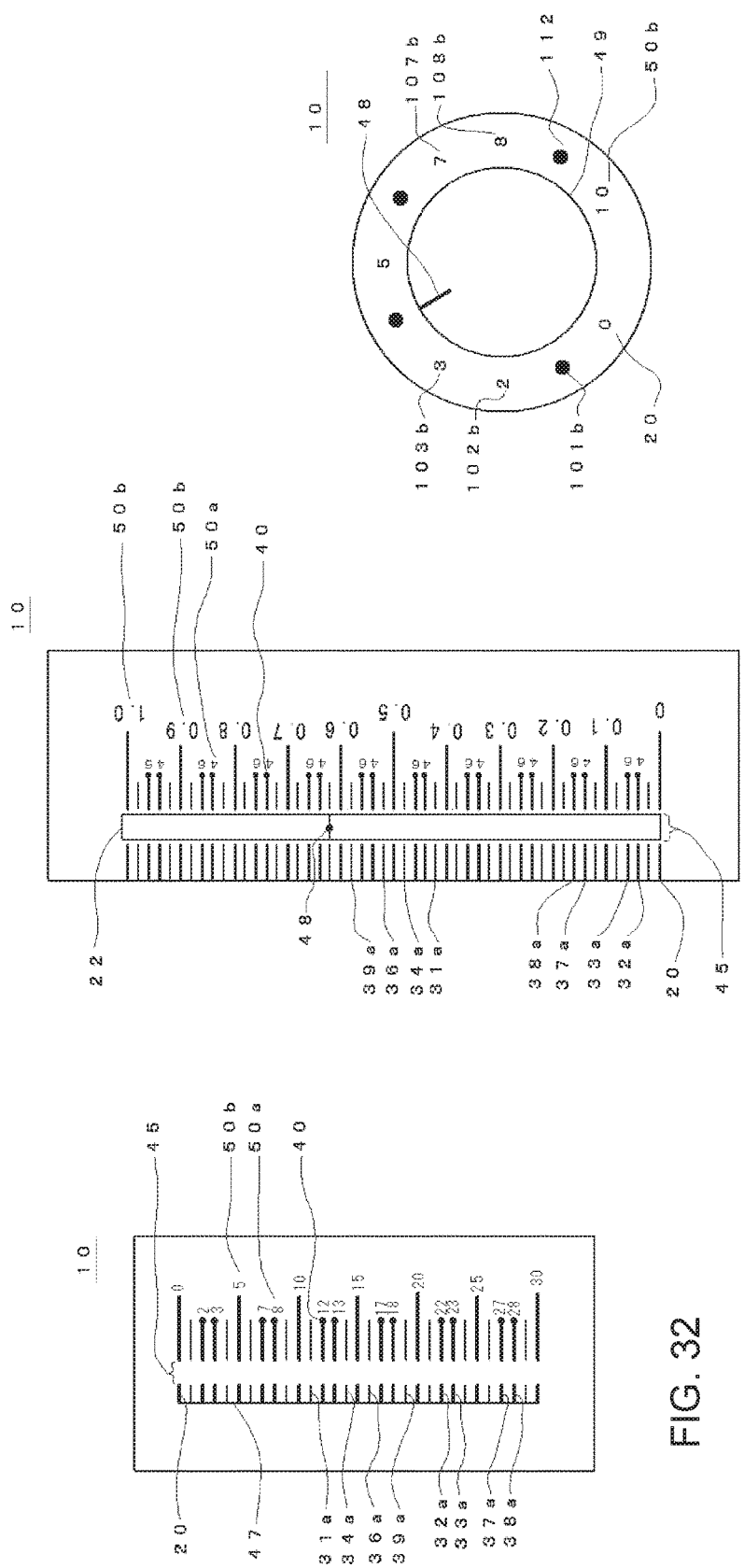

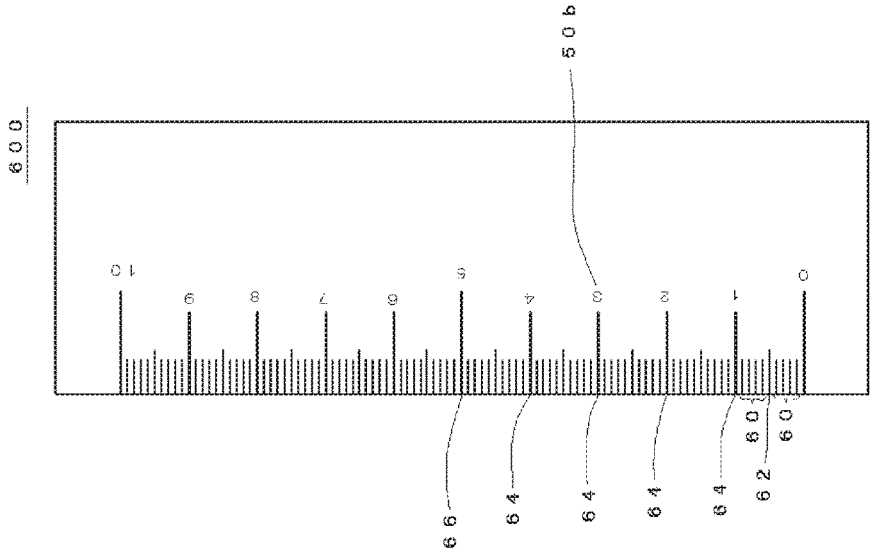
FIG. 36 —Prior Art—
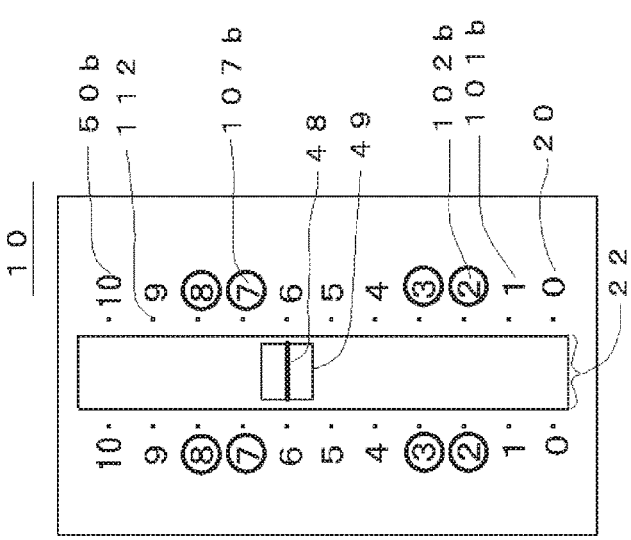
FIG. 35

US 10,228,227 B2

SCALE

CROSS REFERENCE TO RELATED APPLICATIONS

This application claims priority under 35 U.S.C. 365(c) and 35 U.S.C. 120 based upon Japanese Patent Application Serial No. 2015-139337, filed on Jul. 13, 2015, and International Patent Application Ser. No. PCT/JP2016/069995, filed on Jul. 6, 2016. The entire disclosures of the aforesaid applications are incorporated herein by reference.

TECHNICAL FIELD

The present invention relates to a scale for use in a measuring mechanical instrument and a weighting apparatus, such as a scale unit, a measuring cylinder and the like, a metal machining tool, an optical mechanical instrument, a medical mechanical instrument, an electric communication mechanical instrument, a vehicle, a ship, an aircraft and the like.

BACKGROUND ART

As the scale used for conventional measurements, settings and the like, a scale shown in FIG. 36 or the like has been known. In the conventional scale main body 600, scale lines indicating scale positions in a range from 0 to 10 cm are formed, and the scale lines include minimum scale lines 60 that are formed four by four so as to divide the gap between one scale line and another scale line formed at each scale value interval corresponding to the minimum scale value interval into five equal portions, with the scale line at which a scale value corresponding to a measured amount, a setting amount or the like of the scale lines becomes 0 being set as a starting point; small scale lines 62 each of which has a line length corresponding to the length of the scale line that is longer than that of the minimum scale line 60, and formed so as to divide 1 cm into two equal portions; middle scale lines 64 each of which has a line length longer than that of the small scale line 62 and a line width indicating the width of the scale line that is thicker, and which are formed four by four so as to divide the gap between the scale lines formed at each 5 cm interval in the scale value interval into five equal portions, with the scale line defined as 0 in the scale value being set as the starting point; and large scale lines 66 each of which has a line length longer than that of the middle scale line 64 with the same line width, and is formed at each 5 cm interval in the scale value interval, with the scale line defined as 0 in the scale value being set as the starting point. Additionally, another scale has been known which is formed by the scale lines as described above and the line length of the minimum scale lines is gradually made different (see Patent Document 1). Moreover, a scale for a pressure gauge, a voltmeter or the like in which scale lines constituted by the above-mentioned scale lines are formed into a dial shape has been known. Furthermore, still another scale has been known which is constituted by scale lines as described above, and formed on a liquid amount measuring device, an injection syringe or the like for measuring the volume of liquid. Still another scale has been known which is constituted by the above-mentioned scale lines, and formed on a setting part such as a feeding scale of a lathe. Moreover, still another scale has been known which is constituted by the above-mentioned scale lines and in which to all the minimum scale lines, scale numerals are attached (see Patent Document 2). Still another scale has been known in which scale positions are indicated by scale display points such as scale numerals, marks, scale lines or the like, and which is prepared as a rotation-type or slide-type setting knob to be installed in an electric communication mechanical instrument.

CITATION LIST

Patent Literature

PTL 1: Japanese Utility Model Application Laid-Open No. 62-134798
PTL 2: Design Registration No. 1499231

SUMMARY OF INVENTION

Technical Problem

A conventional scale as indicated by a scale main body 600 has the following problems. In the middle scale lines 64, with respect to scale display of the scale lines formed four by four, only the number of scale numeral 50b is changed, but the display method of the respective middle scale lines 64 is the same; therefore, the respective middle scale lines 64 are hardly discriminated intuitively, making it difficult to carry out measurements, settings and the like. Moreover, the same problems are posed in the scale having scale lines formed into a dial shape. Furthermore, in the minimum scale line 60, the display method of the scale lines formed four by four is the same, and in Patent Document 1 also, although the line lengths of the minimum scale lines are made gradually different, only the line lengths are made gradually different, and in any of the cases, since the distance between the mutual minimum scale lines is narrow, with the result that in order to discriminate the scale value of the minimum scale lines, by counting the minimum scale lines formed four by four all the way, the respective minimum scale lines need to be discriminated. Moreover, the same problem is posed in the case of the scale in which the scale lines are formed into a dial shape. When the discrimination of the minimum scale lines formed four by four is finished, next, for example, the scale amount that is a scale value amount of one scale is multiplied by the number obtained by finding what number the minimum scale line in question is among the four lines, when counted in a direction of 0 of the scale value so that the scale value is discriminated. Moreover, in order to confirm the scale amount, in the case of the scale of the conventional scale main body 600, since the scale value interval of 5 mm is divided into 5 equal portions in the scale lines, by dividing 5 mm by 5, the scale amount of one scale is confirmed to be 1 mm. In the case when the number of scale amount is 1 in this manner, if it is confirmed what number the minimum scale line whose scale value is discriminated is when counted in the direction of 0 of the scale value among the four minimum scale lines, it is not necessary to calculate the scale value by multiplying the number as to what number the minimum scale line in question is, by the scale amount because the scale amount is 1; however, in the case when the scale value of a scale whose scale amount is 2 or the like other than 1 is discriminated, it is necessary to calculate by multiplying the number as to what number the minimum scale line in question is by this scale amount.

Moreover, conventional scales have situations which have the description of this scale amount and have no description thereof. For this reason, upon reading the scale value, the presence/absence of the description of the scale amount is first confirmed, and in the case of the presence, after confirming the scale amount, the scale value is read, while in the case of the absence, after calculating the scale amount as described earlier, the scale value needs to be read. In this manner, in the conventional scales, a problem is posed in that time and labor consuming processes are required in discriminating the minimum scale line as well as in confirming the scale amount and reading the scale value. Moreover, in Patent Document 2, although scale numerals are put to all the minimum scale lines 60, since the displays of the scale numerals become too many, the scales become hardly visible, and since only the number of the scale numerals in the minimum scale lines is varied, with the display method of the minimum scale lines 60 being the same, problems are posed in that the discrimination of the respective minimum scale lines is hardly carried out intuitively and in that the scale value is hardly readable. Furthermore, in the case when the scale of the conventional scale display method constituted by these plural scale lines is utilized for a liquid amount meter for measuring the volume of liquid or the like, the above-mentioned problems are posed, and in addition, upon measurement or the like, since the liquid surface of the measuring object and the scale line tend to be overlapped with each other, a problem of low visibility of the liquid surface is also raised. However, in an attempt to prevent the scale line and the liquid surface from being overlapped with each other, the liquid surface position needs to be confirmed by the end of the scale line so as to carry out the measurement; however, in this case, the measurement by the use of the end of the scale line poses another problem in that reading of the scale value is hardly carried out. Furthermore, in the case when the scale of the conventional scale display method is utilized for a scale to be installed on a setting part such as a feeding scale of a lathe or the like, the above-mentioned problems are raised, and in addition, since a setting-use indicator needle for this scale is installed on one side edge of the scale main body in most cases, with the result that problems of low visibility of the indicator needle and low readability of the scale value are raised. On the other hand, in the case of scales in which the scale position is indicated by a scale display such as a scale numeral, a mark, a scale line or the like for use in a rotation-type or a sliding-type setting knob or the like to be installed in an electric communication mechanical instrument, the display method of scale display points is all the same, or even in the case when a variation exists in the display method, the variation normally corresponds to every 5 scale variation, and with respect to the scale display formed four by four between the scale display points of every 5 scales, the same display is given; therefore, the respective scale display points are hardly discriminated intuitively to cause a problem of difficulty in scale setting. The present invention has been devised to solve the above-mentioned disadvantages.

Solution to Problems

The scale of the present invention, which is provided with a scale main body having a predetermined size and a plurality of scale lines formed thereon, is characterized in that temporary numbers are put one by one from 0 in the scale value in an ascending order on respective scale lines formed at each scale value interval desirably determined, with the scale line defined as 0 in the scale value being set as a starting point, and display methods are made different between the scale line with the numeral 2, 3, 7 or 8 set at the lowermost position of the temporary number, and the scale line with the numeral 1, 4, 6 or 9 set at the lowermost position of the temporary number. Moreover, the scale of the present invention, which is provided with a scale main body having a predetermined size and a plurality of scale lines formed thereon, is characterized in that temporary numbers are put one by one from 0 in the scale value in an ascending order on respective scale lines formed at each scale value interval desirably determined, with the scale line defined as 0 in the scale value being set as the starting point, and display methods are made different between the line width of the scale line with the numeral 2, 3, 7 or 8 set at the lowermost position of the temporary number and the line width of the scale line with the numeral 1, 4, 6 or 9 set at the lowermost position of the temporary number. Furthermore, the scale of the present invention, which is provided with a scale main body having a predetermined size and a plurality of scale lines formed thereon, is characterized in that temporary numbers are put one by one from 0 in an ascending order on scale lines formed at each scale value interval desirably determined, with the scale line defined as 0 in the scale value being set as the starting point, and display methods are made different between the scale numeral of the scale line with the numeral 2, 3, 7 or 8 set at the lowermost position of the temporary number, and the scale numeral of the scale line with the numeral 1, 4, 6 or 9 set at the lowermost position of the temporary number. Furthermore, the scale of the present invention, which is provided with a scale main body having a predetermined size and a plurality of scale lines formed thereon, is characterized in that temporary numbers are put one by one from 0 in the scale value in an ascending order on respective scale lines formed at each sale-value interval desirably determined, with the scale line defined as 0 in the scale value being set as the starting point, and a mark having a desired shape is formed on scale lines with the numeral 2, 3, 7 or 8 set at the lowermost position of the temporary number, and no mark having a desired shape is formed on scale lines with the numeral 1, 4, 6 or 9 set at the lowermost position of the temporary number so that the display method of the marks are made different.

The scale of the present invention, which is provided with a scale main body having a predetermined size and a plurality of scale lines formed thereon, is characterized in that temporary numbers are put one by one from 0 in the scale value in an ascending order on respective scale lines formed at each scale value interval desirably determined, with the scale line defined as 0 in the scale value being set as the starting point, and display methods are different between the scale line with the numeral at the lowermost position of the temporary number being set to 3 and 8, and the scale line with the numeral at the lowermost position of the temporary number being set to 1, 2, 4, 6, 7 and 9. Moreover, the scale of the present invention, which is provided with a scale main body having a predetermined size and a plurality of scale lines formed thereon, is characterized in that temporary numbers are put one by one from 0 in an ascending order on respective scale lines formed at each scale value interval desirably determined, with the scale line defined as 0 in the scale value being set as the starting point, and display methods are different between the scale line with the numeral 2 or 7 set at the lowermost position of the temporary number, and the scale line with the numeral at the lowermost position of the temporary number being set to 1, 3, 4, 6, 8 or 9. Furthermore, the scale of the present invention, which is provided with a scale main body having a predetermined size and a plurality of scale lines formed thereon, is characterized in that of four minimum scale lines that are formed four by four, the line width of desired two scale lines is made different from the line width of the rest two of the scale lines. The scale of the present invention, which is provided with a scale main body having a predetermined size and a plurality of scale display points indicating scale positions formed thereon, is characterized in that temporary numbers are put one by one from 0 in an ascending order on the respective scale display points formed at each scale value interval desirably determined, with the scale display point defined as 0 in the scale value being set as the starting point, and display methods of scale display points are made different between the display points with the numeral 2, 3, 7 or 8 set at the lowermost position of the temporary number, and the display points with the numeral 1, 4, 6 or 9 set at the lowermost position of the temporary number. Moreover, the scale of the present invention is characterized by forming a cutout for erasing the intermediate portion of each of scale lines on predetermined scale lines.

Advantageous Effects of Invention

In accordance with the present invention, since in a scale in which temporary numbers are put one by one from 0 in an ascending order on respective scale lines formed at each scale value interval desirably determined, with the scale line defined as 0 in the scale value being set as the starting point, display methods are made different between the scale line with the numeral 2, 3, 7 or 8 set at the lowermost position of the temporary number, and the scale line with the numeral 1, 4, 6 or 9 set at the lowermost position of the temporary number; therefore, since each of the scale lines with the numeral 1, 2, 3, 4, 6, 7, 8 or 9 set at the lowermost position of the temporary number can be discriminated intuitively, it becomes possible to easily carry out a measuring process or a setting process. Further, in the minimum scale lines, temporary numbers are put one by one from 0 in an ascending order on respective scale lines formed at each scale value interval desirably determined, with the scale line defined as 0 in the scale value being set as the starting point, display methods of the minimum scale lines are made different between the minimum scale line with the numeral 2, 3, 7 or 8 set at the lowermost position of the temporary number, and the minimum scale line with the numeral 1, 4, 6 or 9 set at the lowermost position of the temporary number; therefore, without the necessity of counting the minimum scale lines formed four by four, it becomes possible to easily discriminate the respective minimum scale lines, and also to easily read the respective scale values of the minimum scale lines. Moreover, in a scale installed in a scale device, a liquid amount meter or the like, since a cutout is formed in the intermediate portion of the respective scale lines, the reading of the scale values can be easily carried out. Furthermore, in a scale installed in a setting part of a feeding scale or the like of a lathe, since a cutout for a setting-use indicator needle is formed in the intermediate portion of the respective scale lines, visibility of the setting-use indicator needle becomes higher, and the scale value is easily readable. In a scale in which the scale positions are indicated by scale display points, such as a scale numeral, a mark, a scale line or the like, temporary numbers are put one by one from 0 in an ascending order on respective scale display points formed at each scale value interval desirably determined, with the scale display line defined as 0 in the scale value being set as the starting point, and since display methods are made different between the scale display points with the numeral 2, 3, 7 or 8 set at the lowermost position of the temporary number and the scale display points with the numeral 1, 4, 6 or 9 set at the lowermost position of the temporary number, it is possible to easily discriminate the respective scale displays intuitively, and also to easily carry out scale settings. Moreover, with respect to the manufacturing price of the scale of the present invention, since it is only necessary to alter the print pattern or the like of a conventional scale, the scale of the present invention can be produced at the same cost as that of the conventional scale.

BRIEF DESCRIPTION OF DRAWINGS

FIG. 4 is a plan view showing a modified example of the entire scale shown in FIG. 3;

FIG. 5 is another plan view showing a modified example of the entire scale shown in FIG. 3;

FIG. 6 is the other plan view showing a modified example of the entire scale shown in FIG. 3;

FIG. 7 is a plan view showing the entire scale in accordance with a fourth embodiment of the present invention;

FIG. 8 is a plan view showing the entire scale in accordance with a fifth embodiment of the present invention;

FIG. 9 is a plan view showing a modified example of the entire scale shown in FIG. 7;

FIG. 13 is a plan view showing the entire scale in accordance with a ninth embodiment of the present invention;

FIG. 14 is a plan view showing the entire scale in accordance with a tenth embodiment of the present invention;

FIG. 15 is a plan view showing the entire scale in accordance with an eleventh embodiment of the present invention;

FIG. 16 is a plan view showing the entire scale in accordance with a twelfth embodiment of the present invention;

FIG. 17 is a plan view showing the entire scale in accordance with a thirteenth embodiment of the present invention;

FIG. 18 is a plan view showing the entire scale in accordance with a fourteenth embodiment of the present invention;

FIG. 19 is a plan view showing the entire scale in accordance with a fifteenth embodiment of the present invention;

FIG. 20 is a plan view showing the entire scale in accordance with a sixteenth embodiment of the present invention;

FIG. 32 is a plan view showing a modified example of the entire scale shown in FIG. 30;

FIG. 33 is a plan view showing the entire scale in accordance with a twenty-seventh embodiment of the present invention;

FIG. 34 is a plan view showing the entire scale in accordance with a twenty-eighth embodiment of the present invention;

FIG. 35 is a plan view showing the entire scale in accordance with a twenty-ninth embodiment of the present invention; and FIG. 36 is a plan view showing a conventional scale.

DESCRIPTION OF EMBODIMENTS

First Embodiment

Figure 1:
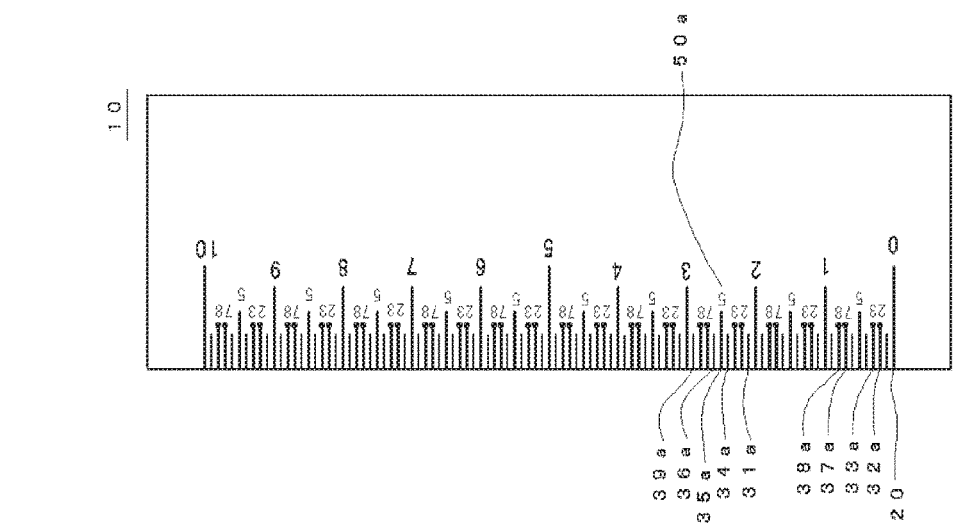
FIG. 1 is a plan view showing the entire scale in accordance with a first embodiment of the present invention.

Referring to FIG. 1, explanation will be given on a first embodiment of the present invention. The present embodiment relates to scale divisions for use in measuring the length of an object, which are designed as follows. A) From one end edge of a scale main body 10, scale lines are formed in the following manner. First, within a range from 0 cm to 10 cm, scale lines each having the same line length are formed at each 1 mm interval from the left side to the right side in an ascending order in the scale value at each 1 mm interval in the scale value. Among these, the line length of scale lines at each 5 mm interval with scale values of 5, 15, 25, 35, 45, 55, 65, 75, 85 and 95 mm is set to 1.5 times longer than that of the scale line at each 1 mm interval. Next, the line length and line width of scale lines at each 1 cm interval with scale values of 1, 2, 3, 4, 6, 7, 8 and 9 cm are set to a line length 1.5 times longer than that of the scale line at each 5 mm interval, and a line width 2.5 times longer than that, and a scale numeral 50b indicating the scale value of each of the scale lines is put to the vicinity of the tip inside the scale line at each 1 cm interval. Next, the line length and line width of scale lines at each 5 cm interval with scale values of 0 cm, 5 cm and 10 cm, are set to a line length 1.2 times longer than that of the scale line at each 1 cm interval and a line width that is the same length as that, and a scale numeral 50b indicating the scale value of each of the scale lines is put to the vicinity of the tip inside the scale line at each 5 cm interval. B) The scale line with the scale value of 0 cm is set as a starting point 20. C) The scale value interval to be desirably determined is set at 1 mm. D) From the starting point 20, onto the scale lines formed at each 1 mm interval that is a scale value interval desirably set, temporary numbers are successively put one by one from 0 in an ascending order. E) The line length and line width of the scale lines 32a, 33a, 37a and 38a with the numeral 2, 3, 7 or 8 at the lowermost position of the temporary number are set to a line length 1.2 times longer than that of the scale lines 31a, 34a, 36a, 39a, with the numeral 1, 4, 6 or 9 at the lowermost position of the temporary number and a line width that is the same as that of the above-mentioned scale line at each 1 cm. To the tip inside of each scale lines 32a, 33a, 37a and 38a, a round mark 40 that has a diameter which is two times larger than the line width of the scale line and the inside of which is painted in black is formed, and the scale numerals 50a of "2", "3", "7" and "8" corresponding to a numeral at the first decimal place below a decimal point in cm unit conversion of the scale value of each of the scale lines are also formed. F) Next, temporary numbers are again put, with the scale value interval that is desirably determined being set to 10 mm. G) From the starting point 20, onto the scale lines formed at each 10 mm interval that is a scale value interval desirably determined, temporary numbers are successively put one by one from 0 in an ascending order. H) The scale numeral 50b of each of the scale lines 32b, 33b, 37b and 38b with the numeral 2, 3, 7 or 8 set at the lowermost position of the temporary number is surrounded by a round line. Additionally, the temporary numbers of the present invention are used for convenience, and are not necessarily installed on the scale of the present invention (the same is true for the following embodiments). Moreover, the scale value interval that is desirably determined at the time of putting temporary numbers is used for putting the temporary numbers to scale lines required for intuitive discrimination of scale lines and for easy reading of the scale values (the same is true for the following embodiments).

In this manner, by surrounding the scale numeral 50b of each of the scale lines 32b, 33b, 37b and 38b corresponding to the scale line at each cm interval with the round line, without surrounding the scale numeral 50b of each of the scale lines 31b, 34b, 36b and 39b corresponding to the scale line at each cm interval in the same manner with the round line, the display methods between the scale lines 32b, 33b, 37b, 38b and the scale lines 31b, 34b, 36b, 39b are made different from each other. In this manner, by surrounding each of "2", "3", "7" and "8" corresponding to the scale numerals 50b of scale lines 32b, 33b, 37b, 38b with a round line, it becomes possible to intuitively discriminate the scale lines of the scale lines 32b, 33b, 37b and 38b. Moreover, by allowing the respective scale lines of the scale lines 32b, 33b, 37b and 38b to be discriminated intuitively, the respective scale lines of the scale lines 31b, 34b, 36b and 39b with the adjacent scale numeral 50b corresponding to "1", "4", "6, and "9" can also be intuitively discriminated. As described above, by installing these scale divisions on a scale, since the respective scale lines of the scale lines 31b, 32b, 33b, 34b, 36b, 37b, 38b and 39b are intuitively discriminated, measurements or the like can be easily carried out. Moreover, by surrounding the scale numeral 50b such as "2" and "3" adjacent to each other at a cm unit interval in this manner with a round line, the positions of the scale numerals 50b relating to "2" and "3" can be easily confirmed. Furthermore, since the scale numerals 50b of "2" and "3" of the scale lines 32b and 33b are located in the center of "1", "2", "3" and "4" corresponding to the scale numerals 50b of the scale lines 31b, 32b, 33b and 34b, and since "7" and "8" of the scale lines 37b and 38b are also located in the center of "6", "7", "8" and "9" corresponding to the scale numerals 50b of the scale lines 36b, 37b, 38b and 39b, the positions of the scale numerals 50b relating to "2", "3", "7" and "8" can be easily confirmed. Further, by using the scale numerals 50b relating to "2", "3", "7" and "8" each surrounded by this round line as a guide, the entire scale positions of the scale line at a cm unit interval can be easily confirmed. In the present embodiment, the scale numeral 50b of the scale lines 32b, 33b, 37b and 38b is surrounded by a round line; however, the scale numeral 50b may be surrounded by a line having a desired shape such as a rectangle or the like, or may be underlined or the like. Moreover, the size of font, kind, character color, color of the background portion or the like of the scale numerals 50b of the scale lines 32b, 33b, 37b and 38b may be displayed by a different display method from the display method of the scale lines 31b, 34b, 36b and 39b. With respect to the method for displaying the scale lines 32b, 33b, 37b, 38b and the scale lines 31b, 34b, 36b, 39b in mutually different manner, any method may be used as long as there is a difference in the display methods.

Moreover, the line length and line width of the scale lines 32a, 33a, 37a and 38a serving as the minimum scale lines are set to a line length that is made longer, and a line width that is made thicker, than the scale lines 31a, 34a, 36a and 39a also serving as the minimum scale lines, and by forming a round mark 40 and a scale numeral 50a on the tip of each of the scale lines 32a, 33a, 37a and 38a, the display methods of the scale lines 32a, 33a, 37a, 38a and the scale lines 31a, 34a, 36a, 39a may be made different from each other. In the case when scale divisions that make a difference between the scale lines 32a, 33a, 37a, 38a and the scale lines 31a, 34a, 36a, 39a are formed on a scale, since in the minimum scale lines formed four by four, the line width of the second scale line and the third scale line when counted in a direction of 0 of the scale value is made thicker than the line width of the first scale line and the fourth scale line, and by confirming the fact that the scale value of the second and third scale lines takes a numeral of 2, 3, 7 or 8 set at the first decimal place below a decimal point in cm unit conversion, a measurement or the like is carried out by using the scale numeral 50a formed thereon as a guide; thus, without the necessity of counting the minimum scale lines formed four by four, it becomes possible to intuitively discriminate the respective minimum scale lines, and also to easily read the respective scale values of the minimum scale lines. Furthermore, even when only the line width of each of the scale lines 32a, 33a, 37a and 38a is made thicker than that of the scale lines 31a, 34a, 36a and 39a, the scale lines 32a, 33a, 37a, 38a and the scale lines 31a, 34a, 36a, 39a can be discriminated intuitively, and it becomes possible to easily read the respective scale values of the scale lines; therefore, this method may be used. Even when only the mark 40 is formed on each of the scale line 32a, 33a, 37a and 38a, with no mark 40 being formed on the scale lines 31a, 34a, 36a and 39a, the scale lines 32a, 33a, 37a, 38a and the scale lines 31a, 34a, 36a, 39a can be discriminated intuitively, and it becomes possible to easily read the respective scale values of the scale lines; therefore, this method may be used. Moreover, even when only the scale numeral 50a is formed on each of the scale lines 32a, 33a, 37a and 38a, without forming the scale numeral 50a on the scale lines 31a, 34a, 36a and 39a, the scale lines 32a, 33a, 37a, 38a and the scale lines 31a, 34a, 36a, 39a can be discriminated intuitively, and it becomes possible to easily read the respective scale values of the scale lines; therefore, this method may be used. Furthermore, in a scale plate made from a transparent material as a whole, the scale lines 32a, 33a, 37a and 38a serving as the minimum scale lines are formed on the surface of the scale, and scale lines of the other scale lines, such as 31a, 34a, 36a and 39a, may be formed on the surface on the opposite side of the scale; thus, the scale of this type may be used.

With this arrangement, since a level difference is generated between the scale lines 32a, 33a, 37a, 38a and the other scale lines 31a, 34a, 36a, 39a or the like due to the thickness of the scale divisions, the scale lines 32a, 33a, 37a, 38a and the scale lines 31a, 34a, 36a, 39a can be discriminated intuitively, and it becomes possible to easily read the respective scale values of the scale lines; therefore, this arrangement may be used (not shown). In this manner, with respect to the method in which temporary numbers are put one by one from 0 in an ascending order on scale lines at each scale value interval desirably determined, with the scale line defined as 0 in the scale value being set as the starting point, and display methods are made different between the scale line with the numeral 2, 3, 7 or 8 set at the lowermost position of the temporary number, and the scale line with the numeral 1, 4, 6 or 9 set at the lowermost position of the temporary number, various display methods utilizing factors, such as the line width of the scale line, the scale numeral of the scale line, the mark of the scale line and the shape of the scale line or the like, are proposed, and any method may be used as long as it causes a difference in the display methods (the same is true for the following embodiments). Moreover, since the line width of the minimum scale lines of not far apart scale lines, but adjacent scale lines, such as the scale line 32a and the scale line 33a, as well as the scale line 37a and the scale line 38a, is made thicker than that of each of the scale lines 31a, 34a, 36a and 39a, the positions of the scale lines 32a, 33a, 37a and 38a can be easily confirmed. Furthermore, since the scale lines 32a, 33a, 37a and 38a are respectively positioned in the center, without being biased to the right and left side of the respective scale lines 31a, 32a, 33a, 34a and scale lines 36a, 37a, 38a, 39a, the positions of the scale lines 32a, 33a, 37a and 38a can be easily confirmed. Furthermore, in the present embodiment shown in FIG. 1, since "2", "3", "7" and "8" corresponding to the scale numerals 50a are put on the scale lines 32a, 33a, 37a and 38a, the scale value of each of the scale lines 32a, 33a, 37a and 38a can be read more easily in comparison with the case where no scale numeral 50a is put. Since the scale numeral 50a is formed on the scale line to which the scale line 32a and the scale line 33a, as well as the scale line 37a and the scale line 38a, are adjacent, the scale amount can be easily confirmed as 1 mm based upon the difference of the scale numerals 50a between "2" and "3", as well as between "7" and "8".

The scale amount is easily confirmed as 1 mm in this manner; therefore, even in the case of the scale lines 31a, 34a, 36a and 39a having no adjacent scale numerals 50a like the scale lines 32a and 33a as well as the scale lines 37a and 38a, by adding or subtracting the scale amount of 1 mm to or from the scale numeral 50a of each of the scale lines 32a, 33a, 37a and 38a, the scale values of the scale lines 31a, 34a, 36a and 39a can be read more easily in comparison with the case where no scale numeral 50a is formed, in the same manner as in the scale lines 32a, 33a, 37a and 38a. Moreover, the line width of each of the scale lines of the present invention is desirably set to within ¼ of the distance from the center of the scale line to the center of the adjacent scale line so as to make the scale line easily viewed (the same is true for the following embodiments, except for the dial-shaped scale). Additionally, in Patent Document 2, scale numerals are put to all the minimum scale lines, with the result that the display points of the scale numerals of the minimum scale lines become too many to make the scales hardly visible, and since only the scale numerals of the minimum scale lines are changed, with the same display method being used, the minimum scale lines are hardly discriminated intuitively; however, as shown in the present embodiment, among the minimum scale lines, by making the line width of the scale lines 32a, 33a, 37a and 38a thicker than that of the scale line 31a, 34a, 36a and 39a, with the scale numeral 50a or the like being formed thereon, the display points of the scale numerals 50a of the minimum scale lines becomes fewer so that the scale divisions of the minimum scale lines can be easily viewed, and the scale values of the respective minimum scale lines can be easily read. In the present embodiment, a round mark 40, with its inside painted in black, is formed on the tip inside each of the scale lines 32a, 33a, 37a and 38a; however, not limited to the round shape, the mark may have any shape, such as a triangle, a rectangle, a double circle or the like. Moreover, the inside of the mark may not be painted. Furthermore, the mark may be prepared as a figure or a character. In the present embodiment, a scale starting from the left side has been exemplified; however, a scale starting from the right side may be used (the same is true for the following embodiments). The present invention is constituted as described above.

Second Embodiment

Figure 2:
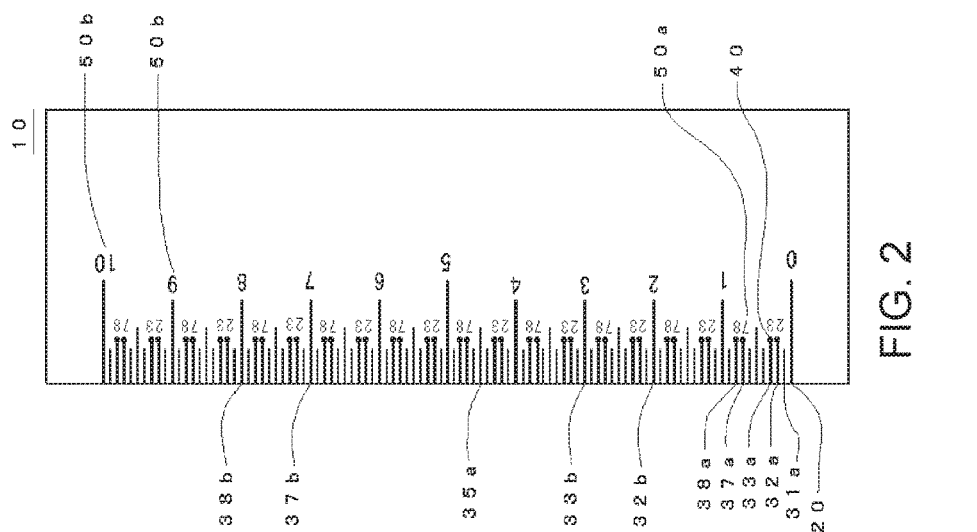
FIG. 2 is a plan view showing the entire scale in accordance with a second embodiment of the present invention.

Referring to FIG. 2, explanation will be given on a second embodiment of the present invention. This embodiment relates to scale divisions of a scale for use in measuring the length or the like of an object, which are designed as follows. A) By using the processes from A) to E) in the first embodiment, scale lines are formed on the scale main body 10. In the case when in the scale divisions of the first embodiment of the present invention, surrounding each of the scale numerals 50b on the scale lines 32b, 33b, 37b and 38b in FIG. 1 with the round line is unnecessary, the display of surrounding each of the scale numerals 50b on the scale lines 32b, 33b, 37b and 38b with the round line can be omitted as shown in FIG. 2, and by forming these scale divisions on the scale, without the necessity of counting the minimum scale lines formed four by four, it becomes possible to intuitively discriminate the respective minimum scale lines, and also to easily read the respective scale values of the minimum scale line; therefore, this arrangement may be used. The present invention is formed as described above.

Third Embodiment

Figure 3:
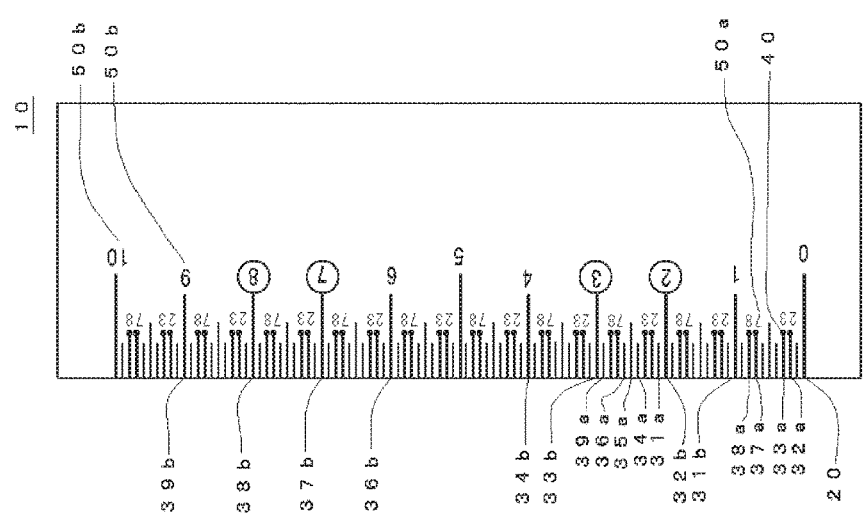
FIG. 3 is a plan view showing the entire scale in accordance with a third embodiment of the present invention.

Referring to FIG. 3, explanation will be given on a third embodiment of the present invention that is provided with scale divisions designed as follows. In the third embodiment, in the scale divisions of the second embodiment shown in FIG. 2, a scale line 35a with the numeral 5 at the lowermost position of the temporary number applied thereto is set to have the same line width as that of the scale lines 32a, 33a, 37a and 38a, and a scale numeral 50a of "5" corresponding to a numeral at the first decimal place below a decimal point in cm unit conversion of the present scale value is formed at the vicinity of the tip inside the scale line 35a. In the case when scale divisions in which the scale line 35a is made to have the same line width as that of the scale lines 32a, 33a, 37a and 38a and "5" corresponding to the scale numeral 50a is put on the scale line 35a are formed on a scale, since the scale lines 34a, 35a and 36a can be confirmed more easily in comparison with the second embodiment shown in FIG. 2, the discrimination of the scale lines 34a, 35a and 36a and the reading of the scale values can be carried out more easily; therefore, this arrangement may be used. Moreover, scale divisions in which a cutout 45 for erasing the middle portion of the scale lines as shown in FIG. 4 may be formed on the respective scale lines of the scale main body 10 as shown in FIG. 3, as the scale divisions for a scale made of a transparent material. As shown in FIG. 4, with a measuring object 41 for length being sandwiched by the edge lines of the cutout 45 by using such a scale so as to be adjusted to apexes of the respective scale lines inside thereof, measurements are carried out while confirming a measuring object 41 through the transparent material; thus, an intuitive discrimination between the scale lines 32a, 33a, 37a, 38a and the scale lines 31a, 34a, 36a, 39a, and reading of the scale values of the respective scale lines can be easily carried out, and since the measuring portion of the measuring object 41 and the outside lines of the scale are not overlapped with one another, measurements can be carried out easily; therefore, this arrangement may be used. In this case, the length is easily read as 3 cm and 9 mm. Moreover, on the respective scale lines of the scale main body 10 as shown in FIG. 3, a cutout 45 for erasing the middle portion thereof is formed as shown in FIG. 5, and an opening 22 is formed so as to be sandwiched by the upper and lower edges of the cutout 45. Next, the scale divisions of the scale main body 10 are formed on a scale, and on the scale also, an opening is formed on the scale so as to be adjusted on the position of the opening 22 of the scale main body 10. In the case when, by using the scale of this type, a marking job for putting a mark at a predetermined length position of a measuring object is carried out by utilizing the opening with the scale lines on the two sides formed by using different display methods, that is, scale lines 32a, 33a, 37a, 38a and scale lines 31a, 34a, 36a, 39a, being used as guides, since the measuring object can be easily position-determined accurately, this arrangement may be used. In this case, the mark is put on a position sandwiched by the predetermined two scale lines on the two sides, the mark can be put more easily. Moreover, as shown in FIG. 6, in the case when scale divisions in which no scale numerals 50a of the minimum scale line among the scale divisions of FIG. 3 are put are formed on a scale, since the respective minimum scale lines can be intuitively discriminated and since the scale values of the respective minimum scale lines can also be easily read, simple scale divisions in display can be formed; therefore, these scale divisions with no scale numeral 50a formed on the minimum scale lines may be used. The present invention is formed as described above.

Fourth Embodiment

Referring to FIG. 7, explanation will be given on a fourth embodiment of the present invention. The present embodiment relates to scale divisions for a scale in which the line widths of the scale lines need to be the same from the viewpoint of scale precision or the like in the following manner. In the fourth embodiment, with respect to the scale divisions of the third embodiment shown in FIG. 3, the line width of the tip of the outer edge portions of the scale lines 32*a*, 33*a*, 35*a*, 37*a*, 38*a* and the scale lines having the scale values of 0, 1, 2, 3, 4, 5, 6, 7, 8, 9 and 10 cm is set to a length of 0.3 times as long as the line length of the scale line 32*a*, and is also set to the same line width as that of the scale lines 31*a*, 34*a*, 36*a* and 39*a*. In this manner, display methods between the scale lines 32*a*, 33*a*, 37*a*, 38*a* and the scale lines 31*a*, 34*a*, 36*a*, 39*a* are made different. In the case when these scale divisions are formed on the scale, even if the line width of the inside of the scale lines 32*a*, 33*a*, 37*a* and 38*a* is made thicker than the line width of the scale lines 31*a*, 34*a*, 36*a* and 39*a* as shown in the third embodiment, since the tip of the outer edge portion of the scale line for use in measurements is set to the same line width as that of the scale lines 31*a*, 34*a*, 36*a* and 39*a*, the scale precision is not lowered, and in the same manner as in the third embodiment, without the necessity of counting the minimum scale lines formed four by four, the respective minimum scale lines can be discriminated intuitively, and it becomes possible to easily read the scale values of the respective minimum scale lines. Moreover, in the present embodiment, the line widths of scale lines at each 5 mm interval, such as 5 mm, 15 mm or the like, scale lines at each 1 cm interval, such as 1 cm, 2 cm or the like, and scale lines at each 5 cm interval, such as 0 cm, 5 cm or the like, are set to the same line width as that of the scale lines 31*a*, 34*a*, 36*a* and 39*a*; therefore, the line widths of the tips of all the outer edge portions of scale lines are set to the same so that an easy-to-see state is available and the scale precision of all the scale lines can be uniformed; thus, this arrangement may be used. In the following embodiments also, in the case when the line widths of the tips of outer edge portions of scale lines need to be set to the same from the viewpoint of scale precision or the like, by designing scale divisions so as to have different line widths in one portion of the scale lines in this manner, it becomes possible to discriminate the respective minimum scale lines intuitively without causing degradation in the scale precision and also to easily read the scale values of the respective minimum scale lines; therefore, this arrangement may be used. The present invention is formed as described above.

Fifth Embodiment

Referring to FIG. 8, explanation will be given on a fifth embodiment of the present invention. The present embodiment relates to scale divisions for a liquid amount meter and an injection syringe, such as a measuring cylinder, a measuring cup or the like, that is made of a transparent material as a whole and measures the volume of a liquid, and is also designed as follows. A) Scale lines are formed on the scale main body 10 in the following manner. First, within a range of a scale value 0 ml to a scale value 50 ml, scale lines having the same line length are formed horizontally at each 2 ml interval in the scale value. Additionally, the scale values are formed in a descending order from the upper side to the lower side. Among these, the line length of the scale lines formed at each 10 ml interval with scale values of 0, 10, 20, 30, 40 and 50 ml is set to have a line length 1.4 times longer than that of scale lines formed at each 2 ml interval, in a manner so as to be extended in a right direction. Next, in the vicinity of the tip on the right side of each scale line at each 10 ml interval, a scale numeral 50*b* indicating the present scale value is put in a descending order from 50 ml to 0 ml from the upper side to the lower side of the scale main body 10. B) The scale line with the scale value of 0 ml is set as a starting point 20. C) The scale value interval that is desirably determined is set to 2 ml. D) From the starting point 20, temporary numbers are successively put one by one from 0 in an ascending order on respective scale lines formed at each 2 ml interval corresponding to a scale value interval desirably determined. E) In the vicinity of the tip on the right side of each of scale lines 32*a*, 33*a*, 37*a* and 38*a* with the numeral 2, 3, 7 or 8 set at the lowermost position of the temporary number, scale numerals 50*a* indicating the scale value of each of the scale lines are formed. In this manner, the scale numeral 50*a* is put onto each of the scale lines 32*a*, 33*a*, 37*a* and 38*a* serving as the minimum scale lines, with no scale numeral 50*a* being put onto each of the scale lines 31*a*, 34*a*, 36*a* and 39*a* also serving as the minimum scale lines; thus, the display methods between the scale lines 32*a*, 33*a*, 37*a*, 38*a* and the scale lines 31*a*, 34*a*, 36*a* and 39*a* are made mutually different. In the case when the scale divisions that make a difference between the scale lines 32*a*, 33*a*, 37*a*, 38*a* and the scale lines 31*a*, 34*a*, 36*a*, 39*a* are formed on a liquid amount meter, an injection syringe or the like, the respective minimum scale lines can be discriminated intuitively, by utilizing "4", "6", "14", "16" or the like of the scale numeral 50*a* formed on the second scale line and the third scale line counted in a direction from 0 in the scale value among the minimum scale lines formed four by four as a guide, without the necessity of counting the minimum scale lines formed four by four, and the scale values of the respective minimum scale lines can be easily read.

Moreover, since the scale numeral 50*a* is put on each of the scale line 32*a* and the scale line 33*a* adjacent to each other as well as on each of the scale line 37*a* and the scale line 38*a* adjacent to each other, the scale amount is easily confirmed as 2 ml from the difference of the scale numerals 50*a*, such as "4" and "6" as well as "14" and "16". Since the scale amount can be easily confirmed, the scale values of the scale lines 31*a*, 34*a*, 36*a* and 39*a* without the scale numerals 50*a* formed thereon can also be easily read. For example, although the scale line of 8 ml corresponding to the scale line 34*a* has no scale numeral 50*a* put thereon, the scale value of 8 ml can be easily confirmed by adding 2 ml of the scale amount to 6 ml corresponding to the scale line 33*a* having the scale numeral 50*a* put thereon. Moreover, since the scale numeral 50*a* is put on each of the scale lines 32*a*, 33*a*, 37*a* and 38*a*, the scale vales of the scale lines 31*a*, 34*a*, 36*a* and 39*a* can be easily read, without the necessity of confirming the scale amount as described earlier. For example, although no scale numeral 50*a* is put onto the scale line of 8 ml corresponding to the scale line 34*a*, it can be easily discriminated as the scale value of 8 ml since it is a scale line in the middle of 6 ml corresponding to the scale line 33*a* to which the scale numeral 50*a* is put and 10 ml to which the scale numeral is put. With this arrangement, even the scale value of each of the scale lines 31*a*, 34*a*, 36*a* and 39*a* to which no scale numeral 50*a* is put can be easily read. As in the case of the present embodiment, with respect to the scale value of a scale whose scale amount is other than 1, the scale value needs to be read by multiplying the scale amount by the number as to what number the minimum scale line in question corresponds to when counted in a direction of 0 in the scale value among the minimum scale lines formed four by four; however, in the case when the scale numerals are put onto the scale lines 32*a*, 33*a*, 37*a* and 38*a* serving as the minimum scale lines, the scale value can be easily read without the necessity of the above-mentioned tasks so that it is possible to provide a very convenient method. Moreover, in the present embodiment, the line lengths of the scale lines 32*a*, 33*a*, 37*a*, 38*a* and the scale lines 31*a*, 34*a*, 36*a*, 39*a* are set to the same; however, when the line length of the scale lines 32a, 33a, 37a and 38a is set to a line length 1.2 times longer than the line length of the scale lines 31a, 34a, 36a and 39a, the discrimination of the respective minimum scale lines and the reading of the scale values can be carried out more easily; therefore, this arrangement may be used (not shown).

Moreover, in the scale divisions of FIG. 8, the scale numerals (50a, 50b) are put in a descending order in a direction from the upper side to the lower side; however, in the case when these scale divisions are used for a scale for an injection syringe, the scale divisions of FIG. 8 are formed on the injection syringe main body, with an injection needle being located below, and moreover, when scale divisions in which the scale numerals (50a, 50b) of the scale divisions of FIG. 8 are formed in an ascending order in a direction from the upper side to the lower side on the injection syringe main body are formed in combination, with the injection needle being located above, at the time of filling a chemical liquid or the like, the scale numerals are not reversed, in both of the cases when the filling process is carried out with the injection needle facing upward and when the filling process is carried out with the injection needle facing downward, by viewing either of the scale divisions, and the filling process is easily carried out; therefore, two kinds of scale divisions of this type may be formed on the injection syringe. Furthermore, only either of the scale divisions of these two types may be formed on an injection syringe. Moreover, as shown in FIG. 9, a cutout 45 for erasing the middle portion of the scale line may be formed with a width of 0.3 times as long as the line length of the scale line 31a, at the same position of the scale lines of FIG. 8. By forming the cutout 45 on the scale lines and by carrying out a measurement or the like based upon a liquid surface appearing on the cutout 45, since the reading of the scale value is carried out with the liquid surface being sandwiched by the two scale lines on the two sides of the cutout 45, without the liquid surface being overlapped with the scale line, the visibility of the liquid surface can be improved in comparison with a normal measurement in which only one scale line is used and the reading of the scale value is easily carried out; therefore, the scale of this time may be used. Additionally, in the case when the scale divisions of FIG. 9 are formed on an injection syringe, together with the liquid surface of a chemical liquid, the end of a movable push member of the injection syringe on the chemical liquid side can be easily seen from the cutout 45; therefore, it becomes possible to appropriately fill the required amount of the chemical liquid or the like into the injection syringe. In this case, scale divisions in which the scale numerals (50a, 50b) of the scale divisions of FIG. 9 are put in an ascending order from the upper side to the lower side are formed on the injection syringe main body so as to make the injection needle located above; thus, since the scale numerals (50a, 50b) are not reversed even when the chemical liquid or the like is filled with the injection needle facing upward, this arrangement may be used. Moreover, in the scale divisions of FIG. 8 and FIG. 9, the intervals of the scale lines are made equal intervals; however, in the case when the intervals of the scale lines are altered in accordance with the shape of a container, the scale divisions may be utilized as scale divisions for a graduated glass in which the inner diameter of the container becomes smaller toward the lower side, and since the same effects as described above can be obtained, these scale divisions may be used (not shown). Furthermore, there are sometimes cases where the scale line of 0 in the scale value is not formed in a liquid amount meter, an injection syringe or the like, and in these cases, it is supposed that the addition of the temporary numbers is carried out, with an assumed scale line of 0 in the scale value being included (the same is true for the following embodiments). In the case when the temporary numbers are added, with the assumed scale line being included therein, and display methods between the scale lines 32a, 33a, 37a, 38a with the numeral 2, 3, 7 or 8 set at the lowermost position of the temporary number, and the scale lines 31a, 34a, 36a, 39a with the numeral 1, 4, 6 or 9 set at the lowermost position of the temporary number are made different, the respective minimum scale lines can be discriminated intuitively even when the scale line indicating 0 in the scale value is not formed, and the scale values of the respective minimum scale lines can be easily read (not shown). The present invention is formed as described above.

Sixth Embodiment

Figure 10:
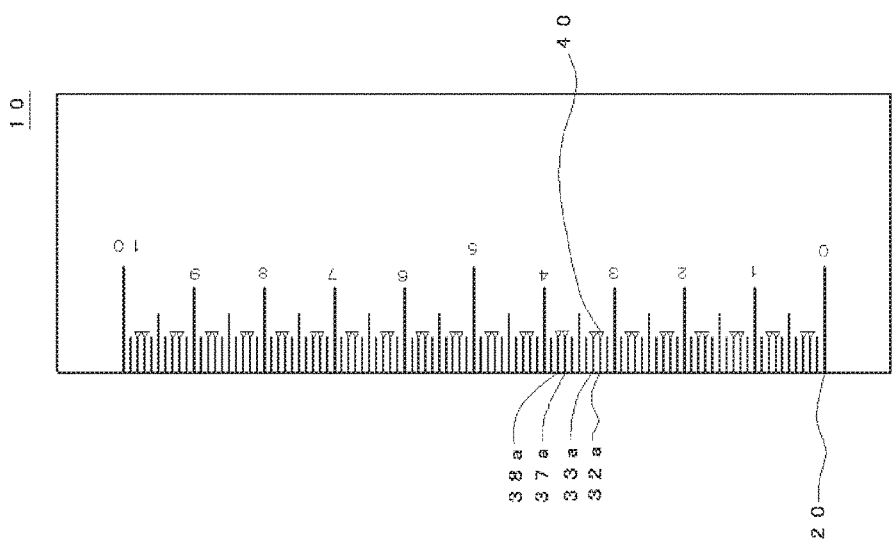
FIG. 10 is a plan view showing the entire scale in accordance with a sixth embodiment of the present invention.

Referring to FIG. 10, explanation will be given on a sixth embodiment of the present invention. The present embodiment relates to scale divisions of a scale for use in measuring the length or the like of an object, which is designed as follows. A) Scale lines are formed on the scale main body 10 by using A) in the first embodiment. B) The scale line with the scale value of 0 cm is set as a starting point 20. C) The scale value interval to be desirably determined is set at 1 mm. D) From the starting point 20, onto the scale lines formed at each 1 mm interval that is a scale value interval desirably set, temporary numbers are successively put one by one from 0 in an ascending order. E) To the tip of the inside of each of scale lines 32a, 33a, 37a and 38a with the numeral 2, 3, 7 or 8 set at the lowermost position of the temporary number, a triangular mark 40 is applied. In this manner, the triangular mark 40 is applied to each of the scale lines 32a, 33a, 37a and 38a serving as the minimum scale lines, while no triangular mark 40 is applied to scale line 31a, 34a, 36a and 39a that correspond to the minimum scale lines, with the numeral 1, 4, 6 or 9 set at the lowermost position of the added temporary number; thus, the display methods between the scale lines 32a, 33a, 37a, 38a and the scale lines 31a, 34a, 36a, 39a are made different. In the case when scale divisions that make a difference between the scale lines 32a, 33a, 37a, 38a and the scale lines 31a, 34a, 36a, 39a are formed on a scale, the triangular mark 40 is formed on the tip of the inside of each of the second and third scale lines when counted in a direction from 0 in the scale value among the minimum scale lines formed four by four, while no triangular mark 40 is formed on the tip of the inside of each of the first and fourth scale lines, and by carrying out a measurement or the like, while confirming the fact that the scale value of the second and third scale lines takes a numeral of 2, 3, 7 or 8 at the first decimal place below a decimal point in cm unit conversion, the respective minimum scale lines can be intuitively discriminated without the necessity of counting the minimum scale lines formed four by four, and the reading of the scale value of each of the minimum scale lines can be easily carried out. By using these scale divisions, the intuitive discrimination of the minimum scale line and the reading of the scale value can be easily carried out, and since by simply forming the triangular mark 40 onto each of the scale lines 32a, 33a, 37a and 38a, the line widths of all the minimum scale lines are the same, no adverse effects are given to the scale precision, and since the line lengths are the same, a scale with simple scale divisions in display can be provided. The present invention is designed as described above.

Seventh Embodiment

Figure 11:
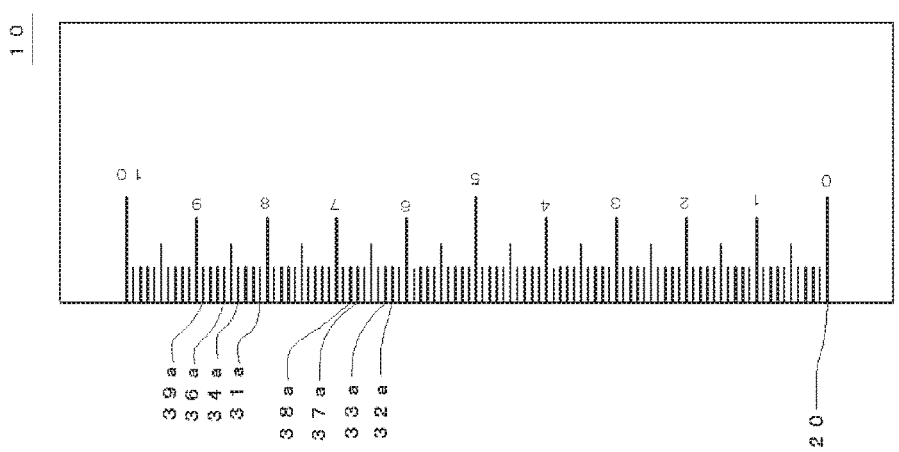
FIG. 11 is a plan view showing the entire scale in accordance with a seventh embodiment of the present invention.

Referring to FIG. 11, explanation will be given on a seventh embodiment of the present invention. The present embodiment relates to scale divisions of a scale for use in measuring the length or the like of an object, which is designed as follows. A) Scale lines are formed on the scale main body 10 by using A) in the first embodiment. B) The scale line with the scale value of 0 cm is set as a starting point 20. C) The scale value interval to be desirably determined is set at 1 mm. D) From the starting point 20, onto the scale lines formed at each 1 mm interval that is a scale value interval desirably determined, temporary numbers are successively put one by one from 0 in an ascending order. E) The line width of each of the scale lines 32*a*, 33*a*, 37*a* and 38*a* with the numeral 2, 3, 7 or 8 set at the lowermost position of the temporary number is formed into a line width 2.5 times wider than the line width of each of the scale lines 31*a*, 34*a*, 36*a* and 39*a* with the numeral 1, 4, 6 or 9 set at the lowermost position of the temporary number. In this manner, display methods are made different between the scale lines 32*a*, 33*a*, 37*a*, 38*a* and the scale lines 31*a*, 34*a*, 36*a*, 39*a*, by making the line width of the scale lines 32*a*, 33*a*, 37*a*, 38*a* serving as the minimum scale lines thicker than the line width of the scale lines 31*a*, 34*a*, 36*a*, 39*a* also serving as the minimum scale lines. In the case when scale divisions that make a difference between the scale lines 32*a*, 33*a*, 37*a*, 38*a* and the scale lines 31*a*, 34*a*, 36*a*, 39*a* are formed on a scale, the line width of the second scale line and the third scale line when counted in a direction from 0 in the scale value among the minimum scale lines formed four by four becomes thicker than the line width of the first and fourth scale lines, and by carrying out a measurement or the like, while confirming the fact that the scale value of the second and third scale lines takes the numeral 2, 3, 7 or 8 set at the first decimal place below a decimal point in cm unit conversion, the respective minimum scale lines can be intuitively discriminated without the necessity of counting the minimum scale lines formed four by four, and the reading of the scale value of each of the minimum scale lines can be easily carried out. By using these scale divisions, the intuitive discrimination of the minimum scale line and the reading of the scale value can be easily carried out, and since the line lengths of all the minimum scale lines are set to the same length, with only the line widths being made different, a scale with simple scale divisions in display can be provided. Additionally, in the case when the line length of the scale lines 32*a*, 33*a*, 37*a* and 38*a* is made longer than the line length of the scale lines 31*a*, 34*a*, 36*a* and 39*a*, since the discrimination of the minimum scale line and the reading of the scale value can be more easily carried out, this arrangement may be used (not shown). Moreover, for example, by increasing the line width of each of the scale lines 32*a*, 33*a*, 37*a* and 38*a* from the tip of the outer edge toward the opposite end so as to have a shape different from that of each of the scale lines 31*a*, 34*a*, 36*a* and 39*a*, the display methods of the scale lines may be made different; thus, since the discrimination of the respective minimum scale lines can be intuitively carried out and the reading of the scale value of the respective minimum scale lines can be more easily carried out, this arrangement may be used (not shown). The present invention is designed as described above.

Eighth Embodiment

Figure 12:
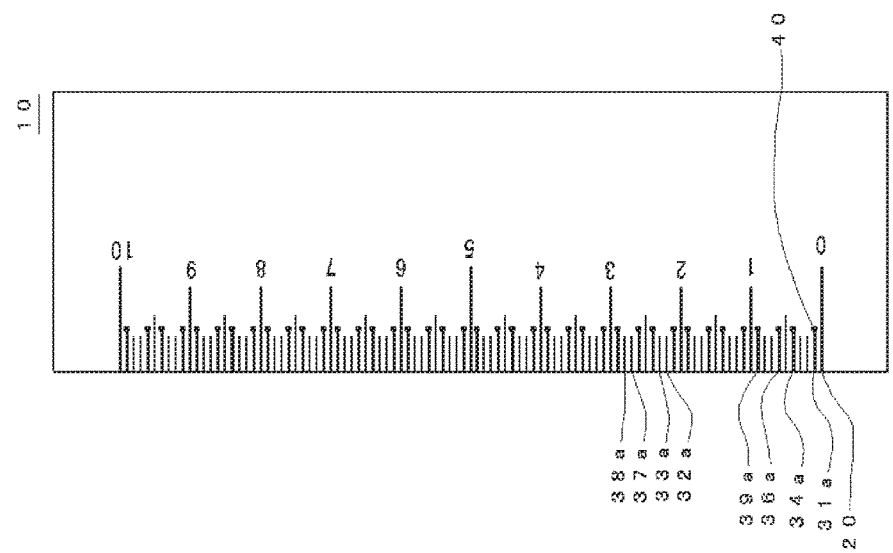
FIG. 12 is a plan view showing the entire scale in accordance with an eighth embodiment of the present invention.

Referring to FIG. 12, explanation will be given on an eighth embodiment of the present invention. The present embodiment relates to scale divisions of a scale for use in measuring the length or the like of an object. A) Scale lines are formed on the scale main body 10 by using A) in the first embodiment. B) The scale line with the scale value of 0 cm is set as a starting point 20. C) The scale value interval to be desirably determined is set at 1 mm. D) From the starting point 20, onto the scale lines formed at each 1 mm interval that is a scale value interval desirably determined, temporary numbers are successively put one by one from 0 in an ascending order. E) The line length and the line width of each of the scale lines 31*a*, 34*a*, 36*a* and 39*a* with the numeral 1, 4, 6 or 9 set at the lowermost position of the temporary number are formed into a line length 1.2 times longer than the line length of each of the scale lines 32*a*, 33*a*, 37*a* and 38*a* with the numeral 2, 3, 7 or 8 set at the lowermost position of the temporary number, and a line width that is set to the same as the line width of the scale line at each 1 cm interval, and onto the tip of the inside of each of the scale lines 31*a*, 34*a*, 36*a* and 39*a*, a round mark 40 having a diameter which is two times larger than the line width of the corresponding scale line, and the inside of which is painted in black is put. In this manner, display methods are made different between the scale lines 31*a*, 34*a*, 36*a* and 39*a* and the scale lines 32*a*, 33*a*, 37*a* and 38*a*, by making the line length of the scale lines 31*a*, 34*a*, 36*a* and 39*a* serving as the minimum scale lines longer than the line length of the scale lines 32*a*, 33*a*, 37*a* and 38*a* also serving as the minimum scale lines, with the line width being also made thicker in the same manner, and by putting the round mark 40 onto the tip of the inside of each of the scale lines 31*a*, 34*a*, 36*a* and 39*a*. In the case when scale divisions by which the scale lines 31*a*, 34*a*, 36*a*, 39*a* and the scale lines 32*a*, 33*a*, 37*a*, 38*a* are made different in this manner are formed on a scale, the line width of the first scale line and the fourth scale line when counted in a direction from 0 in the scale value among the minimum scale lines formed four by four becomes, for example, thicker than the line width of the second and third scale lines, and by carrying out a measurement or the like, while confirming the fact that the scale value of the first and fourth scale lines takes a numeral 1, 4, 6 or 9 set at the first decimal place below a decimal point in cm unit conversion, the respective minimum scale lines can be intuitively discriminated without the necessity of counting the minimum scale lines formed four by four, and the reading of the scale value of each of the minimum scale lines can be easily carried out. By using these scale divisions, the reading of the scale value of each of the minimum scale lines can be easily carried out, and since the line width of each of the scale lines 31*a*, 34*a*, 36*a* and 39*a* that are adjacent to the scale line at each 5 mm interval or each 1 cm interval is made thicker or the like, the resulting scale makes it possible to in particular easily carry out the reading of the scale value in the vicinity of the scale line at each 5 mm interval or each 1 cm interval. The present invention is designed as described above.

Ninth Embodiment

Referring to FIG. 13, explanation will be given on a ninth embodiment of the present invention. The present embodiment relates to scale divisions of a scale for use in measuring the length or the like of an object in which scale lines on the plus side and the minus side are formed on the right side and left side centered on the scale line of 0 in the scale value. A) Scale lines are formed on one side edge of the scale main body 10 in the following manner. On the scale main body 10, scale lines having the same line length in the scale lines are formed, with the minus side being on the left side and the plus side being on the right side, within a 5 cm range in the scale values, at each 1 mm interval in the scale value from the scale value 0 cm. Among these, the line length of scale lines at each 5 mm interval corresponding to minus 5, 15, 25, 35 and 45 mm and plus 5, 15, 25, 35 and 45 mm in the scale values is set to a line length 1.5 times longer than that of the scale line formed at each 1 mm interval. Next, the line length and line width of the scale lines at each 1 cm interval corresponding to minus 1, 2, 3, and 4 cm and plus 1, 2, 3, and 4 cm in the scale value are set to a line length 1.5 times longer than that of the scale lines at each 5 mm interval, and a line width 2.5 times longer than that thereof, and a scale numeral 50*b* indicating the scale value of each of the scale lines is formed at the vicinity of the tip inside the corresponding scale line at each 1 cm interval. Next, the line length and line width of the scale lines at each 5 cm interval corresponding to minus 5 cm, 0 cm and plus 5 cm in the scale value are set to a line length 1.2 times longer than that of the scale lines at each 1 cm interval, and a line width that is set to the same, and a scale numeral 50*b* indicating the scale value of each of the scale lines is formed at the vicinity of the tip inside the corresponding scale line at each 5 cm interval. B) The scale line with the scale value of 0 cm is set as a starting point 20. C) The scale value interval to be desirably determined is set at 1 mm. D) From the starting point 20, onto the scale lines formed at each 1 mm interval that is a scale value interval desirably determined, temporary numbers are successively put one by one from 0 in an ascending order, in two directions on the minus side and plus side in the scale value. E) The line length and the line width of each of the scale lines 32*a*, 33*a*, 37*a* and 38*a* with the numeral 2, 3, 7 or 8 set at the lowermost position of the temporary number are formed into a line length 1.2 times longer than the line length of each of the scale lines 31*a*, 34*a*, 36*a* and 39*a* with the numeral 1, 4, 6 or 9 set at the lowermost position of the temporary number, and a line width that is the same as that of the scale line at each 1 cm interval, and onto the tip of the inside of each of the scale lines 32*a*, 33*a*, 37*a* and 38*a*, a round mark 40 having a diameter which has two times larger than the line width of the scale line, and the inside of which is painted in black, and a scale numeral 50*a* of each of "2", "3", "7" and "8" corresponding to a numeral at the first decimal place below a decimal point in cm unit conversion of the scale value of each of the scale lines are also formed. In this manner, display methods are made different between the scale lines 32*a*, 33*a*, 37*a*, 38*a* and the scale lines 31*a*, 34*a*, 36*a*, 39*a*, by making the line length and the line width of the scale lines 32*a*, 33*a*, 37*a* and 38*a* serving as the minimum scale lines longer than the line length of 31*a*, 34*a*, 36*a* and 39*a* also serving as the minimum scale lines, with the line width being also made thicker in the same manner, and by putting the round mark 40 and the scale numeral 50*a* onto the tip of the inside of each of the scale lines 32*a*, 33*a*, 37*a* and 38*a*.

In the case when scale divisions that make a difference between the scale lines 32*a*, 33*a*, 37*a*, 38*a* and the scale lines 31*a*, 34*a*, 36*a*, 39*a* are made different are formed on a scale, the line width of the second scale line and the third scale line when counted in a direction from 0 in the scale value among the minimum scale lines formed four by four becomes, for example, thicker than the line width of the first and fourth scale lines, and by carrying out a measurement or the like, while confirming the fact that the scale value of the second and third scale lines takes a numeral of 2, 3, 7 or 8 set at the first decimal place below a decimal point in cm unit conversion, with the scale numeral 50*a* formed thereon serving as a guide, the respective minimum scale lines can be intuitively discriminated without the necessity of counting the minimum scale lines formed four by four, and the reading of the scale value of each of the minimum scale lines can be easily carried out. By using these scale divisions in which the scale values are continuously formed from the minus side toward the plus side also, the reading of the scale value of each of the minimum scale lines can be easily carried out. The present invention is designed as described above.

Tenth Embodiment

Referring to FIG. 14, explanation will be given on a tenth embodiment of the present invention. The present embodiment relates to scale divisions of a scale for use in measuring the length or the like of an object in which scale lines indicating the plus scale values are formed in right and left directions of the scale line with 0 in the scale value, which is designed as follows. A) Scale lines are formed on one side edge of the scale main body 10 in the following manner. On the scale main body 10, scale lines having the same line length are formed in the right and left two directions from the scale line of 0 cm in the scale value, at each 1 mm interval in the scale values, within a range from 0 cm in the scale value to 5 cm in the scale value. Among these, the line length of scale lines at each 5 mm interval corresponding to 5, 15, 25, 35 and 45 mm in the scale value in the two directions is set to a line length 1.5 times longer than that of the scale lines formed at each 1 mm interval. Next, the line length and line width of the scale lines at each 1 cm interval corresponding to 1, 2, 3, and 4 cm in the scale value in the two directions are set to a line length 1.5 times longer than the line length of the scale lines formed at each 5 mm interval, and a line width 2.5 times wider than the line width thereof, and a scale numeral 50*b* indicating the scale value of each of the scale lines is formed at the vicinity of the tip inside the corresponding scale line at each 1 cm interval. Next, the line length and line width of the scale lines at each 5 cm interval corresponding to 0 cm and 5 cm in the scale value in both of the directions, are set to a line length 1.2 times longer than that of the scale lines at each 1 cm interval, and a line width that is set to the same, and a scale numeral 50*b* indicating the scale value of each of the scale lines is formed at the vicinity of the tip inside the corresponding scale line at each 5 cm interval. B) The scale line with the scale value of 0 cm is set as a starting point 20. C) The scale value interval to be desirably determined is set at 1 mm. D) From the starting point 20, onto the scale lines formed at each 1 mm interval that is a scale value interval desirably determined in two directions, temporary numbers are successively put one by one from 0 in an ascending order. E) The line length of each of the scale lines 32*a*, 33*a*, 37*a* and 38*a* with the numeral 2, 3, 7 or 8 set at the lowermost position of the temporary number is formed into a line width 1.2 times longer than the line length of each of the scale lines 31*a*, 34*a*, 36*a* and 39*a* with the numeral 1, 4, 6 or 9 set at the lowermost position of the temporary number, with the line width thereof being set to the same as that of the scale line formed at each 1 cm interval, and onto the tip of the inside of each of the scale lines 32*a*, 33*a*, 37*a* and 38*a*, a square mark 40 and a scale numeral 50*a* of each of "2", "3", "7" and "8" corresponding to a numeral at the first decimal place below a decimal point in cm unit conversion of the scale value of each of the scale lines are also formed. In this manner, display methods are made different between the scale lines 32*a*, 33*a*, 37*a*, 38*a* and the scale lines 31*a*, 34*a*, 36*a*, 39*a*, by making the line length and the line width of the scale lines 32*a*, 33*a*, 37*a* and 38*a* corresponding to the minimum scale lines longer than the line length of 31*a*, 34*a*, 36*a* and 39*a* also serving as the minimum scale lines, with the line width being made thicker, and by putting the square mark 40 and the scale numeral 50*a* onto the tip of the inside of each of the scale lines 32*a,* 33*a,* 37*a* and 38*a.*

In the case when scale divisions that make a difference between the scale lines 32*a,* 33*a,* 37*a,* 38*a* and the scale lines 31*a,* 34*a,* 36*a,* 39*a* in this manner are formed on a scale, the line width of the second scale line and the third scale line when counted in a direction from 0 in the scale value among the minimum scale lines formed four by four becomes thicker than the line width of the first and fourth scale lines, and by carrying out a measurement or the like, while confirming the fact that the scale value of the second and third scale lines takes the numeral 2, 3, 7 or 8 set at the first decimal place below a decimal point in cm unit conversion, with the scale numeral 50*a* formed thereon serving as a guide, the respective minimum scale lines can be intuitively discriminated without the necessity of counting the minimum scale lines formed four by four, and the reading of the scale value of each of the minimum scale lines can be easily carried out. By using these scale divisions, even in the case of a scale on which scale lines of the scale values on the plus side are formed on right and left two sides with the scale line of 0 in the scale value serving as a starting point, the reading of the scale value in the minimum scale lines can be easily carried out. The present invention is designed as described above.

Eleventh Embodiment

Referring to FIG. 15, explanation will be given on an eleventh embodiment of the present invention. The present embodiment relates to scale divisions of a tape measure in which scale lines are formed on two sides of a scale main body, and which is designed as follows. A) Scale lines are formed on two side edges of the scale main body 10, at each 1 mm interval in the scale value within a range from 0 cm in the scale value to 10 cm in the scale value. Additionally, the scale values are set so as to make the scale line on the left side end set to be 0 in the scale value. Among these, the line length of scale lines formed at each 5 mm interval, with the scale values of 5, 15, 25, 35, 45, 55, 65, 75, 85, and 95 mm, is set to a line length 1.5 times longer than that of the scale lines formed at 1 mm interval. Next, the line length and line width of scale lines formed at each 1 cm interval, with the scale values of 1, 2, 3, 4, 6, 7, 8 and 9 cm, are set to a line length 1.5 times longer than the line length of the scale lines formed at each 5 mm interval, and a line width that is set to 2.5 times wider than that, and scale numerals 50*b* indicating scale values of the respective scale lines are formed in the vicinity of a tip inside the scale line on the upper side and the scale line on the lower side. Next, the line length and line width of scale lines formed at each 5 cm interval, with the scale values of 0 cm, 5 cm and 10 cm, are set to a line length 1.2 times longer than the line length of the scale lines formed at each 1 cm interval, and a line width that is set to the same, and scale numerals 50*b* indicating scale values of the respective scale lines are formed in the vicinity of a tip inside the scale line on the two side edges. B) The scale line with the scale value of 0 cm is set as a starting point 20. C) The scale value interval to be desirably determined is set at 1 mm. D) From the starting point 20, onto the scale lines formed at each 1 mm interval that is a scale value interval desirably determined on two side edges, temporary numbers are successively put one by one from 0 in an ascending order. E) The line length and line width of the scale lines 32*a,* 33*a,* 37*a* and 38*a* with the numeral 2, 3, 7 or 8 set at the lowermost position of the temporary number are set to a line length 1.2 times longer than the line length of the scale lines 31*a,* 34*a,* 36*a* and 39*a* with the numeral 1, 4, 6 or 9 set at the lowermost position of the temporary number, and a line width that is set to the same as that of the scale line at each 1 cm unit interval, and onto the tip of the inside of each of the scale lines 32*a,* 33*a,* 37*a* and 38*a,* a round mark 40 having a diameter which is two times wider than the line width of the corresponding scale line, and the inside of which is painted in black, and a scale numeral 50*a* of each of "2", "3", "7" and "8" corresponding to a numeral at the first decimal place below a decimal point in cm unit conversion of the scale value of each of the scale lines are formed. F) Next, with the scale value interval to be desirably determined being set at 10 mm, temporary numbers are successively added. G) From the starting point 20, onto the scale lines formed at each 10 mm interval that is a scale value interval desirably determined, temporary numbers are successively put one by one from 0 in an ascending order. H) The scale numeral 50*b* of each of the scale lines 33*b* and 38*b* with the numeral 3 or 8 set at the lowermost position of the temporary number is surrounded by a round line. In this manner, the scale numeral 50*b* of each of the scale lines 33*b* and 38*b* at each 1 cm interval is surrounded by the round line, while the scale numeral 50*b* of each of the scale lines 31*b,* 32*b,* 34*b,* 36*b,* 37*b* and 39*b* with the numeral 1, 2, 4, 6, 7 or 9 set at the lowermost position of the temporary number is not surrounded by the round line; thus, the display methods between the scale lines 33*b,* 38*b* and the scale lines 31*b,* 32*b,* 34*b,* 36*b,* 37*b,* 39*b* are made different.

In this manner, by surrounding "3" and "8" corresponding to the scale numerals 50*b* of the scale lines 33*b* and 38*b* by the round line, the respective scale lines of the scale lines 33*b* and 38*b* can be intuitively discriminated. Moreover, since the respective scale lines of the scale lines 33*b* and 38*b* can be intuitively discriminated, the respective scale lines of the scale lines 31*b,* 32*b,* 34*b,* 36*b,* 37*b* and 39*b* in the vicinity thereof can also be intuitively discriminated. As described above, in the case when these scale divisions are installed on a tape measure, since the respective scale lines of the scale lines 31*b,* 32*b,* 33*b,* 34*b,* 36*b,* 37*b,* 38*b* and 39*b* can be intuitively discriminated, a measuring process or the like can be easily carried out. Moreover, since the scale numerals 50*b* of "3" and "8" each surrounded by a round line serve as a guide, the scale positions of the entire scale lines in the cm unit interval can be easily confirmed. Furthermore, the line length and line width of scale lines 32*a,* 33*a,* 37*a* and 38*a* serving as the minimum scale lines are set to a line length longer than the line length of the scale lines 31*a,* 34*a,* 36*a* and 39*a* also serving as the minimum scale lines, and a line width that is made thicker than those scale lines, and by forming the mark 40 and the scale numeral 50*a* on a tip inside the scale line of each of the scale lines 32*a,* 33*a,* 37*a* and 38*a,* the display methods between the scale lines 32*a,* 33*a,* 37*a,* 38*a* and the scale lines 31*a,* 34*a,* 36*a,* 39*a* are made different. By installing these scale divisions that make a difference between the scale lines 32*a,* 33*a,* 37*a,* 38*a* and the scale lines 31*a,* 34*a,* 36*a,* 39*a* on a tape measure, the line width of the second and third scale lines when counted in a direction from 0 in the scale value among the minimum scale lines formed four by four is thicker in comparison with the line width of the first and fourth scale lines, and by confirming the fact that the scale value of the second and third scale lines takes the numeral 2, 3, 7 or 8 set at the first decimal place below a decimal point in cm unit conversion, a measurement or the like is carried out by using the scale numeral 50*a* as a guide; thus, without the necessity of counting the minimum scale lines formed four by four, it becomes possible to intuitively discriminate the respective minimum scale lines, and also to easily read the respective scale values of the minimum scale lines. By using these scale divisions, the intuitive discrimination of the scale lines 31b, 32b, 33b, 34b, 36b, 37b, 38b and 39b formed in a cm unit can be carried out on the scale on which scale lines are formed on the two edge sides of the scale main body; therefore, a measurement or the like can be easily carried out and the reading of the scale values of the minimum scale lines can also be easily executed. Additionally, the present embodiment relates to scale divisions of a tape measure, and for convenience of explanation, explanation has been given by exemplifying a short scale of 0 to 10 cm. The present invention is designed as described above.

Twelfth Embodiment

Referring to FIG. 16, explanation will be given on a twelfth embodiment of the present invention. The present embodiment relates to scale divisions of a scale for use in measuring the length of an object, which make respective line lengths in the minimum scale lines successively different from one another, as shown in Patent Document 1 explained as follows. A) Scale lines are formed on the scale main body 10 in the same manner as in A) of the first embodiment. B) The scale line with the scale value of 0 cm is set as a starting point 20. C) The scale value interval to be desirably determined is set at 1 mm. D) From the starting point 20, onto the scale lines formed at each 1 mm interval that is a scale value interval desirably determined, temporary numbers are successively put one by one from 0 in an ascending order. E) The line length of each of the scale lines 31a, 32a, 33a and 34a with the numeral 1, 2, 3 or 4 at the lowermost position of the temporary number is made successively shorter within a range in which it does not exceed the line length of the scale line 35a with the numeral 5 at the lowermost position of the temporary number. F) The line length of each of the scale lines 36a, 37a, 38a and 39a with the numeral 6, 7, 8 or 9 set at the lowermost position of the temporary number is made successively longer within a range in which it does not exceed the line length of the scale line 35a. G) The line width of each of the scale lines 32a, 33a, 37a and 38a is set to the same as the line width of the scale line at each 1 cm interval, and onto the tip of the inside of each of the scale lines 32a, 33a, 37a and 38a, a round mark 40 having a diameter which is two times wider than the line width of the corresponding scale line, and the inside of which is painted in black, is put. In this manner, in the scale divisions in which the respective lengths of the minimum scale lines are successively made different, the line width of the scale lines 32a, 33a, 37a and 38a is made thicker than the line width of the scale lines 31a, 34a, 36a and 39a, and by forming the mark 40 on the tip of the inside the scale lines 32a, 33a, 37a and 38a, the display methods between the scale lines 32a, 33a, 37a, 38b and the scale lines 31a, 34a, 36a, 39a are made different. By installing these scale divisions that make a difference between the scale lines 32a, 33a, 37a, 38a and the scale lines 31a, 34a, 36a, 39a on a scale, the line width of the second and third scale lines when counted in a direction from 0 in the scale value among the minimum scale lines formed four by four is thicker in comparison with the line width of the first and fourth scale lines, and by confirming the fact that the scale value of the second and third scale lines takes the numeral 2, 3, 7 or 8 set at the first decimal place below a decimal point in cm unit conversion, a measurement or the like is carried out; thus, without the necessity of counting the minimum scale lines formed four by four, it becomes possible to intuitively discriminate the respective minimum scale lines, and also to easily read the respective scale values of the minimum scale lines. By using these scale divisions, the reading of the scale values of the minimum scale lines can be easily executed, and since the line lengths of the minimum scale lines are formed into a valley shape centered on the scale line at each 5 mm interval, the scale value in particular in the vicinity of the scale line at each 5 mm interval can be easily read. Moreover, in the case when a scale numeral corresponding to "2", "3", "7" or "8" that is the numeral at the first decimal place below a decimal point in cm unit conversion of the scale value of the corresponding scale line is formed in the vicinity of a tip inside of each of the scale lines 32a, 33a, 37a and 38a, the reading of the scale value of the minimum scale lines can be more easily carried out so that this arrangement may be used (not shown). The present invention is designed as described above.

Thirteenth Embodiment

Referring to FIG. 17, explanation will be given on a thirteenth embodiment of the present invention. The present embodiment relates to scale divisions of a setting part for a feeding scale or the like of a lathe, which is designed as follows. A) Scale lines are formed on one side edge of the scale main body 10 in the following manner. On the scale main body 10, scale lines having the same line length in the scale lines are formed at each 0.02 cm interval in the scale values, within a range from 0 cm in the scale value to 1.0 cm in the scale value. Additionally, the scale values are supposed to be formed in an ascending order from the left side to the right side. Next, the line length and the line width of scale lines at each 0.1 cm interval with the scale values corresponding to 0.1, 0.2, 0.3, 0.4, 0.6, 0.7, 0.8 and 0.9 cm in the scale value are set to a line length 2.5 times longer than that of the scale lines formed at each 0.02 cm interval, with the scale width being also set to 2.5 times wider than that, and a scale numeral 50b indicating the scale value of each of the scale lines is formed at the vicinity of the tip inside the corresponding scale line at each 0.1 cm interval. Next, the line length and line width of the scale lines at each 0.5 cm interval corresponding to 0, 0.5 and 1.0 cm in the scale value are set to a line length 1.2 times longer than that of the scale lines at each 0.1 cm interval, and a line width that is set to the same, and a scale numeral 50b indicating the scale value of each of the scale lines is formed at the vicinity of the tip inside the corresponding scale line at each 0.5 cm interval.

B) The scale line with the scale value of 0 cm is set as a starting point 20. C) The scale value interval to be desirably determined is set at 0.02 cm. D) From the starting point 20, onto the scale lines formed at each 0.02 cm interval that is a scale value interval desirably determined, temporary numbers are successively put one by one from 0 in an ascending order. E) The line length and line width of the scale lines 32a, 33a, 37a and 38a, with the numeral 2, 3, 7 or 8 set at the lowermost position of the temporary number, are set to a line length 1.2 times longer than the line length of each of the scale lines 31a, 34a, 36a and 39a with the numeral 1, 4, 6 or 9 set at the lowermost position of the temporary number, and a line width that is set to the same as the line width of the scale line at each 0.1 cm interval, and onto the tip of the inside of each of the scale lines 32a, 33a, 37a and 38a, a round mark 40 which has a diameter two times larger than the line width of the scale line and the inside of which is painted in black is formed, and a scale numeral 50a of each of "4" and "6" corresponding to a numeral at second decimal place below a decimal point in cm unit conversion of the scale value of the scale lines is also formed. In this manner, display methods are made different between the scale lines 32a, 33a, 37a, 38a and the scale lines 31a, 34a, 36a, 39a, by making the line length of the scale lines 32a, 33a, 37a and 38a serving as the minimum scale lines longer than the line length of the scale lines 31a, 34a, 36a and 39a also serving as the minimum scale lines, with the line width being made thicker, and by putting the round mark 40 and the scale numeral 50a onto the tip of the inside of each of the scale lines 32a, 33a, 37a and 38a. In the case when scale divisions that make a difference between the scale lines 32a, 33a, 37a, 38a and the scale lines 31a, 34a, 36a, 39a in this manner are formed on a setting part, such as a feeding scale of a lathe, the line width of the second scale line and the third scale line when counted in a direction from 0 in the scale value among the minimum scale lines formed four by four becomes thicker than the line width of the first and fourth scale lines, and by carrying out a measurement or the like, while confirming the fact that the scale value of the second and third scale lines takes the numeral 4 or 6 at the second decimal place below a decimal point in cm unit conversion, with the scale numeral 50a formed thereon serving as a guide, the respective minimum scale lines can be intuitively discriminated without the necessity of counting the minimum scale lines formed four by four, and the reading of the scale value of each of the minimum scale lines can be easily carried out. Moreover, in the present embodiment, by forming "4" and "6" corresponding to the scale numerals 50a onto the scale lines 32a, 33a, 37a and 38a, the reading of the scale values of the scale lines 32a, 33a, 37a and 38a can be more easily carried out in comparison with the case in which the scale numerals 50a are not formed. Moreover, since the scale numerals 50a corresponding to "4" and "6" indicating 0.04 cm and 0.06 cm are formed on the scale lines 32a and 33a that are scale lines adjacent to each other as well as on the scale lines 37a and 38a adjacent to each other, it is possible to easily confirm that a scale amount is 0.02 cm. Since the fact that the scale amount is 0.02 cm is confirmed in this manner, the scale values of the scale lines 31a, 34a, 36a and 39a can be easily read by adding or subtracting the scale amount of 0.02 cm to or from the scale numeral 50a of the scale lines 32a, 33a, 37a and 38a, in comparison with the case in which no scale numeral 50a is installed, even in the case of the scale lines 31a, 34a, 36a and 39a without the scale numerals 50a corresponding to the adjacent scale lines 32a, 33a, 37a and 38a. When these scale divisions are used for a setting part, such as a feeding scale of a lathe, the scale setting can be quickly carried out accurately. The present invention is designed as described above.

Fourteenth Embodiment

Referring to FIG. 18, explanation will be given on a fourteenth embodiment of the present invention. The present embodiment relates to scale divisions for a pressure gauge which is designed as follows. A) Scale lines are formed on a round scale main body 10 in a dial shape in the following manner. First, from a point 0.6 times as long as the radius of the scale main body 10 apart from the center of the scale main body 10 radially outward, scale lines having a line length 0.12 times as long as the radius of the scale main body 10 are formed at each 0.01 MPa scale value interval within a range from a scale value 0 MPa to a scale value 0.6 MPa. Additionally, the scale values are set in an ascending order in clockwise. Next, the line length and line width of the scale lines at each 0.05 MPa interval in the scale values of 0, 0.05, 0.10, 0.15 or the like, are set to a line length that is 2 times longer than that of the scale line at each 0.01 MPa interval and extends outward, and a line width that is set to 2.5 times as long as the line width thereof, and scale numerals 50b indicating the scale values of the respective scale lines are formed at the vicinity of the tip outside the corresponding scale line at each 0.05 MPa interval. B) The scale line with the scale value of 0 MPa is set as a starting point 20. C) The scale value interval to be desirably determined is set at 0.01 MPa. D) From the starting point 20, onto the scale lines formed at each 0.01 MPa interval that is a scale value interval desirably determined, temporary numbers are successively put one by one from 0 in an ascending order. E) The line length and line width of each of the scale lines 32a, 33a, 37a and 38a with the numeral 2, 3, 7 or 8 set at the lowermost position of the temporary number are formed into a line length that is 1.5 times longer than the line length of each of the scale lines 31a, 34a, 36a and 39a with the numeral 1, 4, 6 or 9 set at the lowermost position of the temporary number, and extends long outward and a line width that is the same as the line width of the scale line at each 0.05 MPa interval, and onto the tip of the outside of each of the scale lines 32a, 33a, 37a and 38a, a round mark 40 which has a diameter two times larger than the line width of the scale line and the inside of which is colored in black is formed. F) Next, temporary numbers are again put, with the scale value interval that is desirably determined being set to 0.05 MPa. G) From the starting point 20, onto the scale lines formed at each 0.05 MPa interval that is desirably determined, the temporary numbers are successively put one by one from 0 in an ascending order. H) The scale numeral 50b of each of the scale lines 32b, 33b, 37b and 38b with the numeral 2, 3, 7 or 8 set at the lowermost position of the temporary number is surrounded by a square line. In this manner, by surrounding the scale numeral 50b of each of the scale lines 32b, 33b, 37b and 38b corresponding to the scale line at each 0.05 MPa interval with the square line, without surrounding the scale numeral 50b of each of the scale lines 31b, 34b, 36b and 39b with the square line, the display methods of the scale lines 32b, 33b, 37b and 38b and the scale lines 31b, 34b, 36b and 39b are made different from each other. In this manner, by surrounding each of "0.10", "0.15", "0.35" and "0.40" corresponding to the scale numerals 50b of the scale lines 32b, 33b, 37b and 38b with the square line, it becomes possible to intuitively discriminate the scale lines of the scale lines 32b, 33b, 37b and 38b. Moreover, by allowing the respective scale lines of the scale lines 32b, 33b, 37b and 38b to be discriminated intuitively, the respective scale lines of the scale lines 31b, 34b, 36b and 39b that are adjacent thereto can also be intuitively discriminated. As described above, by installing these scale divisions on a pressure gauge, since the respective scale lines of the scale lines 31b, 32b, 33b, 34b, 36b, 37b, 38b and 39b are intuitively discriminated, measurements or the like can be easily carried out. Moreover, by surrounding the scale numeral 50b such as "0.10" and "0.15" adjacent to each other at a 0.05 MPa unit interval with the square line, the positions of the scale numerals 50b relating to "0.10", "0.15" or the like can be easily confirmed.

Furthermore, since the scale numerals 50b of "0.10" and "0.15" of the scale lines 32b and 33b are located in the center positions of "0.05", "0.10", "0.15" and "0.20" corresponding to the scale numerals 50b of the scale lines 31b, 32b, 33b and 34b, and since the scale numerals 50b of "0.35" and "0.40" of the scale lines 37b and 38b are also located in the center positions of "0.30", "0.35", "0.40" and "0.45" corresponding to the scale numerals 50b of the scale lines 36b, 37b, 38b and 39b, the positions of the scale numerals 50b relating to "0.10", "0.15" and the like can be easily confirmed. Further, by using the scale numerals 50b corresponding to "0.10", "0.15", "0.35" and "0.40" each surrounded by this square line as a guide, the entire scale positions of the scale lines at a 0.05 MPa unit interval can be easily confirmed. Moreover, with respect to the minimum scale lines also, the line length and line width of the scale lines 32a, 33a, 37a and 38a serving as the minimum scale lines are set to a line length longer than that of the scale lines 31a, 34a, 36a and 39a also serving as the minimum scale lines, and a line width thicker than that thereof, with the mark 40 being put on the tip outside each of the scale lines 32a, 33a, 37a and 38a; thus, the display methods between the scale lines 32a, 33a, 37a, 38a and the scale lines 31a, 34a, 36a, 39a are made different from each other. In this manner, by installing these scale divisions in which the scale lines 32a, 33a, 37a, 38a and the scale lines 31a, 34a, 36a, 39a are made different from each other on the pressure gauge, the line width of the second scale line and the third scale line when counted in a direction from 0 in the scale value among the minimum scale lines formed four by four is made thicker or the like than the line width of the first and fourth scale lines; therefore, by carrying out a measurement or the like, while confirming the fact that the scale value of the second and third scale lines takes a numeral of 2, 3, 7 or 8 set at the second decimal place below a decimal point in MPa unit conversion, the respective minimum scale lines can be intuitively discriminated without the necessity of counting the minimum scale lines formed four by four, and the reading of the scale value of each of the minimum scale lines can be easily carried out. Moreover, in the present embodiment, by installing the scale numeral 50b on the outside of each scale line so that the indicator needle of the pressure gauge is allowed to move in a range from the center of the scale main body 10 to positions where the scale lines 31a, 34a, 36a and 39a are formed, since the indicator needle and the scale numerals 50b are not overlapped with one another, the reading of the scale values can be easily carried out. By installing the scale numerals onto the scale lines 32a, 33a, 37a and 38a, the reading of the scale values can be more easily carried out; thus, this arrangement may be used (not shown). Moreover, in order to make the scale lines more easily visible, the line width of the respective scale lines formed in a dial shape in the present invention is desirably made to have a line width within a ¼ of a distance between the center on the innermost side of the scale line to the center on the innermost side of the adjacent scale line (the same is true for the scale in a dial shape in the following embodiments). The present invention is designed as described above.

Fifteenth Embodiment

Referring to FIG. 19, explanation will be given on a fifteenth embodiment of the present invention. The present embodiment relates to scale divisions for a scale for use in carrying out a measurement or the like, in which an auxiliary scale line 42 formed at each 0.5 mm interval having a line length shorter than that of the minimum scale lines is formed in the middle of the minimum scale lines formed at each 1 mm interval, and which is designed as follows. A) On one side edge of the scale main body 10, scale lines are formed in a direction from the left side toward the right side so that the scale values are set in an ascending order in the following manner. First, scale lines having the same line length are formed at each 0.5 mm interval in the scale values within a range from 0 cm in the scale value to 5 cm in the scale value. Among these, the line length of the scale lines formed at each 1 mm interval, such as 1, 2, 3, 4, 6, 7, 8 and 9 mm in the scale values, is set to a line length 1.8 times longer than the line length of the scale lines formed at each 0.5 mm interval. Next, the line length of the scale lines formed at each 5 mm interval, such as 5, 15, 25, 35, 45 mm in the scale values, is set to a line length 1.2 times longer than the line length of the scale lines formed at each 1 mm interval. Next, the line length and the line width of scale lines formed at each 1 cm interval, such as 1, 2, 3 and 4 cm in the scale values, are set to a line length 1.8 times longer than the line length of the scale lines formed at each 5 mm interval, and a line width 2.5 times wider than the line width thereof, and scale numerals 50b indicating the scale values of the respective scale lines are installed in the vicinity of the tip inside of each of the corresponding scale lines formed at each 1 cm interval. Next, the line length and the line width of scale lines formed at each 5 cm interval, such as 0 and 5 cm in the scale values, are set to a line length 1.2 times longer than the line length of the scale lines formed at each 1 cm interval, and a line width that is the same line width, and scale numerals 50b each of which indicates the scale value of each of the scale lines that is formed in the vicinity of the tip inside each of the corresponding scale lines formed at each 5 cm interval. B) The scale line having 0 cm in the scale value is set at starting point 20. C) The scale value interval to be desirably determined is set at 1 mm. D) From the starting point 20, onto the scale lines formed at each 1 mm interval that is a scale value interval desirably set, temporary numbers are successively put one by one from 0 in an ascending order. E) The line width of each of the scale lines 32a, 33a, 37a and 38a with the numeral of 2, 3, 7, or 8 set at the lowermost position of the temporary number is set to the same line width as the line width of the scale lines formed at each 1 cm interval, and onto the tip of the inside of each of the scale lines 32a, 33a, 37a and 38a, a round mark 40 which has a diameter two times larger than the corresponding line width of the scale line and the inside of which is colored in black is formed, and a scale numeral 50a of each of "2", "3", "7" and "8" corresponding to a numeral at first decimal place below a decimal point in cm unit conversion of the scale value of each of the scale lines is also formed. In the scale divisions for a scale in which an auxiliary scale line 42 at each 0.5 mm interval having a line length shorter than that of the minimum scale line is formed in the middle of the minimum scale lines formed at each 1 mm interval, first, the line width of the scale lines 32a, 33a, 37a and 38a serving as the minimum scale lines is made thicker than that of the scale lines 31a, 34a, 36a and 39a also serving as the minimum scale lines, and by forming a round mark 40 and a scale numeral 50a on the tip inside of each of the scale lines 32a, 33a, 37a and 38a, the display methods of the scale lines 32a, 33a, 37a, 38a and the scale lines 31a, 34a, 36a, 39a are made different from each other. In the case when scale divisions by which the display methods between the scale lines 32a, 33a, 37a, 38a and the scale lines 31a, 34a, 36a, 39a are made different are formed on a scale, since the line width of the second minimum scale line and the third minimum scale line when counted in a direction from 0 in the scale value among the minimum scale lines formed four by four is made thicker, in comparison with the line width of the first minimum scale line and the fourth minimum scale line, and by carrying out a measurement or the like, while confirming the fact that the scale value of the second and third minimum scale lines takes a numeral of 2, 3, 7 or 8 set at the first decimal place below a decimal point in cm unit conversion, with the scale numeral 50a formed thereon being used as a guide, the respective minimum scale lines can be intuitively discriminated without the necessity of counting the minimum scale lines formed four by four, and the reading of the scale value of each of the minimum scale lines can be easily carried out. Moreover, since the reading of the scale value of the minimum scale lines is easily carried out in this manner, the auxiliary scale lines 42 formed at each 0.5 mm interval adjacent to the minimum scale lines can be also intuitively discriminated, and by adding or subtracting the scale amount of 0.5 mm to or from the scale value of the adjacent minimum scale line, the reading of the scale value of the auxiliary scale lines 42 is easily carried out.

Sixteenth Embodiment

Referring to FIG. 20, explanation will be given on a sixteenth embodiment of the present invention. The present embodiment relates to scale divisions for a hygrometer measuring humidity in a range from 10% to 60%, which is designed as follows. A) Scale lines are formed on a round scale main body 10 in a dial shape in the following manner. First, within a range from the scale value of 0% to the scale value of 60%, from a point 0.9 times as long as the radius of the scale main body apart from the center of the scale main body toward the center of the scale main body 10, scale lines having a line length 0.15 times as long as the radius of the scale main body 10, with the same line length, are formed at each 1% scale value interval. However, since the scale lines at each 1% interval in the scale value within a range from 0% to 9% in the scale value are assumed scale lines, actual displays of these are not given. Additionally, the scale values are set in an ascending order in clockwise. Among these, the line length of the scale lines formed at each 5% interval, such as 15, 25, 35, 45 and 55%, in the scale value is set to a line length that is 1.3 times as long as the line length at each 1% interval and extends inward. Next, the line length and the line width of the scale lines formed at each 10% interval, such as 10, 20, 30, 40, 50 and 60% in the scale value, are set to a line length that is the same as the line length of the scale lines at each 5% interval and a line width 2.5 times as wide as that of the scale lines at each 1% interval, and a scale numeral 50*b* indicating the scale value of each of the scale lines is formed at the vicinity of the tip inside the corresponding scale line formed at each 10% interval. B) The scale line with an assumed scale value of 0% is set as a starting point 20. C) The scale value interval to be desirably determined is set at 1%. D) From the starting point 20, onto the scale lines formed at each 1% interval that is a scale value interval desirably determined including the assumed scale line, temporary numbers are successively put one by one from 0 in an ascending order. E) Except for the range from 0% to 9% corresponding to the assumed scale lines, the line width of each of the scale lines 32*a*, 33*a*, 37*a* and 38*a* with the numeral 2, 3, 7 or 8 set at the lowermost position of the temporary number is set to a line width that is the same as the line width of the scale lines formed at each 10% interval, and onto the tip of the inside of each of the scale lines 32*a*, 33*a*, 37*a* and 38*a*, a round mark 40 which has a diameter two times larger than the line width of the corresponding scale line and the inside of which is colored in black is formed. In this manner, by making the line width of the scale lines 32*a*, 33*a*, 37*a* and 38*a* serving as the minimum scale lines thicker than the line length of the scale lines 31*a*, 34*a*, 36*a* and 39*a* also serving as the minimum scale lines, and by putting the mark 40 onto the tip of the inside of each of the scale liens 32*a*, 33*a*, 37*a* and 38*a*, display methods between the scale lines 32*a*, 33*a*, 37*a*, 38*a* and the scale lines 31*a*, 34*a*, 36*a* and 39*a* are made different. In the case when these scale divisions that make a difference between the scale lines 32*a*, 33*a*, 37*a*, 38*a* and the scale lines 31*a*, 34*a*, 36*a*, 39*a* are installed on a hygrometer, the line width of the second and third scale lines when counted in a direction from 0 in the scale value among the minimum scale lines formed four by four is made thicker or the like in comparison with the line width of the first and fourth scale lines, and by using the scale lines in which the line width of the second and third ones is made thicker, a measurement or the like is carried out while confirming the fact that the numeral at the lowermost position in the scale value is set to 2, 3, 7 or 8; thus, without the necessity of counting the minimum scale lines formed four by four, it becomes possible to intuitively discriminate the respective minimum scale lines, and also to easily read the respective scale values of the minimum scale lines. In this manner, in the scale divisions with the scale value up to 0 that do not form scale lines, with the scale line with an assumed scale value of 0 being set as a starting point, temporary numbers are put on the respective scale lines including the assumed scale lines at each scale value interval that is desirably determined, from 0 one by one in an ascending order, so that display methods between scale lines 32*a*, 33*a*, 37*a*, 38*a* with the numeral 2, 3, 7 or 8 set at the lowermost position of the temporary number actually formed and scale lines 31*a*, 34*a*, 36*a* and 39*a* with the numeral 1, 4, 6 or 9 set at the lowermost position of the temporary number, are made mutually different. The present invention is configured as described above.

Seventeenth Embodiment

Figure 21:
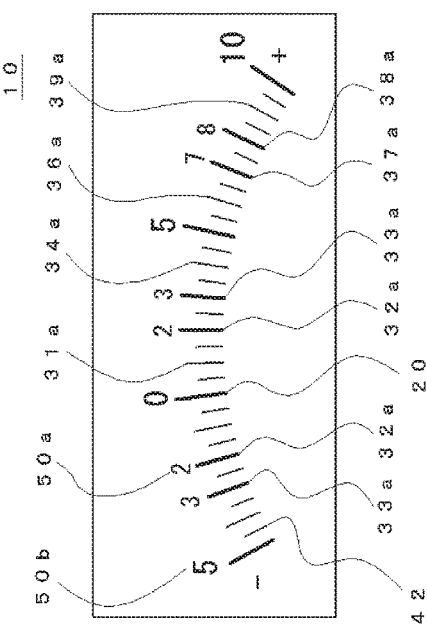
FIG. 21 is a plan view showing the entire scale in accordance with a seventeenth embodiment of the present invention.

Referring to FIG. 21, explanation will be given on a seventeenth embodiment of the present invention. The present embodiment relates to scale divisions for a voltmeter in which an auxiliary scale line 42 formed at each 0.5V interval has a line length shorter than the line length at each 1V interval, and is formed at the intermediate position of scale lines formed at each 1 V interval, and the scale divisions are designed as follows. A) Scale lines are formed in a dial shape on a scale main body 10 in the following manner. Within a range from minus 5V to plus 10V in the scale value, scale lines having the same line length are formed on the scale main body 10 at each 0.5V interval in the scale value from the left side to the right side of the scale main body 10 from minus 5V to 10V, in an ascending order. Among these, the line length of the scale lines at each 1V interval corresponding to minus 1, 2, 3 and 4V to plus 1, 2, 3, 4, 6, 7, 8 and 9V in the scale value, is set to a line length that is 1.6 times longer than the line length of scale lines at each 0.5V interval, and extends long upward. Next, the line length and line width of the scale lines at each 5V interval, such as minus 5V, 0V and plus 5V and 10V, in the scale values are set to a line length that is 1.4 times longer than the line length of the scale line at each 1V interval and extends upward, and a line width 2.5 times wider than that, and a scale numeral 50*b* indicating each of the scale values of the scale lines is put onto the vicinity of a tip on the upper side of each of the scale lines at each 5V interval. B) The scale line corresponding to 0V in the scale value is defined as a starting point 20. C) The scale value interval that is desirably determined is set to 1V. D) From the starting point 20, in two directions of plus side and minus side in the scale value, temporary numbers are successively put to the scale lines at each 1V interval that is a desirably determined scale value interval, from 0 one by one in an ascending order. E) The line length and line width of each of the scale lines 32a, 33a, 37a and 38a with the numeral of 2, 3, 7 or 8 set at the lowermost position of the temporary number are set to a line length that is 1.2 times longer than the line length of each of the scale lines 31a, 34a, 36a and 39a with the numeral 1, 4, 6 and 9 set at the lowermost position of the temporary number, and extends long upward, and a line width that is the same as the line width of the scale lines at each 5V interval, and a scale numeral 50a indicating the scale value of each of the scale lines is put to the vicinity of the tip on the upper side of the scale lines 32a, 33a, 37a and 38a. In this manner, with respect to scale divisions in which the auxiliary scale line 42 formed so as to divide the interval of scale lines of each 1V into two equal portions is present, first, the display methods of the minimum scale lines at each 1V interval are made mutually different in the following manner. The line length and line width of the scale lines 32a, 33a, 37a and 38a serving as the minimum scale lines are set to a line length that is made longer, and a line width that is made thicker, than those of the scale lines 31a, 34a, 36a and 39a also serving as the minimum scale lines, and by forming a scale numeral 50a at the vicinity on the tip on the upper side of each of the scale lines 32a, 33a, 37a and 38a, the display methods between the scale lines 32a, 33a, 37a, 38a and the scale lines 31a, 34a, 36a, 39a are made different from each other. In the case when the scale divisions by which the scale lines 32a, 33a, 37a, 38a and the scale lines 31a, 34a, 36a, 39a are mutually made different are formed on a voltmeter, since in the minimum scale lines formed four by four, the line width of each of the second scale line and the third scale line when counted in a direction of 0 of the scale value is made thicker than the line width of the first scale line and the fourth scale line, and while confirming the fact that the scale value of the second and third scale lines that are made thicker correspond to minus 2 or 3V, and plus 2, 3, 7 or 8V in the scale value, a measurement or the like is carried out by using the scale numeral 50a formed thereon as a guide; thus, without the necessity of counting the minimum scale lines formed four by four, it becomes possible to easily discriminate the respective minimum scale lines, and also to easily read the respective scale values of the minimum scale lines. Since it becomes possible to easily read the respective scale values of the minimum scale lines, the reading of the scale value of an adjacent auxiliary scale line 42 can be easily carried out by adding or subtracting 0.5V to or from the scale value of each of the minimum scale lines. The present invention is configured as described above.

Eighteenth Embodiment

Figure 22:
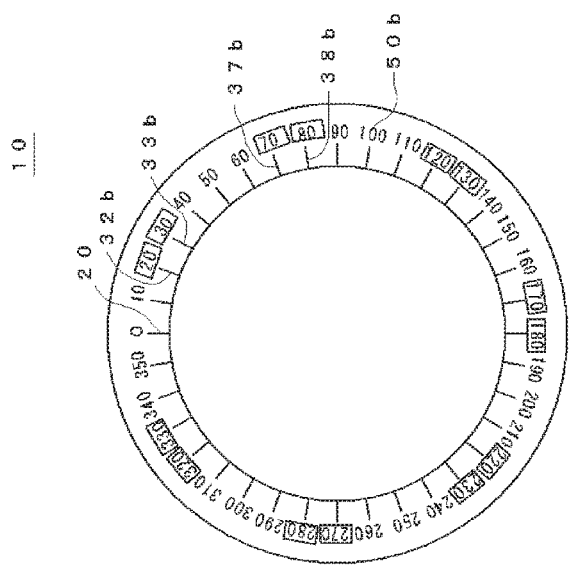
FIG. 22 is a plan view showing the entire scale in accordance with an eighteenth embodiment of the present invention.

Referring to FIG. 22, explanation will be given on an eighteenth embodiment of the present invention. The present embodiment relates to scale divisions for an angle meter having a round shape within 0 to 360 degrees, which is designed as follows. A) A circle having a radius that is 0.7 times as long as the radius of the scale main body is formed centered on the center of the round scale main body 10. Next, on the circle thus formed, scale lines having a line length 0.08 times the radius of the scale main body are formed outward radially from points that divide the circumference into 36 portions, with the apex of the circle serving as a starting point. Next, a scale numeral 50b is formed in the vicinity of a tip outside each of the scale lines so as to successively increase 10 degrees by 10 degrees in the clockwise, with the scale value of the scale line at the apex of the circle being set as 0 degree. Additionally, each of the scale numerals 50b is formed in a manner so as to make its bottom face to face with the center of the scale main body. B) The scale line with the scale value of 0 degree is set as a starting point 20. C) The scale value interval to be desirably determined is set at 10 degrees. D) From the starting point 20, onto the scale lines formed at each 10 degrees interval in the scale values to be desirably determined, temporary numbers are successively put one by one from 0 in an ascending order. E) The scale numerals 50b of the scale lines 32b, 33b, 37b and 38b with the numeral 2, 3, 7 or 8 set at the lowermost position of the temporary number are surrounded by square lines. In this manner, by surrounding the scale numeral 50b of each of the scale lines 32b, 33b, 37b and 38b with the square line, without surrounding the scale numeral 50b of each of the scale lines 31b, 34b, 36b and 39b with the square line, the display methods between the scale lines 32b, 33b, 37b, 38b and the scale lines 31b, 34b, 36b, 39b are made different. Thus, by surrounding each of "20", "30", "70", "80" and the like corresponding to the scale numeral 50b of each of the scale lines 32b, 33b, 37b and 38b with the square line, the respective scale lines of the scale lines 32b, 33b, 37b and 38b can be intuitively discriminated. Moreover, since the respective scale lines of the scale lines 32b, 33b, 37b and 38b can be intuitively discriminated, the respective scale lines of the adjacent scale lines 31b, 34b, 36b and 39b can also be intuitively discriminated. As described above, by installing these scale divisions onto an angle meter, it becomes possible to intuitively discriminate the respective scale lines of the scale lines 31b, 32b, 33b, 34b, 36b, 37b, 38b and 39b, and consequently to easily carry out a measurement or the like. Moreover, by surrounding the adjacent scale numerals 50b, such as "20" and "30", of the scale lines 32b, 33b, 37b and 38b, with square lines, the user is allowed to easily confirm the positions of the scale numerals 50b, such as "20" and "30".

Moreover, since the scale numerals 50b of "20", "30" and the like of the scale lines 32b and 33b are located in the center of "10", "20", "30" and "40" corresponding to the scale numerals 50b of the scale lines 31b, 32b, 33b and 34b, and since "70", "80" and the like of the scale lines 37b and 38b are also located in the center of "60", "70", "80" and "90" corresponding to the scale numerals 50b of the scale lines 36b, 37b, 38b and 39b, the user can easily confirm the positions of the scale numerals 50b relating to "20", "30" or the like. Furthermore, by using the scale numerals 50b relating to "20", "30", "70" and "80" each surrounded by this square line, as a guide, the entire scale position of the scale line at a 10 degrees unit interval can be easily confirmed. In the case when these scale divisions are applied to scales that are used for measurements and settings of various angles, since the respective scale lines can be intuitively discriminated, the measurements and settings of angles can be quickly carried out. Moreover, in the case when these scale divisions are utilized for scales of a gyrocompass for use in aircrafts, ships or the like, since the orientation of flight or the like can be intuitively confirmed, quick and accurate steering can be obtained; therefore, this arrangement may be used. Additionally, in this case, the respective scale numerals 50b, such as "0", "90", "180" and "270", may be prepared as displays showing directions, such as "N", "E", "S" and "W" (not shown). The present invention is configured as described above.

Nineteenth Embodiment

Figure 23:
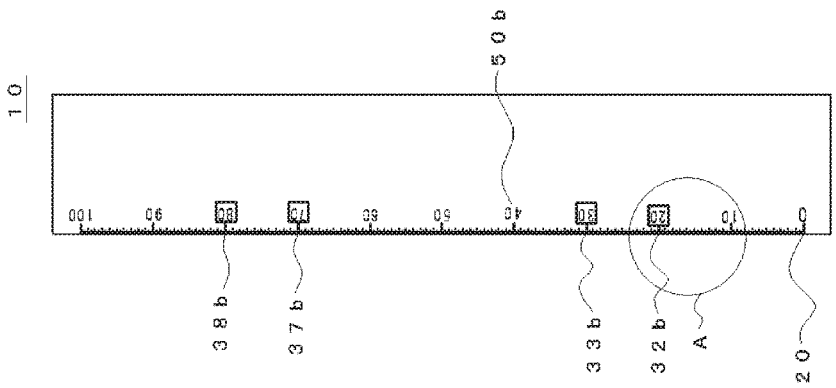
FIG. 23 is a plan view showing the entire scale in accordance with a nineteenth embodiment of the present invention.
Figure 24:
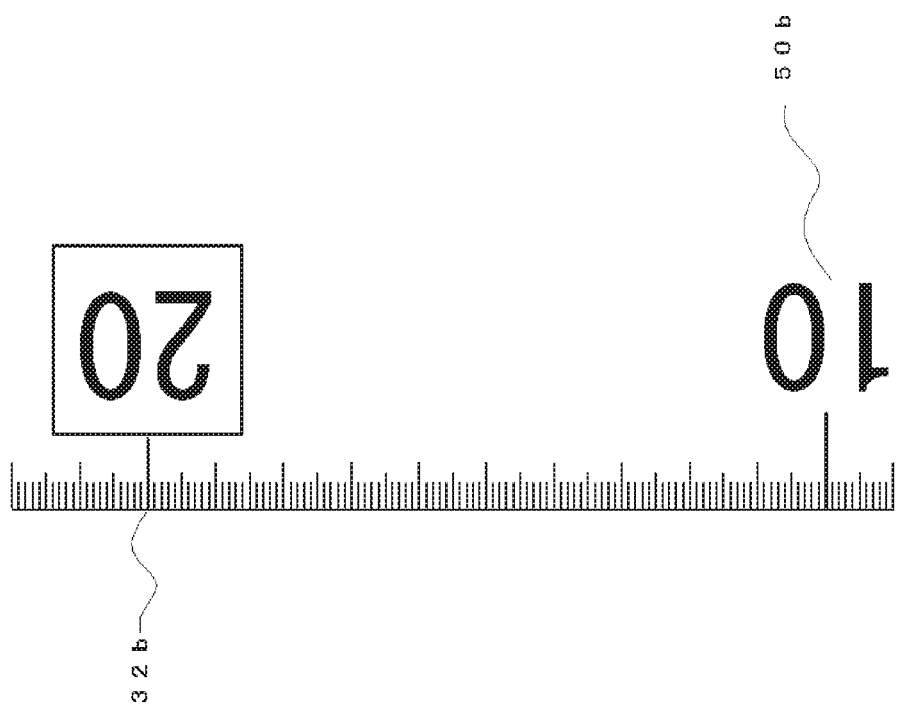
FIG. 24 is a plan view showing an A-portion enlarged view of the scale in accordance with a nineteenth embodiment of the present invention.

Referring to FIG. 23 and FIG. 24, explanation will be given on a nineteenth embodiment of the present invention.

The present embodiment relates to scale divisions for a scale for carrying out a measurement or the like of a length of an object, which is designed as follows. A) Scale lines are formed on one side edge of a scale main body 10 in the following manner. First, in a range from the scale value 0 cm to the scale value of 100 cm, scale lines having the same line length are formed at each 1 mm interval in the scale value, in a direction from the left side to the right side, in an ascending order in the scale value. Among these, the line length of the scale lines at each 5 mm interval, such as 5 mm, 15 mm, 25 mm or the like in the scale values, is set to a line length 1.6 times longer than the scale lines at each 1 mm interval. Next, the line length of the scale lines at each 1 cm interval, such as 1 cm, 2 cm, 3 cm or the like in the scale values, is set to a line length 1.2 times longer than that of the scale line at each 5 mm interval. Next, the line length and line width of the scale lines at each 10 cm interval, such as 0 cm, 10 cm, 20 cm, 30 cm or the like in the scale values are set to a line length two times longer than that of the scale lines at each 1 cm interval, and a line width 2.5 times wider than the line width thereof, and a scale numeral 50$b$ indicating the scale value of each of the scale lines is formed at the vicinity of a tip inside the corresponding scale line at each 10 cm interval. B) The scale line with the scale value of 0 cm is set as a starting point 20. C) The scale value interval to be desirably determined is set at 10 cm. D) From the starting point 20, onto the scale lines formed at each 10 cm interval that is a scale value interval desirably set, temporary numbers are successively put one by one from 0 in an ascending order. E) The scale numerals 50$b$ of the scale lines 32$b$, 33$b$, 37$b$ and 38$b$ with the numeral 2, 3, 7 or 8 set at the lowermost position of the temporary number are surrounded by square lines. In this manner, by surrounding the scale numeral 50$b$ of each of the scale lines 32$b$, 33$b$, 37$b$ and 38$b$ corresponding to the scale lines formed at each 10 cm interval with the square line, without surrounding the scale numeral 50$b$ of each of the scale lines 31$b$, 34$b$, 36$b$ and 39$b$ also corresponding to the scale lines formed at each 10 cm interval with the square line, the display methods between the scale lines 32$b$, 33$b$, 37$b$, 38$b$ and the scale lines 31$b$, 32$b$, 36$b$, 39$b$ are made different. Thus, by surrounding each of "20", "30", "70", "80" corresponding to the scale numerals 50$b$ of the scale lines 32$b$, 33$b$, 37$b$, 38$b$ with the square lines, the respective scale lines of the scale lines 32$b$, 33$b$, 37$b$ and 38$b$ can be intuitively discriminated. Moreover, since the respective scale lines of the scale lines 32$b$, 33$b$, 37$b$ and 38$b$ can be intuitively discriminated, the respective scale lines adjacent to the scale lines 31$b$, 34$b$, 36$b$ and 39$b$ can also be intuitively discriminated. As described above, by installing these scale divisions onto a scale, it becomes possible to intuitively discriminate the respective scale lines 31$b$, 32$b$, 33$b$, 34$b$, 36$b$, 37$b$, 38$b$ and 39$b$, and consequently to easily carry out a measurement or the like. Furthermore, by surrounding the scale numerals 50$b$, such as "20", "30" or the like, adjacent to each other with the 10 cm unit interval of the scale lines 32$b$, 33$b$, 37$b$ and 38$b$, with square lines, the positions of the scale numerals 50$b$, such as "20" and "30", can be easily confirmed. Moreover, since the scale numerals 50$b$ of "20", "30" and the like of the scale lines 32$b$ and 33$b$ are located in the center of "10", "20", "30" and "40" corresponding to the scale numerals 50$b$ of the scale lines 31$b$, 32$b$, 33$b$ and 34$b$, and since the scale numerals 50$b$ of "70" and "80" of the scale lines 37$b$ and 38$b$ are also located in the center of "60", "70", "80" and "90" corresponding to the scale numerals 50$b$ of the scale lines 36$b$, 37$b$, 38$b$ and 39$b$, the positions of the scale numerals 50$b$ relating to "20", "30", "70" and "80" are easily confirmed. Furthermore, by using the scale numerals 50$b$ relating to "20", "30", "70" and "80" each surrounded by this square line, as a guide, the entire scale position of the scale line at each 10 cm unit can be easily confirmed. Even in the case of a scale having a long length, since the scale lines formed at each 10 cm interval can be intuitively discriminated by using these scale divisions, it is possible to easily carry out a measurement or the like. The present invention is configured as described above.

Twentieth Embodiment

Figure 25:
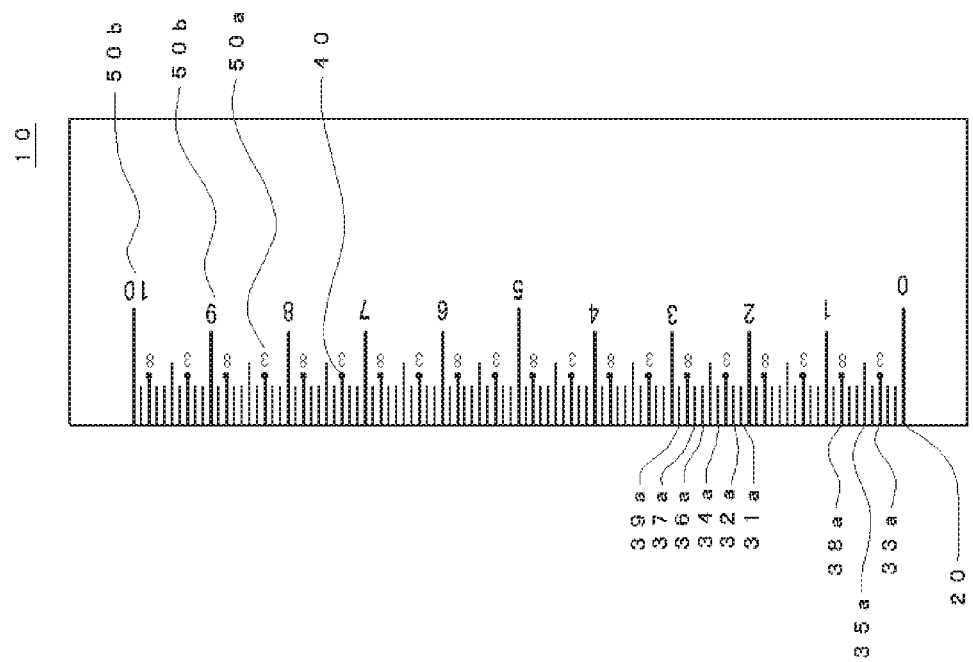
FIG. 25 is a plan view showing the entire scale in accordance with a twentieth embodiment of the present invention.

Referring to FIG. 25, explanation will be given on a twentieth embodiment of the present invention. The present embodiment relates to scale divisions for a scale for carrying out a measurement or the like of a length of an object, which is designed as follows. A) Scale lines are formed on a scale main body 10 in accordance with A) in the first embodiment. B) The scale line with the scale value of 0 cm is set as a starting point 20. C) The scale value interval to be desirably determined is set at 1 mm. D) From the starting point 20, onto the scale lines formed at each 1 mm interval that is a scale value interval desirably set, temporary numbers are successively put one by one from 0 in an ascending order. E) The line length and line width of the scale lines 33$a$ and 38$a$, with the numeral 3 or 8 set at the lowermost position of the temporary number, are set to a line length that is 1.2 times the line length of the scale lines with the numeral 1, 2, 4, 6, 7 or 9 set at the lowermost position of the temporary number, and a line width that is the same as that of the scale line formed at each 1 cm interval, and onto a tip inside each of the scale lines 33$a$ and 38$a$, a round mark 40 which has a diameter two times longer than the line width of the corresponding scale line and the inside of which is painted in black, and scale numerals 50$a$ of "3" or "8" corresponding to the number at the first place below a decimal point in the cm unit conversion of the scale value of each of the scale lines are formed. In this manner, by allowing the scale lines 33$a$ and 38$a$ serving as the minimum scale lines to have a line length longer than that of the scale lines 31$a$, 32$a$, 34$a$, 36$a$, 37$a$ and 39$a$ also serving as the minimum scale lines and a line width that is thicker, and by forming the mark 40 and the scale numeral 50$a$ onto the tip inside each of the scale lines 33$a$ and 38$a$, the display methods between the scale lines 33$a$, 38$a$ and the scale lines 31$a$, 32$a$, 34$a$, 36$a$, 37$a$, 39$a$ are made different. In the case when the scale divisions by which the display methods between the scale lines 33$a$, 38$a$ and the scale lines 31$a$, 32$a$, 34$a$, 36$a$, 37$a$ and 39$a$ are made different are installed onto a scale, since in the minimum scale lines formed four by four, the line width of the third line when counted in a 0 direction in the scale value is made thicker than the line width of the first, second and fourth scale lines, and by confirming the fact that the scale value of the third scale line takes a numeral of 3 or 8 set at the first decimal place below a decimal point in cm unit conversion, a measurement or the like is carried out by utilizing the scale numerals 50$a$ formed thereon as a guide; thus, without the necessity of counting the minimum scale lines formed four by four, it becomes possible to intuitively discriminate the respective minimum scale lines, and also to easily read the respective scale values of the minimum scale lines.

Twenty-First Embodiment

Figure 26:
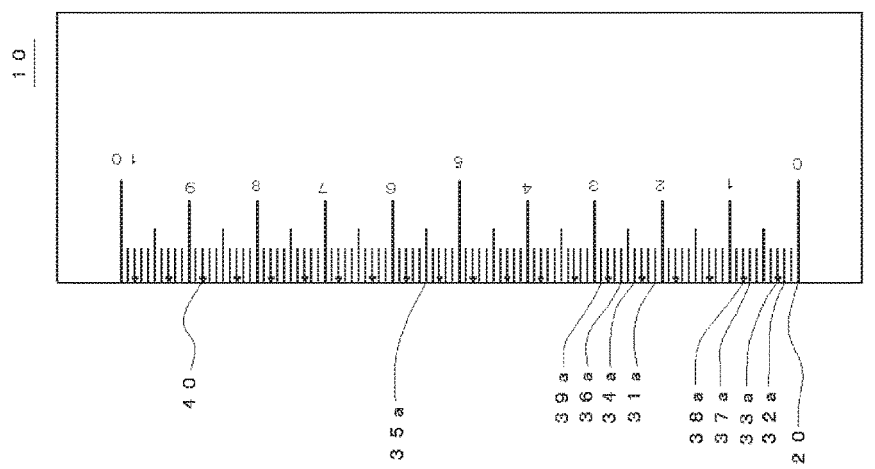
FIG. 26 is a plan view showing the entire scale in accordance with a twenty-first embodiment of the present invention.

Referring to FIG. 26, explanation will be given on a twenty-first embodiment of the present invention. The present embodiment relates to scale divisions for a scale for carrying out a measurement or the like of a length of an object, which is designed as follows. A) Scale lines are formed on a scale main body 10 in accordance with A in the first embodiment. B) The scale line with the scale value of 0 cm is set as a starting point 20. C) The scale value interval to be desirably determined is set at 1 mm. D) From the starting point 20, onto the scale lines formed at each 1 mm interval that is a scale value interval desirably set, temporary numbers are successively put one by one from 0 in an ascending order. E) Onto the tip on the outside edge of each of the scale lines 33a and 38a with the numeral 3 or 8 set at the lowermost position of the temporary number, a triangular mark 40 the inside of which is painted in black is put. In this manner, by putting the mark 40 onto each of the scale lines 33a and 38a serving as the minimum scale lines, without putting the mark 40 onto each of the scale lines 31a, 32a, 34a, 36a, 37a and 39a also serving as the minimum scale lines, the display methods between the scale lines 33a, 38a and the scale lines 31a, 32a, 34a, 36a, 37a and 39a are made different. In the case when the scale divisions by which the display methods between the scale lines 33a, 38a and the scale lines 31a, 32a, 34a, 36a, 37a, 39a are made different are installed onto a scale, in the minimum scale lines formed four by four, the triangular mark 40 inside of which is painted black is put onto the third scale line when counted in a direction of 0 in the scale value, while no mark is put onto the first, second and fourth scale lines; therefore, by confirming the fact that the scale value of the third scale line takes the numeral of 3 or 8 set at the first decimal place below a decimal point in cm unit conversion, a measurement or the like is carried out; thus, without the necessity of counting the minimum scale lines formed four by four, it becomes possible to intuitively discriminate the respective minimum scale lines, and also to easily read the respective scale values of the minimum scale lines. When these scale divisions are used for scale divisions of a scale, all the line lengths and line widths of the minimum scale lines can be made the same so that the scale having a simple design in the display can be prepared.

Twenty-Second Embodiment

Figure 27:
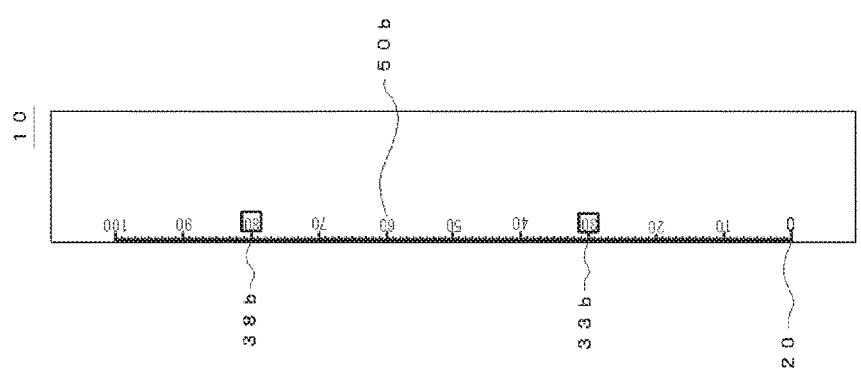
FIG. 27 is a plan view showing the entire scale in accordance with a twenty-second embodiment of the present invention.

Referring to FIG. 27, explanation will be given on a twenty-second embodiment of the present invention. The present embodiment relates to scale divisions of a scale for use in measuring the length or the like of an object, which is designed as follows. A) Scale lines are formed on the scale main body 10 by using A in the nineteenth embodiment. B) The scale line with the scale value of 0 cm is set as a starting point 20. C) The scale value interval to be desirably determined is set at 10 cm. D) From the starting point 20, onto the scale lines formed at each 10 cm interval that is a scale value interval desirably set, temporary numbers are successively put one by one from 0 in an ascending order. E) Each of the scale numerals 50b of the scale lines 33b and 38b with the numeral 3 or 8 set at the lowermost position of the temporary number is surrounded by a square line. Each of the scale numerals 50b of the scale lines 33b and 38b serving as the scale lines at each 10 cm interval is surrounded by a square line, while each of the scale numerals 50b of the scale lines 31b, 32b, 34b, 36b, 37b and 39b also serving as the scale lines at each 10 cm interval is not surrounded by the square line; thus, the display methods between the scale lines 33a, 38a and the scale lines 31a, 32a, 34a, 36a, 37a, 39a are made different. In this manner, by surrounding "30" and "80" corresponding to the scale numerals 50b of the scale lines 33b and 38b with square lines, the respective scale lines of the scale lines 33b and 38b can be intuitively discriminated. Moreover, since the respective scale lines of the scale lines 33b and 38b can be intuitively discriminated, the respective scale lines of the adjacent scale lines 31b, 32b, 34b, 36b, 37b and 39b can also be intuitively discriminated. As described above, in the case when these scale divisions are installed onto a scale, since the respective scale lines of the scale lines 31b, 32b, 33b, 34b, 36b, 37b, 38b and 39b can be intuitively discriminated, a measurement or the like can be easily carried out. Furthermore, by using "30" and "80" corresponding to the scale numerals 50b surrounded by square lines as a guide, the entire scale positions of the scale lines formed at each 10 cm unit interval can be easily confirmed.

Twenty-Third Embodiment

Figure 28:
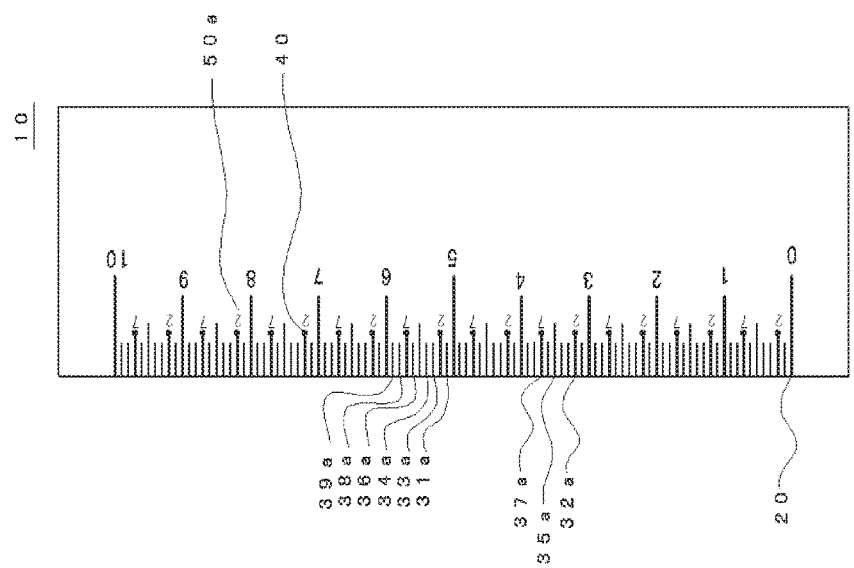
FIG. 28 is a plan view showing the entire scale in accordance with a twenty-third embodiment of the present invention.

Referring to FIG. 28, explanation will be given on a twenty-third embodiment of the present invention. The present embodiment relates to scale divisions for a scale for carrying out a measurement or the like of a length of an object, which is designed as follows. A) Scale lines are formed on a scale main body 10 in accordance with A) in the first embodiment. B) The scale line with the scale value of 0 cm is set as a starting point 20. C) The scale value interval to be desirably determined is set at each 1 mm. D) From the starting point 20, onto the scale lines formed at each 1 mm interval that is a scale value interval desirably set, temporary numbers are successively put one by one from 0 in an ascending order. E) The line length and line width of the scale lines 32a and 37a with the numeral 2 or 7 set at the lowermost position of the temporary number are set to a line length 1.2 times longer than the line length of the scale lines 31a, 33a, 34a, 36a, 38a and 39a with the numeral 1, 3, 4, 6, 8 or 9 set at the lowermost position of the temporary number, and a line width that is set to the same as that of the line width of the scale line at each 1 cm interval, and onto the tip of the inside of each of the scale lines 32a and 37a, a round mark 40 having a diameter two times wider than the line width of the corresponding scale line, with the inside of the diameter being painted in black, and a scale numeral 50a of each of "2" and "7" corresponding to a numeral at the first decimal place below a decimal point in cm unit conversion of the scale value of each of the scale lines are also formed. In this manner, the line length of the scale lines 32a and 37a serving as the minimum scale lines is made longer than that of the scale lines 31a, 33a, 34a, 36a, 38a and 39a also serving as the minimum scale lines, with the line width thereof being made thicker, and by forming the mark 40 and the scale numerals 50a at the tip inside each of the scale lines 32a and 37a, the display methods between the scale lines 32a, 37a and the scale lines 31a, 33a, 34a, 36a, 38a and 39a are made different. In the case when the scale divisions by which the display methods between the scale lines 32a, 37a and the scale lines 31a, 33a, 34a, 36a, 38a and 39a are made different are installed onto a scale, since in the minimum scale lines formed four by four, the line width of the second scale line when counted in a direction of 0 in the scale value is made thicker than the line width of the first, third and fourth scale lines, and by confirming the fact that the scale value of the second scale line takes a numeral of 2 or 7 set at the first decimal place below a decimal point in cm unit conversion, a measurement or the like is carried out by using the scale numeral 50a formed thereon as a guide; thus, without the necessity of counting the minimum scale lines formed four by four, it becomes possible to intuitively discriminate the respective minimum scale lines, and also to easily read the respective scale values of the minimum scale lines.

Twenty-Fourth Embodiment

Figure 29:
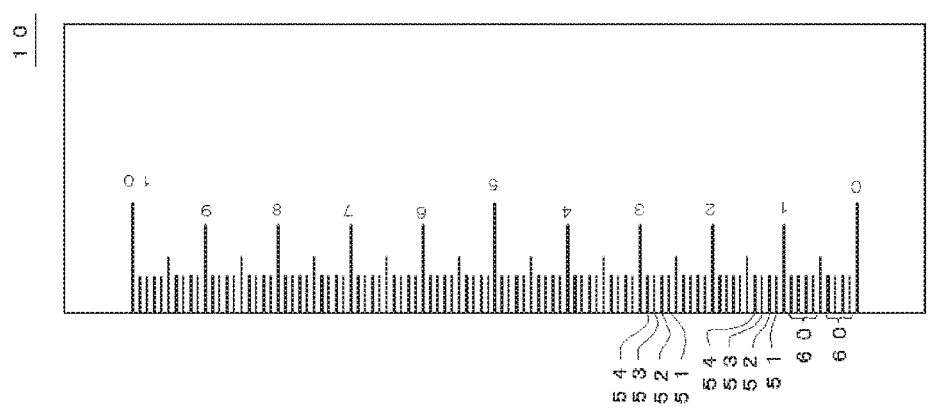
FIG. 29 is a plan view showing the entire scale in accordance with a twenty-fourth embodiment of the present invention.

Referring to FIG. 29, explanation will be given on a twenty-fourth embodiment of the present invention. The present embodiment relates to scale divisions of a scale for use in measuring the length of about 10 cm or the like of an object, which is designed as follows. A) Scale lines are formed on the scale main body 10 by using A) in the first embodiment. B) Of minimum scale lines 60 that are formed four by four, the line width of the second scale line 52 and the fourth scale line 54 that are the second one and the fourth one when counted from the left, with the side where the scale line of 0 in the scale value is located being defined as the left side, is set to a line width 2.5 times wider than the line width of the first scale line 51 and the third scale line 53 that are the first one and the third one when counted from the left in the same manner. In the case when these scale divisions are formed on a scale, the line width of the second scale line 52 and the fourth scale line 54 of the minimum scale lines 60 that are formed four by four is made thicker than the line width of the first scale line 51 and the third scale line 53 that are also the minimum scale lines; therefore, by carrying out a measurement or the like, while confirming the fact that the scale value of the second scale line 52 and the fourth scale line 54 takes a numeral of 2, 4, 7 or 9 set at the first decimal place below a decimal point in cm unit conversion, the respective minimum scale lines can be intuitively discriminated without the necessity of counting the minimum scale lines formed four by four, and the reading of the scale value of each of the minimum scale lines can be easily carried out. Moreover, in the case when the line width of the second scale line 52 and the fourth scale line 54 is made thicker than the line width of the first scale line 51 and the third scale line 53 that are also the minimum scale lines, while the line length of the second scale line 52 and the fourth scale line 54 is made 1.2 times longer than the line length of the first scale line 51 and the third scale line 53, or a scale numeral 50a of each of "2", "4", "7" and "9" corresponding to a numeral at first decimal place below a decimal point in cm unit conversion of the scale value of each of the scale lines is formed, the reading of the scale value of the minimum scale line can be more easily carried out so that this arrangement may be used (not shown). Furthermore, of minimum scale lines 60 that are formed four by four, the line width of the first scale line 51 and the third scale line 53 may be made thicker than the line width of the second scale line 52 and the fourth scale line 54 that are also the minimum scale lines; thus, the same effects can be obtained so that this arrangement may be used (not shown).

Moreover, of minimum scale lines 60 that are formed four by four, the line width of the first scale line 51 and the second scale line 52 may be made thicker than the line width of the third scale line 53 and the fourth scale line 54 that are also the minimum scale lines so that the adjacent two by two scale lines of the minimum scale lines 60 are made to have the same line width, and even in this case, by carrying out a measurement or the like, while confirming the fact that the scale value of the first scale line 51 and the second scale line 52 having the thick line width takes a numeral of 1, 2, 6 or 7 set at the first decimal place below a decimal point in cm unit conversion, the respective minimum scale lines can be intuitively discriminated without the necessity of counting the minimum scale lines formed four by four, and the reading of the scale value of each of the minimum scale lines can be easily carried out; therefore, this arrangement may be used (not shown). Further, of minimum scale lines 60 that are formed four by four, the line width of the third scale line 53 and the fourth scale line 54 may be made thicker than the line width of the first scale line 51 and the second scale line 52 that are also the minimum scale lines so that the adjacent two by two scale lines of the minimum scale lines 60 are made to have the same line width, and even in this case, since the same effects can be obtained, this arrangement may be used (not shown). Moreover, of minimum scale lines 60 that are formed four by four, the line width of the second scale line 52 and the third scale line 53 may be made thicker than the line width of the first scale line 51 and the fourth scale line 54, and by carrying out a measurement or the like, while confirming the fact that the scale value of the second scale line 52 and the third scale line 53 takes a numeral of 2, 3, 7 or 8 set at the first decimal place below a decimal point in cm unit conversion, the respective minimum scale lines can be intuitively discriminated without the necessity of counting the minimum scale lines formed four by four, and the reading of the scale value of each of the minimum scale lines can be easily carried out; therefore, this arrangement may be used (not shown). Furthermore, in this case, when the line length of the second scale line 52 and the third scale line 53 is set to 1.2 times longer than the line length of the first scale line 51 and the fourth scale line 54, the discrimination of the respective minimum scale lines and the reading of the scale value can be further carried out easily; therefore, this arrangement may be used (not shown). Moreover, in the case when a scale numeral 50a of each of "2", "3", "7" and "8" corresponding to a numeral at first decimal place below a decimal point in cm unit conversion of the scale value of each of the scale lines is put onto the second scale line 52 and the third scale line 53, since the reading of the respective scale values of the minimum scale lines can be further easily carried out, this arrangement may be used (not shown). In the case when these scale divisions are installed on a scale, since the line lengths of all the minimum scale lines are set to the same length, with only the line widths being made different, a scale with simple scale divisions in display can be provided.

Twenty-Fifth Embodiment

Figure 30:
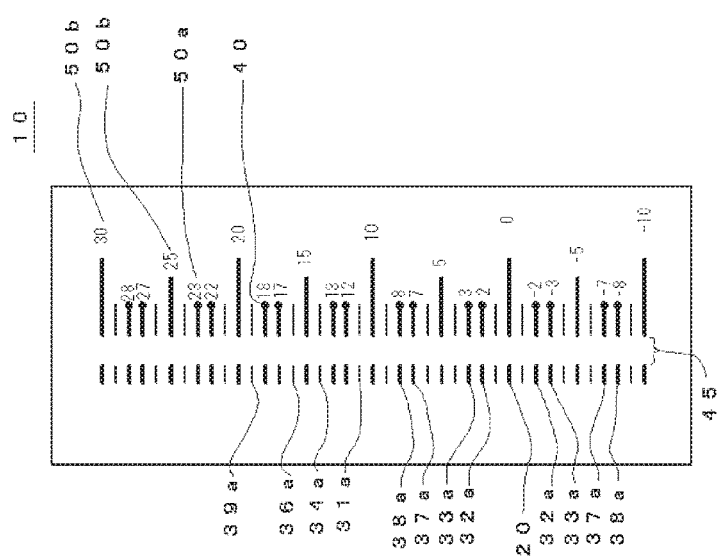
FIG. 30 is a plan view showing the entire scale in accordance with a twenty-fifth embodiment of the present invention.

Referring to FIG. 30, explanation will be given on a twenty-fifth embodiment of the present invention. The present embodiment relates to scale divisions of a thermometer, which are designed as follows. A) Scale lines are formed on a scale main body 10 in the following manner. In a range from minus 10° C. to plus 30° C. in scale values, scale lines each having the same length are formed at each 1° C. interval in the scale value horizontally, in a direction from the upper side toward the lower side in a descending order in the scale value. Among these, the line length and line width of the scale lines at each 5° C. interval, such as minus 5° C., plus 5, 15 and 25° C., in the scale values, are set to a line length that is 1.3 times longer than that of the scale lines at each 1° C. interval, and extends long in a rightward direction, and a line width that is set to 2.5 times wider than that thereof, and a scale numeral 50b indicating the scale value of each of the scale lines is formed at the vicinity of the tip on the right side of the scale line at each 5° C. interval. Next, the line length and line width of the scale lines at each 10° C. interval, such as minus 10° C., 0° C., plus 10, 20 and 30° C., in the scale value, are set to a line length that is 1.2 times longer than that of the scale lines at each 5° C. interval, and extends long in a rightward direction, and a line width that is the same as the line width thereof, and a scale numeral 50*b* indicating the scale value of each of the scale lines is formed at the vicinity of the tip on the right side of the corresponding scale line at each 10° C. interval. B) The scale line with the scale value of 0° C. is set as a starting point 20. C) The scale value interval to be desirably determined is set at 1° C. D) From the starting point 20, in two directions on the minus side and plus side in the scale value, onto the scale lines at each 1° C. interval that is a scale value interval desirably determined, temporary numbers are successively put one by one from 0 in an ascending order. E) The line width of the scale lines 32*a*, 33*a*, 37*a* and 38*a*, with the numeral of 2, 3, 7 or 8 set at the lowermost position of the temporary number, is set to the same line width as the scale lines at each 5° C. interval, and onto the tip on the right side of each scale lines 32*a*, 33*a*, 37*a* and 38*a*, a round mark 40, which has a diameter two times larger than the line width of the corresponding scale line and the inside of which is colored in black, and a scale numeral 50*a* indicating the scale value of each of the scale lines are formed. F) At the same position in the middle portion of each of the scale lines, a cutout 45 for erasing the scale line is formed with a width of 0.3 times as wide as the line length of the scale lines 32*a*, 33*a*, 37*a* and 38*a*. In this manner, by making the line width of the scale lines 32*a*, 33*a*, 37*a* and 38*a* serving as the minimum scale lines thicker than the line width of the scale lines 31*a*, 34*a*, 36*a* and 39*a*, and by forming the mark 40 and the scale numeral 50*a* at the tip on the right side of each of the scale lines 32*a*, 33*a*, 37*a* and 38*a*, display methods between the scale lines 32*a*, 33*a*, 37*a*, 38*a* and the scale lines 31*a*, 34*a*, 36*a*, 39*a* are made different. By installing these scale divisions that make a difference between the scale lines 32*a*, 33*a*, 37*a*, 38*a* and the scale lines 31*a*, 34*a*, 36*a*, 39*a* on a thermometer, the line width of the second scale line and the third scale line when counted in a direction from 0 in the scale value among the minimum scale lines formed four by four is made thicker or the like than the line width of the first and fourth scale lines; therefore, by carrying out a measurement or the like, while confirming the fact that the scale value of the second scale line and the third scale line having the thicker line width has the numeral of 2, 3, 7 or 8 set at the lowermost position of the temporary number, and by using the scale numeral 50*a* formed thereon as a guide, the respective minimum scale lines can be intuitively discriminated without the necessity of counting the minimum scale lines formed four by four, and the reading of the scale value of each of the minimum scale lines can be easily carried out. Moreover, in the present embodiment, since "2", "3", "7" and "8" each serving as the scale numeral 50*a* are put on the scale lines 32*a*, 33*a*, 37*a* and 38*a*, the scale value of each of the scale lines 32*a*, 33*a*, 37*a* and 38*a* can be read more easily in comparison with the case where no scale numeral 50*a* is put. Furthermore, since the scale numeral 50*a* is formed on the scale line to which the scale line 32*a* and the scale line 33*a*, as well as the scale line 37*a* and the scale line 38*a*, are adjacent, the scale amount can be easily confirmed as 1° C. based upon the difference of the scale numerals 50*a* of "2" and "3", as well as "7" and "8". The scale amount is easily confirmed as 1° C. in this manner; therefore, even in the case of the scale lines 31*a*, 34*a*, 36*a* and 39*a* having no scale numeral 50*a* adjacent to the scale lines 32*a*, 33*a*, 37*a* and 38*a*, by adding or subtracting the scale amount of 1° C. to or from the scale numeral 50*a* of each of the scale lines 32*a*, 33*a*, 37*a* and 38*a*, the scale values of the scale lines 31*a*, 34*a*, 36*a* and 39*a* can be read more easily in comparison with the case where no scale numeral 50*a* is formed, in the same manner as in the scale lines 32*a*, 33*a*, 37*a* and 38*a*.

Further, since the scale numeral 50*a* is put on each of the scale lines 32*a*, 33*a*, 37*a* and 38*a*, the scale values of the scale lines 31*a*, 34*a*, 36*a* and 39*a* can be easily read without the necessity of confirming the scale amount as described earlier. For example, although no scale numeral 50*a* is formed on the scale line of 9° C. corresponding to the scale line 39*a*, since it is the scale line in the middle of 8° C. corresponding to the scale line 38*a* on which the scale numeral 50*a* is formed and 10° C. corresponding to the scale line on which the scale numeral is formed, it is easily read as the scale value of 9° C. By using this arrangement, the reading of the scale value of each of the scale lines 31*a*, 34*a*, 36*a* and 39*a* with no scale numeral 50*a* put thereon can be easily carried out. Moreover, in the present embodiment, another structure is formed in which at the cutout 45, a rod-shaped thermometer made of glass without scale divisions in which a measuring liquid is sealed is installed. With this structure, by carrying out a measurement, with the thermometer made of glass being sandwiched by the scale lines having different line widths between the scale lines 32*a*, 33*a*, 37*a*, 38*a* and the scale lines 31*a*, 34*a*, 36*a*, 39*a*, the scale lines can be easily discriminated and the scale values can be easily read. Furthermore, in the scale divisions of the present embodiment, even in the case of an arrangement in which without forming the cutout 45, the thermometer made of glass is installed on the left end of the scale lines, the discrimination of the scale lines can be easily carried out and the reading of the scale values can be easily carried out; therefore, this arrangement may be used (not shown).

Twenty-Sixth Embodiment

Figure 31:
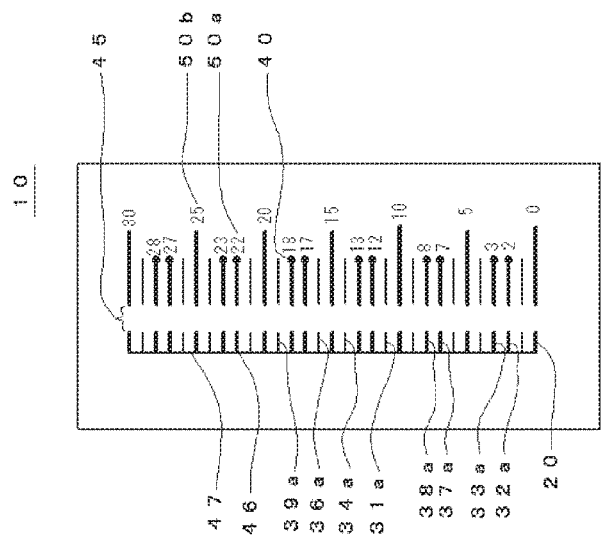
FIG. 31 is a plan view showing the entire scale in accordance with a twenty-sixth embodiment of the present invention.

Referring to FIG. 31, explanation will be given on a twenty-sixth embodiment of the present invention. The present embodiment relates to scale divisions for a liquid amount meter and an injection syringe made of a transparent material as a whole, which are designed as follows. A) Scale lines are formed on the scale main body 10 in the following manner. Within a range from a scale value 0 ml to a scale value 30 ml, scale lines having the same line length are formed horizontally at each 1 ml interval in the scale value in a direction from the upper side toward the lower side, in a descending order in the scale value. Among these, the line length and line width of the scale lines formed at each 5 ml interval with scale values of 0, 5, 10, 15, 20, 25 and 30 ml are set to a line length 1.3 times longer than the line length of the scale lines formed at each 1 ml interval, in a manner so as to be extended in a right direction, and a line width 2.5 times wider than the line width thereof, and in the vicinity of the tip on the right side of each scale line at each 5 ml interval, a scale numeral 50*b* indicating the present scale value of the scale line is put. B) The scale line with the scale value of 0 ml is set as a starting point 20. C) The scale value interval that is desirably determined is set to 1 ml. D) From the starting point 20, temporary numbers are successively put one by one from 0 in an ascending order on respective scale lines formed at each 1 ml interval corresponding to a scale value interval desirably determined. E) The line width of the scale lines 32*a*, 33*a*, 37*a* and 38*a* with the numeral 2, 3, 7 or 8 set at the lowermost position of the temporary number is set to a line width that is the same as the line width of the scale lines at each 5 ml interval, and onto the tip on the right side of each of the corresponding scale lines, a round mark 40, which has a diameter two times larger than the line width of the scale line and the inside of which is painted in black, and a scale numeral 50a indicating the scale value of each of the scale lines are formed. F) A cutout 45 for erasing the scale line having a width of 0.3 times as long as the line length of each of the scale lines 32a, 33a, 37a and 38a is formed at the same position of the intermediate portion of all the scale lines. G) A stop line 47 as a straight line is formed so as to connect the tips 46 of the respective scale lines on the opposite sides to the scale numerals (50a, 50b) with one another. In this manner, the line width of the scale lines 32a, 33a, 37a and 38a serving as the minimum scale lines is made thicker than the line width of the scale lines 31a, 34a, 36a and 39a also serving as the minimum scale lines, and by forming a mark 40 and a scale numeral 50a onto the tip on the right side of each of the scale lines 32a, 33a, 37a and 38a, the display methods between the scale lines 32a, 33a, 37a, 38a and the scale lines 31a, 34a, 36a, 39a are made different from each other.

In the case when the scale divisions that make a difference between the scale lines 32a, 33a, 37a, 38a and the scale lines 31a, 34a, 36a, 39a are formed on a liquid amount meter, an injection syringe or the like, since in the minimum scale lines formed four by four, the line width of each of the second scale line and the third scale line when counted in a direction of 0 of the scale value is made thicker than the line width of the first scale line and the fourth scale line, and by confirming the fact that the scale value of the second and third scale lines has the numeral of 2, 3, 7 or 8 set at the lowermost position, and by carrying out a measurement or the like by using the scale numeral 50a formed thereon as a guide, it becomes possible to intuitively discriminate the respective minimum scale lines, without the necessity of counting the minimum scale lines formed four by four, also to easily read the respective scale values of the minimum scale lines. Moreover, in the present embodiment, since "2", "3", "7" and "8" each serving as the scale numeral 50a are formed on the scale lines 32a, 33a, 37a and 38a, the scale value of each of the scale lines 32a, 33a, 37a and 38a can be read more easily in comparison with the case where no scale numeral 50a is put. Moreover, since the scale numerals 50a are formed on the adjacent scale line 32a and scale line 33a, as well as on the scale line 37a and scale line 38a, the scale amount is easily confirmed as 1 ml from the difference between the scale numerals 50a, such as "2" and "3" as well as "7" and "8". Since the scale amount is easily confirmed as 1 ml, even in the case of the scale lines 31a, 34a, 36a and 39a without adjacent scale numerals 50a, such as the scale lines 32a, 33a, 37a and 38a, by adding or subtracting the scale amount of 1 ml to or from the scale numeral 50a of each of the scale lines 32a, 33a, 37a and 38a, the scale values of the scale lines 31a, 34a, 36a and 39a can be read more easily in comparison with the case where no scale numeral 50a is formed, in the same manner as in the scale lines 32a, 33a, 37a and 38a. Furthermore, since the scale numerals 50a are formed on the scale lines 32a, 33a, 37a and 38a, the scale values of the scale lines 31a, 34a, 36a and 39a can be easily read, without the necessity of confirming the scale amount as described earlier. For example, although no scale numeral 50a is put onto the scale line of 9 ml corresponding to the scale line 39a, it can be easily discriminated as the scale value of 9 ml since it is a scale line in the middle of 8 ml corresponding to the scale line 38a to which the scale numeral 50a is put and 10 ml to which the scale numeral is put. With this arrangement, even the scale value of each of the scale lines 31a, 34a, 36a and 39a to which no scale numeral 50a is put can be easily read. Furthermore, since the cutout 45 is formed on all the scale lines, and since a measurement or the like is carried out based upon the liquid surface appearing in the cutout 45, the liquid surface is not overlapped with the scale line, and since the reading of the scale values is carried out in a manner so as to make the liquid surface sandwiched by the two scale lines on the two sides of the cutout 45, the visibility of the liquid surface can be improved in comparison with a normal measurement in which only one scale line is used and the reading of the scale value is easily carried out. With respect to the scale lines on the two sides, since the scale lines 32a, 33a, 37a, 38a and the scale lines 31a, 34a, 36a, 39a are mutually different in the line width, the discrimination of the respective scale lines and the reading of the scale values can be easily carried out. Moreover, in the case when these scale divisions are formed on an injection syringe main body at a position, with an injection needle being located on the lower side of the scale divisions, since the liquid surface of a chemical liquid or the like together with the end of a movable push member of the injection syringe on the chemical liquid side can be easily seen from the cutout 45, without being overlapped with the scale line, it becomes possible to appropriately fill the required amount of the chemical liquid or the like into the injection syringe. Additionally, in the scale divisions of FIG. 31, the scale numerals (50a, 50b) are formed in a descending order from the upper side toward the lower side; however, in the case when in addition to the scale divisions of FIG. 31, scale numerals (50a, 50b) are formed on the injection syringe main body in an ascending order from the upper side toward the lower side at a position where the injection needle is located on the upper side thereof as shown in FIG. 32 at the time of filling the chemical liquid or the like therein, the filling process with the injection needle facing upward can be carried out by using the scale divisions shown in FIG. 32, while the filling process with the injection needle facing downward is carried out by using the scale divisions shown in FIG. 31; therefore, the filling processes can be easily carried out, without the upper side and lower side of the scale numbers becoming reversed when viewed by the user, so that this arrangement may be used. Further, an injection syringe with only either of the scale divisions shown in FIG. 31 or FIG. 32 formed thereon may be used. In the case when these scale divisions are used for the scale divisions of an injection syringe, since the filling amount of the chemical liquid or the like can be easily read, it becomes possible to prevent errors in the filling amount in injection operations and consequently to lighten loads imposed on nurses and provide a useful method for quick treatments. Moreover, since the user is allowed to easily fix the viewpoint on the scale lines by the stop line 47 set at the time of measurement or the like, the reading of the scale values can be easily carried out. Furthermore, if the cutout 45, the stop line 47 and the scale numerals 50a of the scale lines 32a, 33a, 37a and 38a are unnecessary, these may be omitted, and even in this case, from the difference between the scale lines 32a, 33a, 37a, 38a and the scale lines 31a, 34a, 36a, 39a, the minimum scale lines can be intuitively discriminated and the reading of the scale values of the minimum scale lines can be easily carried out so that this arrangement may be used (not shown). In the scale divisions of FIG. 31 in the present embodiment, when the intervals between the scale lines are adjusted in accordance with the shape of a container, the resulting scale divisions can be used for scale divisions of a meter glass with the same effects as described above; therefore, this arrangement may be used (not shown).

Twenty-Seventh Embodiment

Referring to FIG. 33, explanation will be given on a twenty-seventh embodiment of the present invention. The present embodiment relates to scale divisions installed in a setting part for a feeding scale or the like of a lathe, which are designed as follows. A) Scale lines are formed on one side edge of the scale main body 10 in the following manner. On the scale main body 10, scale lines having the same line length in the scale lines are formed at each 0.02 cm interval in the scale values, within a range from 0 cm in the scale value to 1.0 cm in the scale value, from the left side toward the right side in an ascending order in the scale values. Next, the line length and the line width of scale lines at each 0.1 cm interval with the scale values corresponding to 0.1, 0.2, 0.3, 0.4, 0.6, 0.7, 0.8 and 0.9 cm are set to a line length 1.4 times longer than that of the scale lines formed at each 0.02 cm interval, with the scale width being also set to 2.5 times wider than that, and a scale numeral 50$b$ indicating the scale value of each of the scale lines is formed at the vicinity of the tip inside the corresponding scale line at each 0.1 cm interval. Next, the line length and line width of the scale lines at each 0.5 cm interval corresponding to 0, 0.5 and 1.0 cm in the scale value are set to a line length 1.1 times longer than that of the scale lines at each 0.1 cm interval, and a line width that is set to the same, and a scale numeral 50$b$ indicating the scale value of each of the scale lines is formed at the vicinity of the tip inside the corresponding scale line at each 0.5 cm interval. B) The scale line with the scale value of 0 cm is set as a starting point 20. C) The scale value interval to be desirably determined is set at 0.02 cm. D) From the starting point 20, onto the scale lines formed at each 0.02 cm interval that is a scale value interval desirably determined, temporary numbers are successively put one by one from 0 in an ascending order. E) The line length and line width of the scale lines 32$a$, 33$a$, 37$a$ and 38$a$ with the numeral 2, 3, 7 or 8 set at the lowermost position of the temporary number are set to a line width 1.1 times longer than the line length of each of the scale lines 31$a$, 34$a$, 36$a$ and 39$a$ with the numeral 1, 4, 6 or 9 set at the lowermost position of the temporary number, and a line width that is set to the same as that of the line width of the scale lines at each 0.1 cm interval, and onto the tip of the inside of each of the scale lines 32$a$, 33$a$, 37$a$ and 38$a$, a round mark 40 having a diameter which is two times larger than the line width of the scale line and the inside of which is colored in black is formed, and a scale numeral 50$a$ of each of "4" and "6" corresponding to a numeral at second decimal place below a decimal point in cm unit conversion of the scale value of each of the scale lines is also formed. F) A cutout 45 for erasing the scale line is formed with a width of 0.3 times as wide as the line length of the scale lines 31$a$, 34$a$, 36$a$ and 39$a$ at the same position of the intermediate portion of all the scale lines. G) An opening 22 is formed in a range sandwiched by the edge lines of the cutout 45.

A structure is prepared in which these scale divisions are formed on a setting part of a feeding scale for a lathe or the like and a setting-use indicator needle 48 is installed in the opening 22. The indicator needle 48 may be fixed, and by moving the scale main body 10, a feeding amount or the like may be determined, or the scale main body 10 may be fixed, and by moving the indicator needle 48, the feeding amount or the like may be determined. In this manner, the line length and line width of the scale lines 32$a$, 33$a$, 37$a$ and 38$a$ serving as the minimum scale lines are set to a line length that is made longer, and a line width that is made thicker, than those of the scale lines 31$a$, 34$a$, 36$a$ and 39$a$ also serving as the minimum scale lines, and by forming a round mark 40 and a scale numeral 50$a$ on the tip inside of each of the scale lines 32$a$, 33$a$, 37$a$ and 38$a$, the display methods between the scale lines 32$a$, 33$a$, 37$a$, 38$a$ and the scale lines 31$a$, 34$a$, 36$a$, 39$a$ are made different from each other. In the case when scale divisions that make a difference between the scale lines 32$a$, 33$a$, 37$a$, 38$a$ and the scale lines 31$a$, 34$a$, 36$a$, 39$a$ are formed on a setting part for a feeding scale or the like of a lathe, with respect to the minimum scale lines formed four by four, the line width of each of the second scale line and the third scale line when counted in a direction of 0 of the scale value is made thicker or the like than the line width of the first scale line and the fourth scale line; therefore, by confirming the fact that the scale value of the second and third scale lines takes a numeral "4" or "6" at the second decimal place below a decimal point in cm unit conversion, a measurement or the like is carried out by using the scale numeral 50$a$ formed thereon as a guide so that without the necessity of counting the minimum scale lines formed four by four, it becomes possible to intuitively discriminate the respective minimum scale lines, and also to easily read the respective scale values of the minimum scale lines. Moreover, in the present embodiment, since "4" and "6" each serving as the scale numeral 50$a$ are put on the scale lines 32$a$, 33$a$, 37$a$ and 38$a$, the scale value of each of the scale lines 32$a$, 33$a$, 37$a$ and 38$a$ can be read more easily in comparison with the case where no scale numeral 50$a$ is put. Furthermore, since the scale numeral 50$a$ is formed on the scale line to which the scale line 32$a$ and the scale line 33$a$, as well as the scale line 37$a$ and the scale line 38$a$, are adjacent, the scale amount can be easily confirmed as 0.02 cm based upon the difference of the scale numerals 50$a$ of "4" and "6". The scale amount is easily confirmed as 0.02 cm in this manner; therefore, even in the case of the scale lines 31$a$, 34$a$, 36$a$ and 39$a$ having no adjacent scale numerals 50$a$ like the scale lines 32$a$ and 33$a$ as well as the scale lines 37$a$ and 38$a$, by adding or subtracting the scale amount of 0.02 cm to or from the scale numeral 50$a$ of each of the scale lines 32$a$, 33$a$, 37$a$ and 38$a$, the scale values of the scale lines 31$a$, 34$a$, 36$a$ and 39$a$ can be read more easily in comparison with the case where no scale numeral 50$a$ is formed, in the same manner as in the scale lines 32$a$, 33$a$, 37$a$ and 38$a$. Moreover, since the reading of the scale value is carried out with the indicator needle 48 being sandwiched by the two scale lines on the two sides of the cutout 45, the visibility of the indicator needle 48 can be improved and the reading of the scale values of the scale lines can be easily carried out in comparison with the case in which the indicator needle 48 is formed on one side edge of the scale main body 10. Moreover, with respect to the scale lines on the two side, since the line widths between the scale lines 32$a$, 33$a$, 37$a$, 38$a$ and the scale lines 31$a$, 34$a$, 36$a$, 39$a$ are different from each other, the discrimination of the scale lines and the reading of the scale values can be easily carried out. Consequently, by using the arrangement shown in FIG. 33, the scale value indicated by the indicator needle 48 can be easily read as 0.62 cm. When these scale divisions are used for scale divisions for a setting part of a feeding scale for a lathe or the like, scale settings can be quickly carried out accurately.

Twenty-Eighth Embodiment

Referring to FIG. 34, explanation will be given on a twenty-eighth embodiment of the present invention. The present embodiment relates to scale divisions for a rotary type setting knob for use in electric communication mechanical instruments, which is designed as follows. A) On a round scale main body 10, scale display points, such as scale numerals 50$b$ and marks 112, are formed in a dial shape in the following manner. First, within a range from 0 in the scale value to 10 in the scale value, scale numerals 50*b* serving as scale display points indicating the respective scale positions are formed at each 1 interval in the scale values. B) The scale display point of 0 in the scale value is defined as a starting point 20. C) The scale interval to be desirably set is set to 1 scale. D) From the starting point 20, onto the respective scale display points at each 1 scale corresponding to the scale interval to be desirably set, temporary numbers are successively formed one by one from 0, in an ascending order. E) Scale display points 101*b*, 104*b*, 106*b* and 109*b* with the numeral 1, 4, 6 or 9 set at the lowermost position of the temporary number are changed into the round marks 112 the inside of which is painted in black. In this manner, scale display points 102*b*, 103*b*, 107*b* and 108*b* with the numeral 2, 3, 7 or 8 set at the lowermost position of the temporary number are formed as the scale numerals 50*b*, and the scale display points 101*b*, 104*b*, 106*b* and 109*b* with the numeral 1, 4, 6 or 9 set at the lowermost position of the temporary number are formed as the marks 112 so that the display methods thereof are made different. By forming these scale divisions on the rotary setting knob, since the scale display points 102*b*, 103*b*, 107*b* and 108*b* are indicated by "2", "3", "7" and "8" corresponding to the scale numerals 50*b*, and since the scale display points 101*b*, 104*b*, 106*b* and 109*b* are indicated by the marks 112, the scale display points 102*b*, 103*b*, 107*b* and 108*b* can be intuitively discriminated. Moreover, since the scale display points 102*b*, 103*b*, 107*b* and 108*b* are intuitively discriminated, the scale display points corresponding to the scale display points 101*b*, 104*b*, 106*b* and 109*b* adjacent thereto can also be intuitively discriminated. As described above, since the scale display points 101*b*, 102*b*, 103*b*, 104*b*, 106*b*, 107*b*, 108*b* and 109*b* are intuitively discriminated, scale settings can be easily carried out. Additionally, in the case of a scale in which scale display points down to 0 in the scale value are not formed, onto scale display points at each scale interval that are desirably determined including assumed scale display points down to 0 in the scale value, temporary numbers are successively put one by one from 0 in an ascending order, from the scale display point having 0 in the scale value being set as the starting point, and the display methods between the scale display points 102*b*, 103*b*, 107*b* and 108*b* with the numeral 2, 3, 7 or 8 set at the lowermost position of the temporary number of the scale display point actually formed and the scale display points 101*b*, 104*b*, 106*b* and 109*b* with the numeral 1, 4, 6 or 9 set at the lowermost position of the temporary number are made different. Even when this arrangement is used, the effects of the present invention are not changed; therefore, this arrangement may be used (not shown). Moreover, since the adjacent scale display points 102*b* and 103*b*, as well as 107*b* and 108*b*, are indicated as "2", "3" and "7", "8", by the scale numerals 50*b*, the positions of the scale display points "2", "3", "7", "8" can be easily confirmed. Furthermore, since the scale display points 102*b* and 103*b* corresponding to "2" and "3" are located in the middle of the scale display points 101*b*, 102*b*, 103*b*, 104*b*, and since the scale display points 107*b* and 108*b* corresponding to "7" and "8" are also located in the middle of the scale display points 106*b*, 107*b*, 108*b*, 109*b*, the positions of the scale numerals 50*b* of these "2", "3" and "7", "8" can be easily confirmed. Furthermore, since the scale display points "2", "3", "7", "8" indicated by the scale numerals 50*b* are formed, the scale positions as a whole can be easily confirmed by utilizing the scale numerals 50*b* of "2", "3", "7", "8" as a guide. Additionally, in the center of these scale divisions, a rotary type setting knob 49 having a column shape along the outer edge of which an indicator needle 48 is formed is installed, and by intuitively discriminate the respective scale display points, while rotating the rotary type setting knob 49, the scale settings can be quickly carried out accurately. Further, the scale display points 101*b*, 102*b*, 103*b*, 104*b*, 106*b*, 107*b*, 108*b* and 109*b* are given as display points indicated by scale numerals, and the scale numerals of the scale display points 102*b*, 103*b*, 107*b* and 108*b* are surrounded by round lines, while the scale numerals of the scale display points 101*b*, 104*b*, 106*b* and 109*b* are not surrounded by round lines; thus, even in this arrangement, the same effects can be obtained so that this arrangement may be adopted (not shown). Moreover, the shape of the mark 112 may be any shape, such as a triangle shape, a square shape and a double circle. Furthermore, a method in which onto scale display points at each scale interval that are desirably determined, temporary numbers are successively put one by one from 0 in an ascending order, from the scale display point having 0 in the scale value being set as the starting point, and the display methods between the scale display points with the numeral 2, 3, 7 or 8 set at the lowermost position of the temporary number and the scale display points with the numeral 1, 4, 6 or 9 set at the lowermost position of the temporary number are made different can be utilized for scale divisions having a plurality of scale lines, such as a scale plate, a liquid amount meter and the like, and the respective scale lines can be intuitively discriminated and the scale values can be easily read; thus, this arrangement may be adopted (not shown).

Twenty-Ninth Embodiment

Referring to FIG. 35, explanation will be given on a twenty-ninth embodiment of the present invention. The present embodiment relates to scale divisions for a sliding type setting knob for use in electric communication mechanical instruments, which is designed as follows. A) As shown in FIG. 35, a hole is formed in the center of a scale main body 10 so that an opening 22 is prepared. On the two sides of the opening 22, within a range from 0 to 10 in the scale value, scale numerals 50*b* of "0", "1", "2", "3", "4", "5", "6", "7", "8", "9" and "10" serving as scale display points indicating the respective scale positions are formed at each 1 interval in the scale value in an ascending order from the lower side toward the upper side. Moreover, between the respective scale numerals 50*b* and the opening 22, a mark 112 is formed so as to easily carry out settings. Next, such a structure as to allow a setting knob 49 with an indicator needle 48 formed thereon to move on the opening 22 is provided so that scale settings are carried out. B) The scale display point of 0 in the scale value is defined as a starting point 20. C) The scale interval to be desirably set is set to 1 scale. D) From the starting point 20, onto the respective scale display points at each 1 scale interval to be desirably set, temporary numbers are successively formed one by one from 0 in an ascending order. E) Each of the scale numerals 50*b* of the scale display points 102*b*, 103*b*, 107*b* and 108*b* with the numeral 2, 3, 7 or 8 set at the lowermost position of the temporary number is surrounded by a round line. In this manner, each of the scale numerals 50*b* of the scale display points 102*b*, 103*b*, 107*b* and 108*b* is surrounded with a round line, while each of the scale numerals 50*b* of the scale display points 101*b*, 104*b*, 106*b* and 109*b*, with the numeral 1, 4, 6 or 9 set at the lowermost position of the temporary number is not surrounded by a round line so that the display methods between the scale display points 102*b*, 103*b*, 107*b*, 108*b* and the scale display points 101*b*, 104*b*, 106*b*, 109*b* are made different. In the case when these scale divisions are installed on the sliding type setting knob, since each of the scale numerals 50*b* of "2", "3", "7", "8" corresponding to the scale display points 102*b*, 103*b*, 107*b*, 108*b* is surrounded by a round line, while each of the scale numerals 50*b* of "1", "4", "6", "9" corresponding to the scale display points 101*b*, 104*b*, 106*b*, 109*b* is not surrounded by a round line, the scale display points 102*b*, 103*b*, 107*b*, 108*b* of "2", "3", "7", "8" can be intuitively discriminated. Moreover, since the scale display points 102*b*, 103*b*, 107*b*, 108*b* of "2", "3", "7", "8" can be intuitively discriminated, the scale display points 101*b*, 104*b*, 106*b*, 109*b* of "1", "4", "6", "9" adjacent thereto can also be intuitively discriminated. As described above, since the scale display points 101*b*, 102*b*, 103*b*, 104*b*, 106*b*, 107*b*, 108*b* and 109*b* are intuitively discriminated, scale settings can be easily carried out.

Further, by surrounding the scale display points 102*b*, 103*b*, 107*b*, 108*b* of these adjacent "2", "3" and "7", "8" by round lines, the positions of the scale display points of these "2", "3", "7" and "8" can be easily confirmed. Moreover, since the scale display points "2" and "3" each surrounded by the round line are located in the center of "1", "2", "3" and "4" corresponding to the scale display points 101*b*, 102*b*, 103*b* and 104*b*, and since the scale display points "7" and "8" each also surrounded by the round line are located in the center of "6", "7", "8", "9" corresponding to the scale display points 106*b*, 107*b*, 108*b* and 109*b*, the positions of the scale numerals 50*b* of "2", "3", "7" and "8" can be easily confirmed. Furthermore, since the scale display points indicated by the scale numerals 50*b* of "2", "3", "7" and "8" each surrounded by the round line are formed, the scale positions as a whole can be easily confirmed by utilizing the scale display points 102*b*, 103*b*, 107*b* and 108*b* of "2", "3", "7" and "8" each surrounded by a round line as a guide. Furthermore, at the time of carrying out the scale setting, by sliding the sliding type setting knob 49 on the cutout 45 formed on the scale main body 10, the scale setting can be quickly carried out accurately. With respect to the method in which the display methods between the scale display points 102*b*, 103*b*, 107*b*, 108*b* and the scale display points 101*b*, 104*b*, 106*b*, 109*b* are made different, in addition to the above-mentioned method, any method, such as changing the types of fonts of the scale numerals or the sizes of points, or the like, may be used as long as the display methods can be made different.

As explained in the above-mentioned respective embodiments, with respect to the method in which onto scale lines at each scale value interval that are desirably determined, with the scale line having 0 in the scale value being set as a starting point, temporary numbers are successively put one by one from 0 in an ascending order, and the display methods between the scale lines with the numeral 2, 3, 7 or 8 set at the lowermost position of the temporary number and the scale lines with the numeral 1, 4, 6 or 9 set at the lowermost position of the temporary number are made different, any method may be used as long as the display methods are mutually made different. Moreover, with respect to the method in which onto scale lines at each scale value interval that are desirably determined with the scale line having 0 in the scale value being set as a starting point, temporary numbers are successively put one by one from 0 in an ascending order, and the display methods between the scale lines with the numeral 3 or 8 set at the lowermost position of the temporary number and the scale lines with the numeral 1, 2, 4, 6, 7 or 9 set at the lowermost position of the temporary number are made different also, any method may be used as long as the display methods are mutually made different. Furthermore, with respect to the method in which onto scale lines at each scale value interval that are desirably determined with the scale line having 0 in the scale value being set as a starting point, temporary numbers are successively put one by one from 0 in an ascending order, and the display methods between the scale lines with the numeral 2 or 7 set at the lowermost position of the temporary number and the scale lines with the numeral 1, 3, 4, 6, 8 or 9 set at the lowermost position of the temporary number are made different also, any method may be used as long as the display methods are mutually made different.

Moreover, the present invention is utilized for any scale, as long as the scale is constituted by a plurality of scale lines, a plurality of scale numerals or marks, and the like, which indicate the scale positions, and is applicable to scales in a wide range including measuring mechanical instruments and measuring devices, such as a scale plate, a tape measure, a kyoku-jaku, a caliper, a dial gauge, a taper gauge, an angle measuring device, a protractor, a triangle scale, a direction compass, a liquid amount meter, a flow-rate meter, a barometer, a weight meter, a current meter and the like, metal machining mechanical instruments, such as a lathe, optical mechanical instruments, such as a scale magnifier or the like, medical mechanical instruments, such as an injection syringe, a blood pressure meter, or the like, electric communication mechanical instruments, and measuring instruments for vehicles and ships, as well as aircrafts.

The units of scales relating to the present invention may be applied to any scale unit, such as length, pressure, atmospheric pressure, temperature, moisture, weight, volume, angles, directions, voltage, current amount, luminous intensity, speed, depth, altitude, rotation speed, noise, blood pressure and the like. The shape of the scale of the present invention may be set to any shape, such as a plane, a column surface of a column or the like. Moreover, the scale of the present invention may be a scale to be installed in a predetermined part or the like, such as a scale to be attached to a feeding handle of a lathe. Furthermore, the present invention may be used for a scale to be installed on a measurement result screen, a setting screen or the like displayed on a liquid crystal screen or the like of a measuring instrument, an analysis instrument or the like. The scale of the present invention may be a scale that is used when measurement results or the like are displayed on a printed object. Moreover, scale divisions of the scale may be designed to be displayed on an electronic paper, such as an electrophoretic element or the like, and used as a scale that can display any of a plurality of scale divisions of the $1^{st}$, $2^{nd}$, $3^{rd}$, $4^{th}$, $6^{th}$, $7^{th}$, $8^{th}$, $12^{th}$, $20^{th}$, $21^{st}$, $23^{rd}$, and $24^{th}$ embodiments in a switched manner. By using this arrangement, scale divisions can be displayed in accordance with an actual use situation so that this arrangement may be used. Furthermore, the scale divisions of the present invention may be formed on any material, as long as the material is paper, plastic material, wood, bamboo, glass, metal or the like on which scale divisions can be formed. Furthermore, in the above-mentioned embodiments, the range of scale values is set to a length range from 0 to 10 cm, from 0 to 1 cm or from 0 to 100 cm, a temperature range from minus 10° C. to plus 30° C., a pressure range from 0 to 0.6 MPs, a humidity range from 10 to 60%, or the like; however, the present invention is not intended to be limited by these, and the scale range may be set to any range. Among the scale divisions in which the scale positions are indicated by a plurality of scale lines, with respect to scale divisions in which scale lines down to 0 in the scale value are not formed, as described in the sixteenth embodiment, with an assumed scale line having 0 in the scale value being set as a starting point, onto each of the scale lines including the assumed scale lines formed at each interval in the scale values that are desirably determined, temporary numbers are put from 0, one by one in an ascending order, and the display methods between scale lines, with the numeral 2, 3, 7 or 8 set at the lowermost position of the temporary numbers actually formed, and scale lines with the numeral 1, 4, 6 or 9 set at the lowermost position of the temporary numbers may be made different. With this arrangement, even in the case of the scale divisions in which scale lines down to 0 in the scale value are not formed, the respective scale lines can be intuitively discriminated and the scale values can be easily read. Moreover, in the case of scale divisions in which the scale positions are indicated by a plurality of scale display points, with respect to scale divisions in which scale display points down to 0 in the scale value are not formed, with an assumed scale display points having 0 in the scale value being set as a starting point, onto each of the scale display points including the assumed scale display points formed at each interval in the scale that are desirably determined, temporary numbers are put from 0, one by one in an ascending order, and the display methods between scale display points, with the numeral 2, 3, 7 or 8 at the lowermost position of the temporary number actually formed, and scale display points, with the numeral 1, 4, 6 or 9 set at the lowermost position of the temporary number, are made different. With this arrangement, even in the case of the scale divisions in which scale display points down to 0 in the scale value are not formed, the respective scale display points can be intuitively discriminated and the scale values can be easily read.

Based upon the first embodiment in FIG. 1, a method for using the present invention is explained. First, by using the scale lines of 2, 3, 7, 8 cm having scale numerals each surrounded by a round line as a guide, the scale lines in a centimeter unit are confirmed. Next, with respect to the minimum scale lines formed four by four, the line width of the second scale line and the third scale line when counted in a direction of 0 of the scale value is made thicker or the like than the line width of the first scale line and the fourth scale line, and by confirming the fact that the scale value of the second and third scale lines takes a numeral 2, 3, 7 or 8 set at the first decimal place below a decimal point in cm unit conversion, the scale value of the scale line is read by using "2", "3", "7" or "8" of the scale numeral 50a formed thereon as a guide.

REFERENCE SIGNS LIST

10 scale main body, 20 starting point, 22 opening, 31; 31a; 31b scale line with the lowermost position of temporary number set to 1, 32; 32a; 32b scale line with the lowermost position of temporary number set to 2, 33; 33a; 33b scale line with the lowermost position of temporary number set to 3, 34; 34a; 34b scale line with the lowermost position of temporary number set to 4, 35; 35a; 35b scale line with the lowermost position of temporary number set to 5, 36; 36a; 36b scale line with the lowermost position of temporary number set to 6, 37; 37a; 37b scale line with the lowermost position of temporary number set to 7, 38; 38a; 38b scale line with the lowermost position of temporary number set to 8, 39; 39a; 39b scale line with the lowermost position of temporary number set to 9, 40 mark, 41 measuring object, 42 auxiliary scale line, 45 cutout, 46 tip of scale line, 47 stop line, 48 indicator needle, 49 setting knob, 50 scale numeral; 50a; 50b, 51 first scale line, 52 second scale line, 53 third scale line, 54 fourth scale line, 60 minimum scale line, 62 small scale line, 64 middle scale line, 66 large scale line, 101b scale display point with the numeral at the lowermost position of temporary number set to 1, 102b scale display point with the numeral at the lowermost position of temporary number set to 2, 103b scale display point with the numeral at the lowermost position of temporary number set to 3, 104b scale display point with the numeral at the lowermost position of temporary number set to 4, 105b scale display point with the numeral at the lowermost position of temporary number set to 5, 106b scale display point with the numeral at the lowermost position of temporary number set to 6, 107b scale display point with the numeral at the lowermost position of temporary number set to 7, 108b scale display point with the numeral at the lowermost position of temporary number set to 8, 109b scale display point with the numeral at the lowermost position of temporary number set to 9, 112 mark, 600 conventional scale main body

What is claimed is:

1. A scale, which is provided with a scale main body having a predetermined size and a plurality of scale lines formed thereon, comprising:
    temporary numbers that are put one by one from 0 in an ascending order on the respective scale lines formed at each scale value interval desirably determined, with the scale line defined as 0 in the scale value being set as a starting point,
    wherein display methods between scale numerals of the scale line with the numeral 2, 3, 7 or 8 set at the lowermost position of the temporary number and the scale line with the numeral 1, 4, 6 or 9 set at the lowermost position of the temporary number are made different.

2. The scale according to any one of claim 1,
    wherein display methods between line widths of the scale line with the numeral 2, 3, 7 or 8 set at the lowermost position of the temporary number and the scale line with the numeral 1, 4, 6 or 9 set at the lowermost position of the temporary number are made different.

3. The scale according to any one of claim 1,
    wherein marks having a desirable shape are put on the scale lines with the numeral 2, 3, 7 or 8 set at the lowermost position of the temporary number, while no marks having a desirable shape are put on the scale lines with the numeral 1, 4, 6 or 9 set at the lowermost position of the temporary number, so that display methods of the marks are made different.

4. The scale according to any one of claim 1,
    wherein display methods between line widths of the scale line with the numeral 2, 3, 7 or 8 set at the lowermost position of the temporary number and the scale line with the numeral 1, 4, 6 or 9 set at the lowermost position of the temporary number are made different,
    wherein marks having a desirable shape are put on the scale lines with the numeral 2, 3, 7 or 8 set at the lowermost position of the temporary number, while no marks having a desirable shape are put on the scale lines with the numeral 1, 4, 6 or 9 set at the lowermost position of the temporary number, so that display methods of the marks are made different.

5. A scale, which is provided with a scale main body having a predetermined size and a plurality of scale display points that show a plurality of scale positions and are formed thereon, comprising:
    temporary numbers that are put one by one from 0 in an ascending order on the respective scale display points formed at each scale interval desirably determined, with the scale display points defined as 0 in the scale value being set as a starting point,
wherein display methods between scale numerals of the scale display point with the numeral 2, 3, 7 or 8 set at the lowermost position of the temporary number and the scale display point with the numeral 1, 4, 6, or 9 set at the lowermost position of the temporary number are made different.

6. The scale according to any one of claim 1,
wherein a cutout for erasing the intermediate portion of a scale line is formed on a predetermined scale line.

* * * * *